(12) United States Patent
Nagata et al.

(10) Patent No.: US 6,859,332 B2
(45) Date of Patent: Feb. 22, 2005

(54) ZOOM OPTICAL SYSTEM AND IMAGING APPARATUS USING THE SAME

(75) Inventors: Tetsuo Nagata, Hachioji (JP); Tetsuhide Takeyama, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/643,958

(22) Filed: Aug. 20, 2003

(65) Prior Publication Data

US 2004/0066561 A1 Apr. 8, 2004

(30) Foreign Application Priority Data

Aug. 20, 2002 (JP) ........................................ 2002-239774

(51) Int. Cl.$^7$ ........................ G02B 15/14; G02B 17/00; G02B 5/08
(52) U.S. Cl. ........................ 359/676; 359/726; 359/846
(58) Field of Search ................................ 359/676, 683, 359/689, 690, 726, 846

(56) References Cited

U.S. PATENT DOCUMENTS

| | | | |
|---|---|---|---|
| 6,464,363 B1 * | 10/2002 | Nishioka et al. ............ 359/846 |
| 6,618,209 B2 * | 9/2003 | Nishioka et al. ............ 359/676 |
| 2002/0136150 A1 * | 9/2002 | Mihara et al. ............... 369/125 |
| 2003/0179464 A1 * | 9/2003 | Amanai ....................... 359/685 |
| 2004/0027684 A1 * | 2/2004 | Nishioka et al. ............ 359/676 |
| 2004/0070843 A1 * | 4/2004 | Nishioka et al. ............ 359/676 |

* cited by examiner

Primary Examiner—David N. Spector
(74) Attorney, Agent, or Firm—Kenyon & Kenyon

(57) ABSTRACT

A zoom optical system includes a deformable element having a focusing function and two lens groups movable in a magnification change and having a magnification varying function or a compensating function for compensating for a shift of an image surface. Alternatively, a zoom optical system includes, in order from the object side, a first group having a negative power and being fixed in a magnification change, a second group having a positive power and being movable in a magnification change, and a third group movable in a magnification change. The first group has a deformable element having a focusing function. An imaging apparatus is provided with either zoom optical system. Whereby, a high-performance zoom optical system with small fluctuation of aberrations in spite of use of a deformable element and a photographing apparatus using the same zoom optical system are provided.

16 Claims, 37 Drawing Sheets

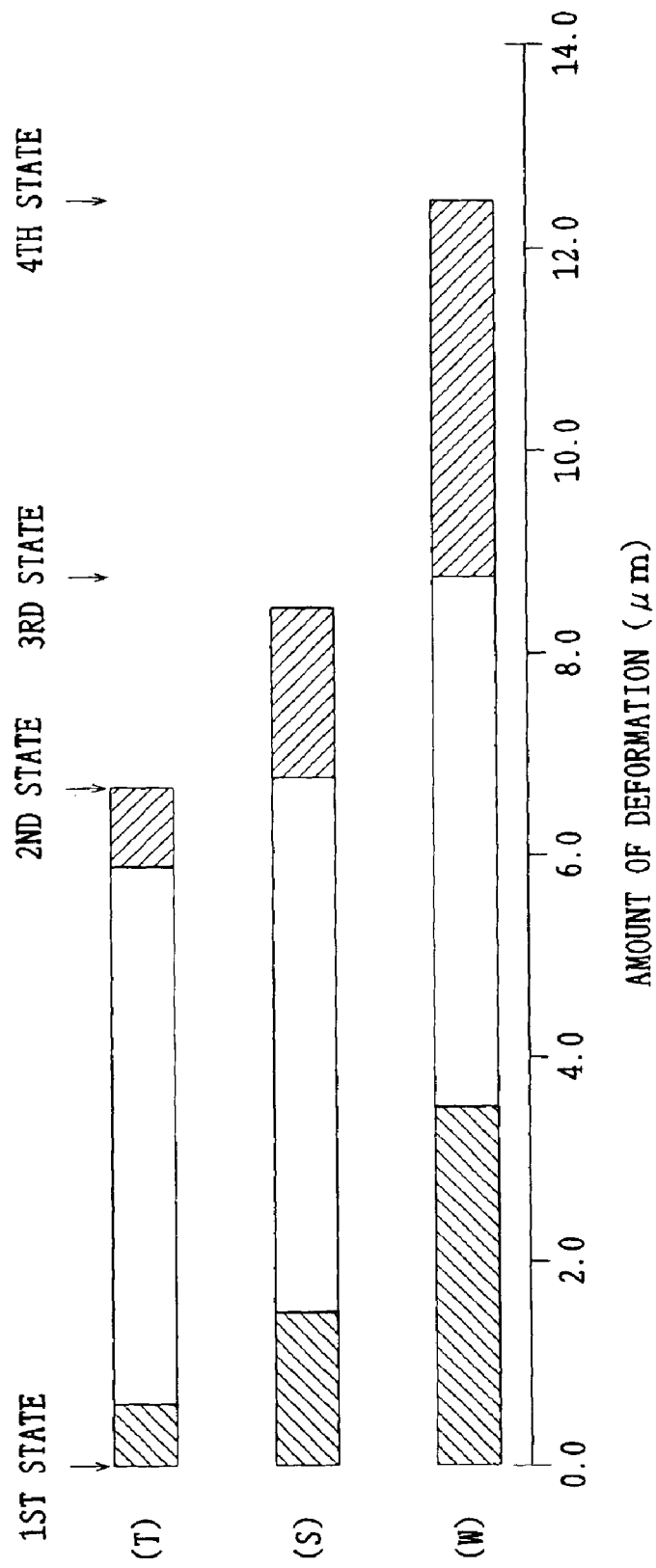

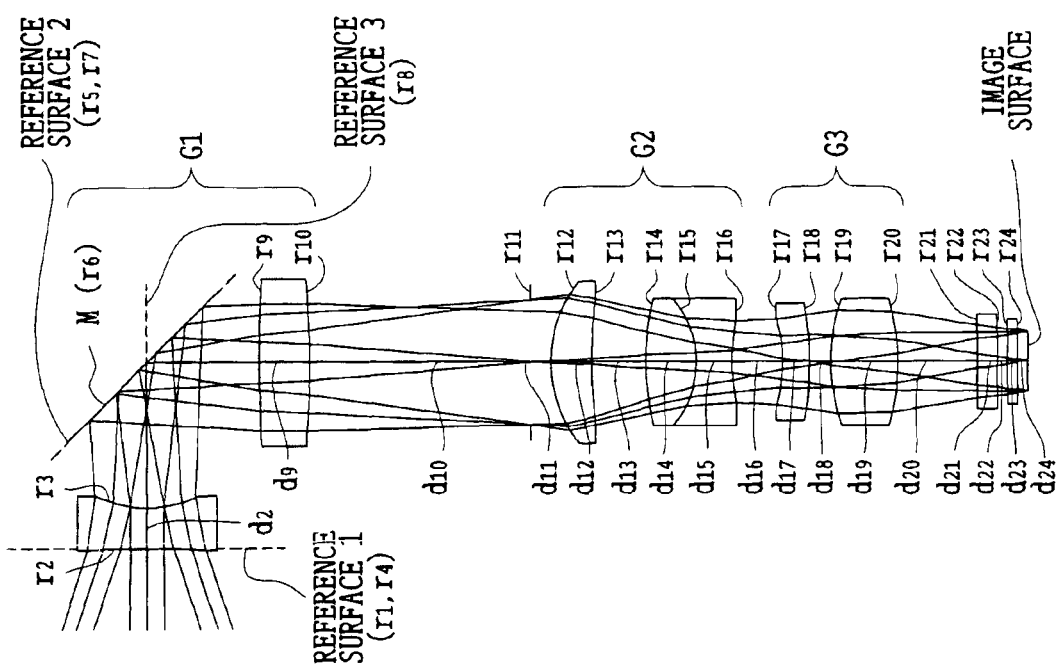
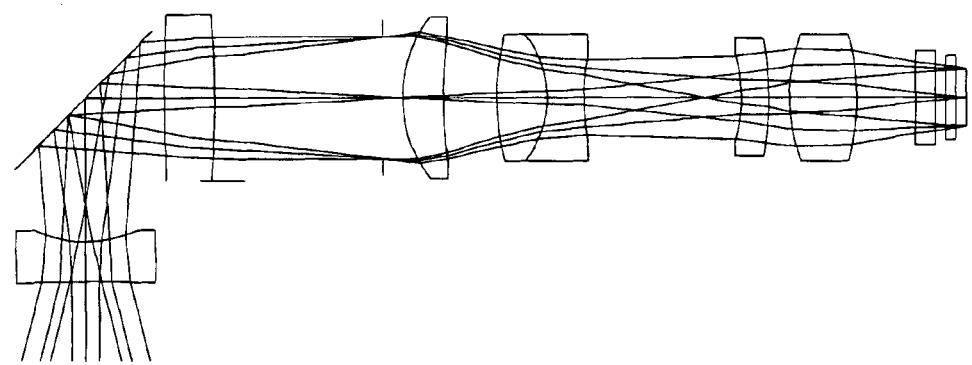
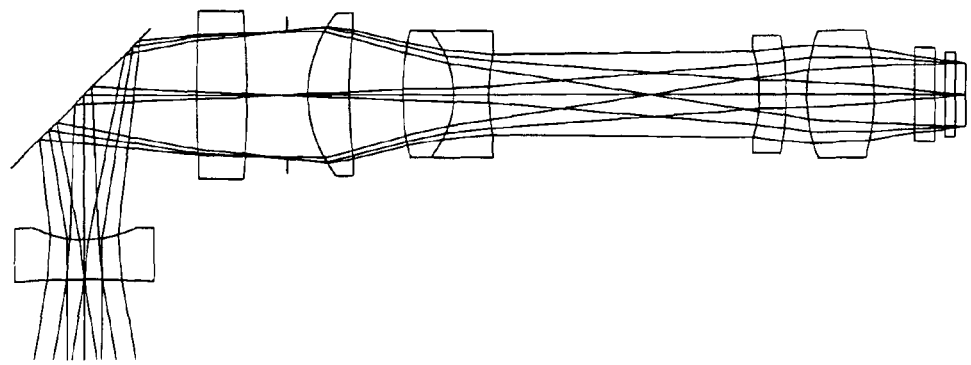

FIG. 3A     (X,Y) FIG. 3B
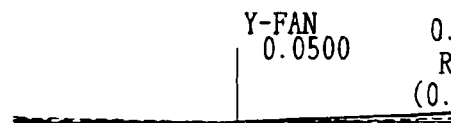 
FIG. 3C     FIG. 3D
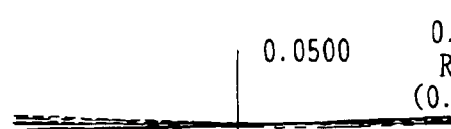 
FIG. 3E     FIG. 3F
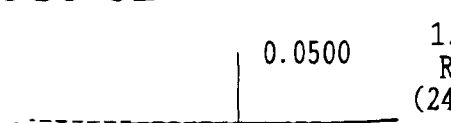 
FIG. 3G     FIG. 3H
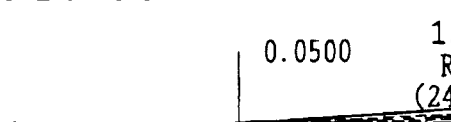 
FIG. 3I     FIG. 3J
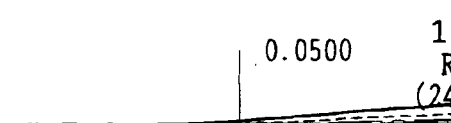 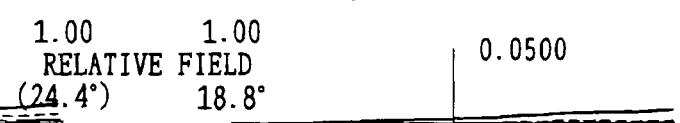
FIG. 3K     FIG. 3L
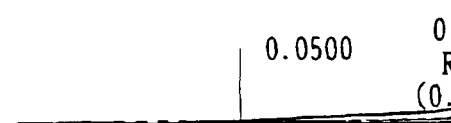 
———————— 656.2700 NM
------------ 587.5600 NM
——— - ——— 546.0700 NM
-------------- 486.1300 NM
——— - - ——— 435.8300 NM FIG. 4A      FIG. 4B
(X, Y) 0.00 0.00
RELATIVE FIELD
(0.00°) 0.00°
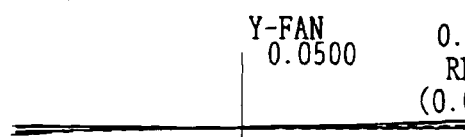
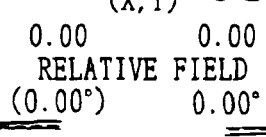
FIG. 4C      FIG. 4D
0.00 1.00
RELATIVE FIELD
(0.00°) -13.6°
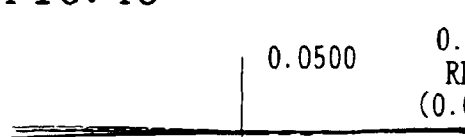
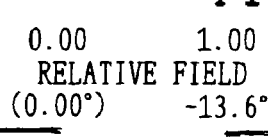
FIG. 4E      FIG. 4F
1.00 1.00
RELATIVE FIELD
(17.9°) -13.6°
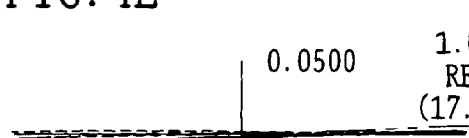
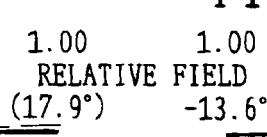
FIG. 4G      FIG. 4H
1.00 0.00
RELATIVE FIELD
(17.9°) 0.00°
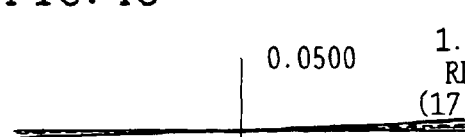
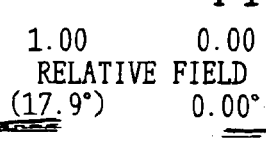
FIG. 4I      FIG. 4J
1.00 -1.00
RELATIVE FIELD
(17.9°) 13.6°
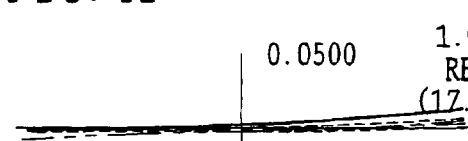
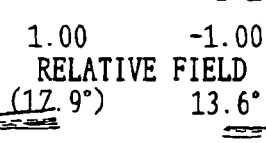
FIG. 4K      FIG. 4L
0.00 -1.00
RELATIVE FIELD
(0.00°) 13.6°
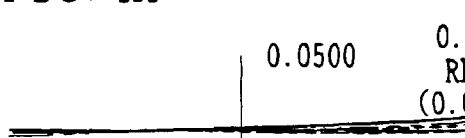
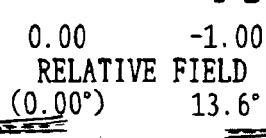
——————— 656.2700 NM
- - - - - - - - 587.5600 NM
— — — — 546.0700 NM
- - - - - - - - 486.1300 NM
— - — - — 435.8300 NM

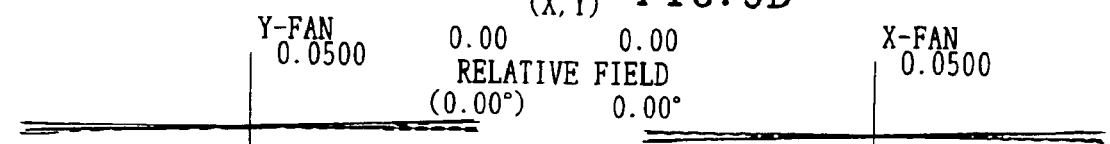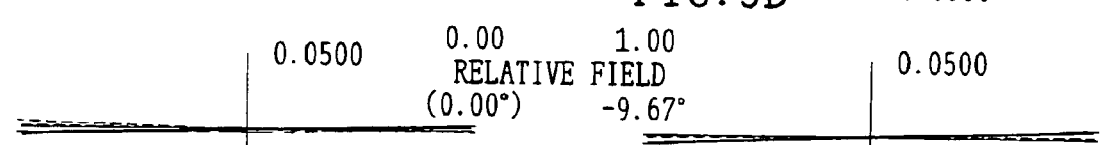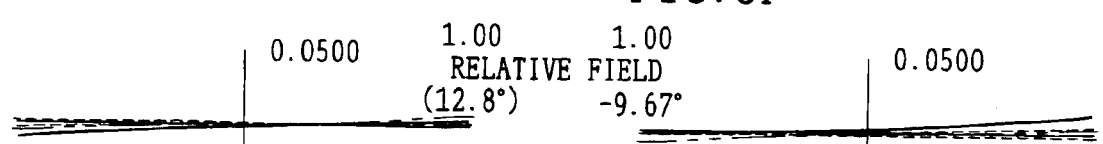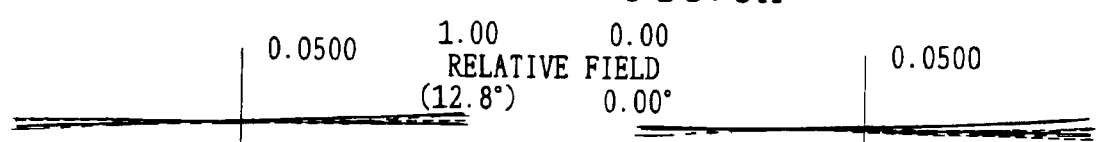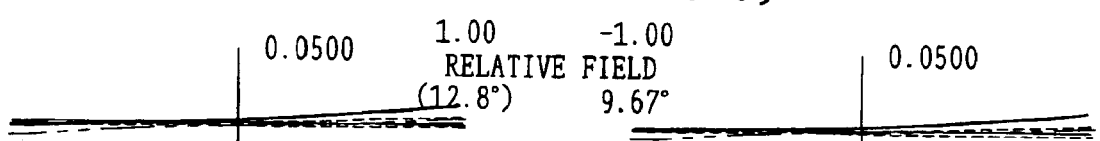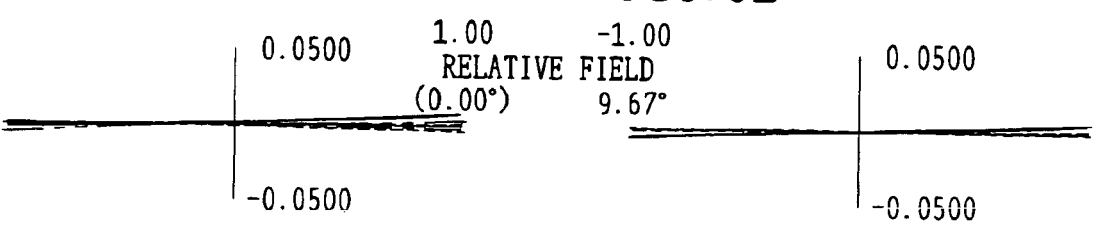

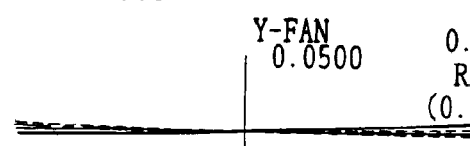

FIG. 7A
FIG. 7B
FIG. 7C
FIG. 7D
FIG. 7E
FIG. 7F
FIG. 7G
FIG. 7H
FIG. 7I
FIG. 7J
FIG. 7K
FIG. 7L
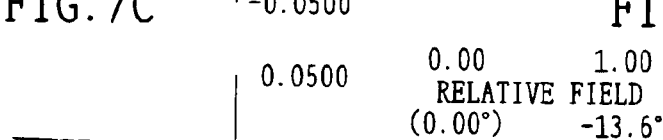
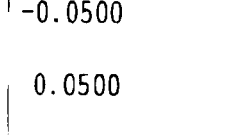
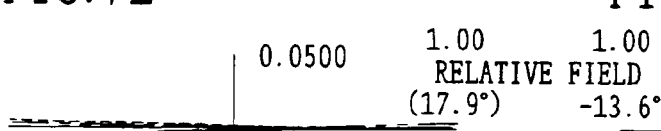
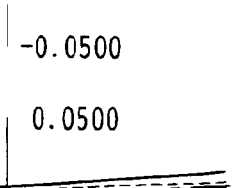
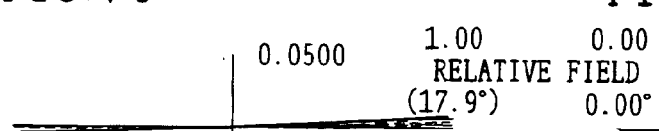
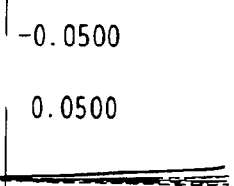
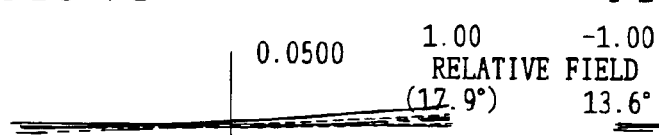
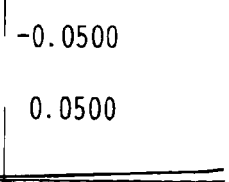
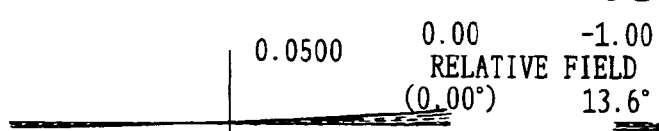
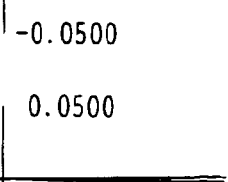
——————————— 656.2700 NM
------------- 587.5600 NM
— — — — 546.0700 NM
-------------- 486.1300 NM
— — — — — 435.8300 NM

FIG. 8A
Y-FAN
0.0500
(0.00°)

FIG. 8B
(X,Y) 0.00 0.00
RELATIVE FIELD
0.00°
X-FAN
0.0500

0.0500
0.00 1.00
RELATIVE FIELD
(0.00°) -9.67°
0.0500

0.0500
1.00 1.00
RELATIVE FIELD
(12.8°) -9.67°
0.0500

0.0500
1.00 0.00
RELATIVE FIELD
(12.8°) 0.00°
0.0500

0.0500
1.00 -1.00
RELATIVE FIELD
(12.8°) 9.67°
0.0500

0.0500
0.00 -1.00
RELATIVE FIELD
(0.00°) 9.67°
0.0500

-0.0500

-0.0500

——————— 656.2700 NM
- - - - - - - - 587.5600 NM
— — — — — 546.0700 NM
- - - - - - - - 486.1300 NM
— - — - — 435.8300 NM

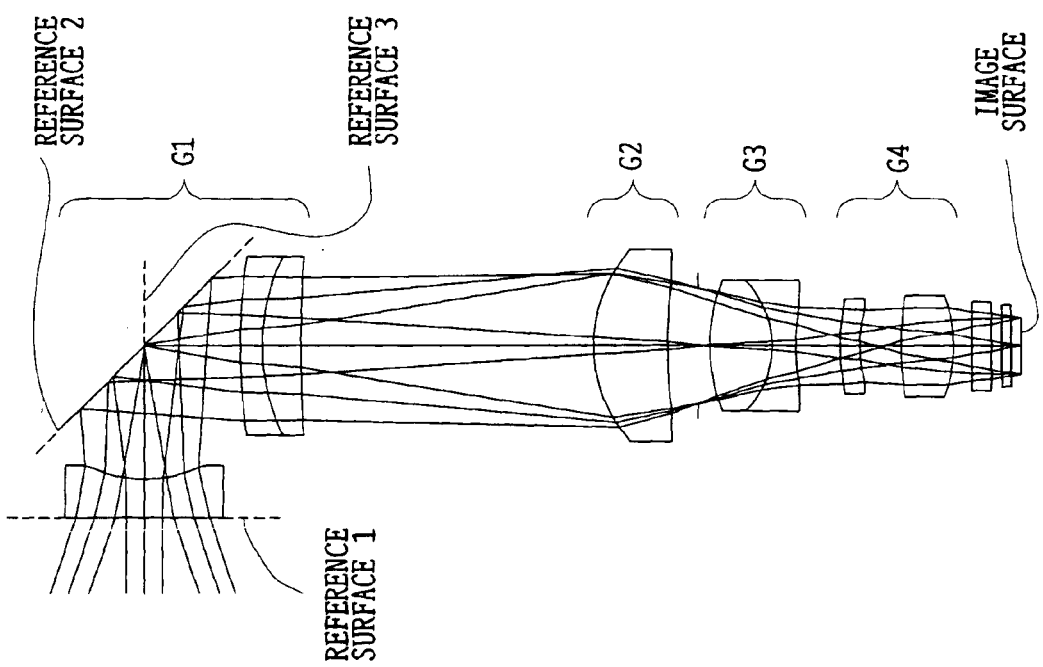
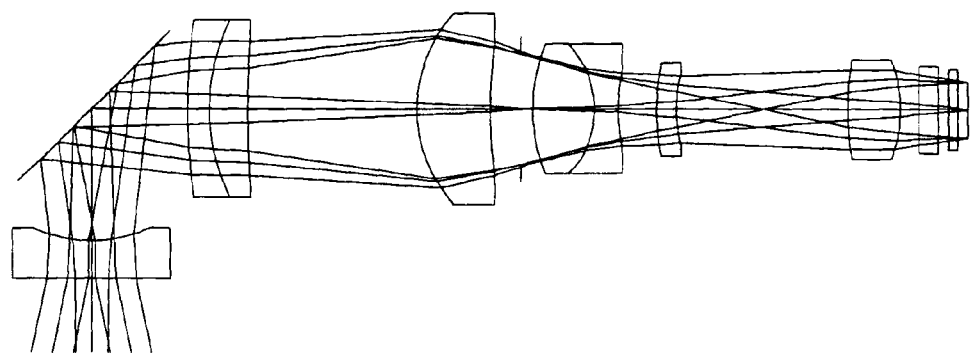
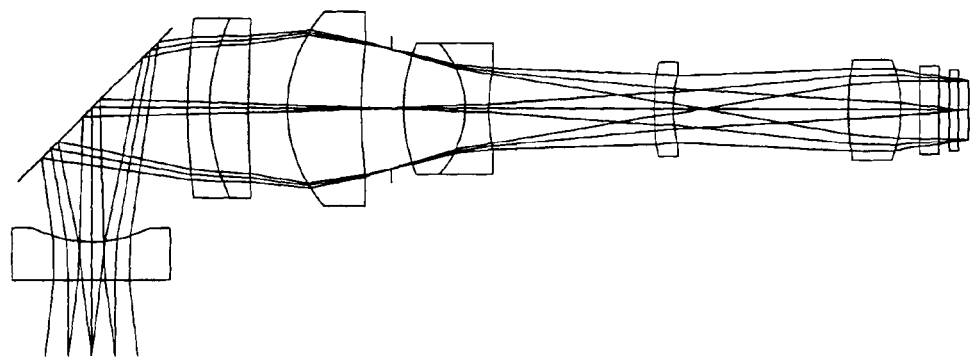

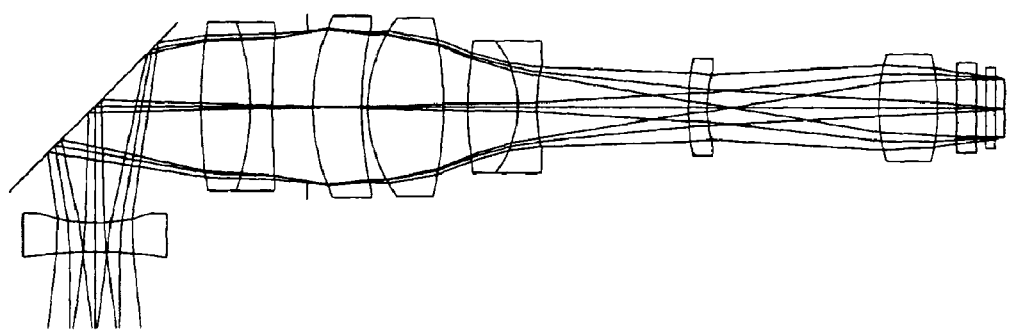
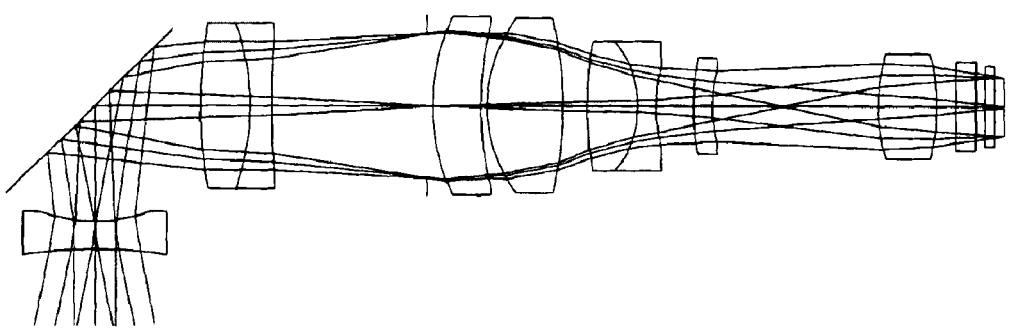
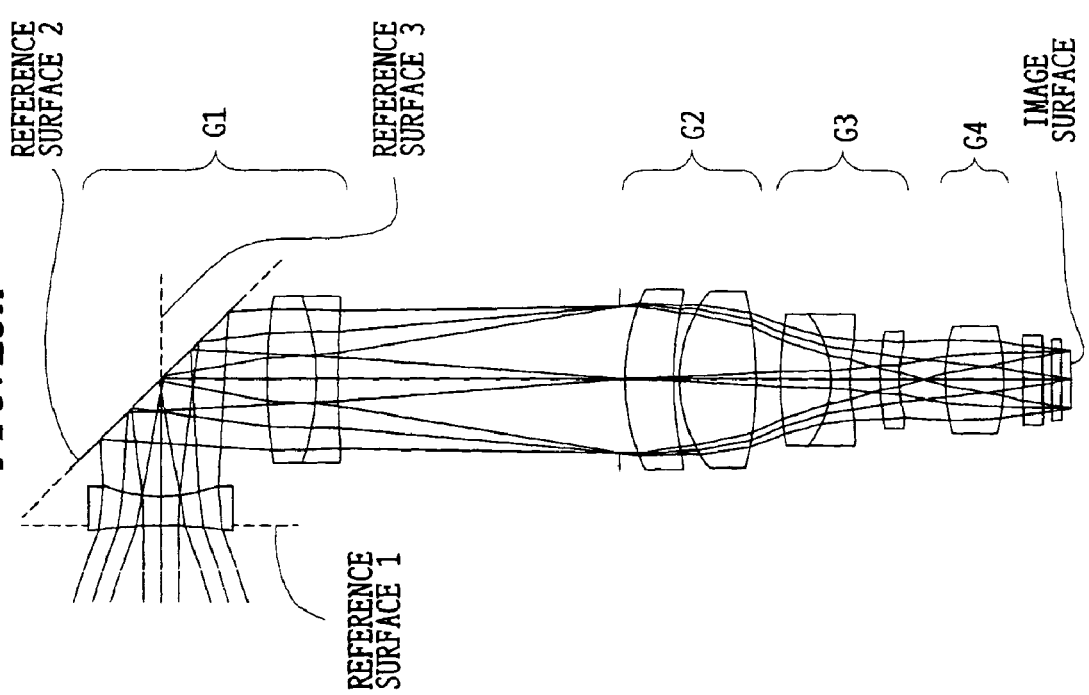

TRANS-TYPE  CIS-TYPE

ZOOM OPTICAL SYSTEM AND IMAGING APPARATUS USING THE SAME

BACKGROUND OF THE INVENTION a) Field of the Invention

The present invention relates to a zoom optical system and an electronic imaging apparatus using the same.

b) Description of Related Art

In general, a zoom optical system is formed of a variator group having a magnification varying function, a compensator group for compensating for shift of an image surface and aberrations caused by magnification change, and a focusing group for focusing onto an object. In many cases, these groups are constructed of lenses. In recent years, however, zoom optical systems that perform focusing using deformable mirrors have been proposed (Japanese Patent Application Preliminary Publication (KOKAI) No. 2002-122779, Japanese Patent Application Preliminary Publication (KOKAI) No. 2002-122719).

SUMMARY OF THE INVENTION

An object of the present invention is to provide a high-performance zoom optical system with small fluctuation of aberrations irrespective of use of a deformable mirror and an imaging apparatus using the same zoom optical system.

In order to attain the object set forth above, a zoom optical system according to the present invention includes a deformable element having a focusing function and two lens groups movable during a magnification change and having a magnification varying function or a compensating function for compensating for a shift of the image surface.

Also, a zoom optical system according to the present invention includes, in order from the object side, a first group having a negative power and being fixed in a magnification change, a second group having a positive power and being movable in a magnification change, and a third group movable in a magnification change, wherein the first group has a deformable element having a focusing function and satisfies the following condition:

$$-0.5 < f_{1a}/f_{1b} < -0.03$$

where $f_{1a}$ is a power of a negative lens unit arranged on an object side of the deformable element in the first group, and $f_{1b}$ is a power of a positive lens unit disposed on an image side of the deformable element in the first group.

These and other features and advantages of the present invention will become apparent from the following detailed description of the preferred embodiments when taken in conjunction with the accompanying drawings.

BRIEF DESCRIPTION OF THE DRAWINGS

FIG. 1 is a schematic diagram to explain amount of deformation of a deformable element (deformable mirror) used in the zoom optical system according to the present invention.

FIGS. 2A–2C are sectional views that show the lens configuration of a zoom optical system according to the first embodiment of the present invention, taken along the optical axis. Specifically, FIG. 2A shows the wide-angle end condition, FIG. 2B shows the intermediate condition, and FIG. 2C shows the telephoto end condition.

FIGS. 3A–3L are aberration diagrams that show lateral aberrations for several wavelength regions of the zoom optical system according to the first embodiment in the wide-angle end condition in a case where the object distance is infinite.

FIGS. 4A–4L are aberration diagrams that show lateral aberrations for several wavelength regions of the zoom optical system according to the first embodiment in the intermediate condition in a case where the object distance is infinite.

FIGS. 5A–5L are aberration diagrams that show lateral aberrations for several wavelength regions of the zoom optical system according to the first embodiment in the telephoto end condition in a case where the object distance is infinite.

FIGS. 6A–6L are aberration diagrams that show lateral aberrations for several wavelength regions of the zoom optical system according to the first embodiment in the wide-angle end condition in a case where the object distance is 300 mm.

FIGS. 7A–7L are aberration diagrams that show lateral aberrations for several wavelength regions of the zoom optical system according to the first embodiment in the intermediate condition in a case where the object distance is 300 mm.

FIGS. 8A–8L are aberration diagrams that show lateral aberrations for several wavelength regions of the zoom optical system according to the first embodiment in the telephoto end condition in a case where the object distance is 300 mm.

FIG. 9A shows the wide-angle end condition, FIG. 9B shows the intermediate condition, and FIG. 9C shows the telephoto end condition.

FIGS. 10A–10C are sectional views that show the lens configuration of a zoom optical system according to the third embodiment of the present invention, taken along the optical axis. Specifically, FIG. 10A shows the wide-angle end condition, FIG. 10B shows the intermediate condition, and FIG. 10C shows the telephoto end condition.

FIG. 11A shows the wide-angle end condition, FIG. 11B shows the intermediate condition, and FIG. 11C shows the telephoto end condition.

FIG. 12A shows the wide-angle end condition, FIG. 12B shows the intermediate condition, and FIG. 12C shows the telephoto end condition.

FIGS. 13A–13C are sectional views that show the lens configuration of a zoom optical system according to the sixth embodiment of the present invention, taken along the optical axis. Specifically, FIG. 13A shows the wide-angle end condition, FIG. 13B shows the intermediate condition, and FIG. 13C shows the telephoto end condition.

FIG. 14A shows the wide-angle end condition, FIG. 14B shows the intermediate condition, and FIG. 14C shows the telephoto end condition.

DETAILED DESCRIPTION OF THE PREFERRED EMBODIMENTS

Figure 9C:
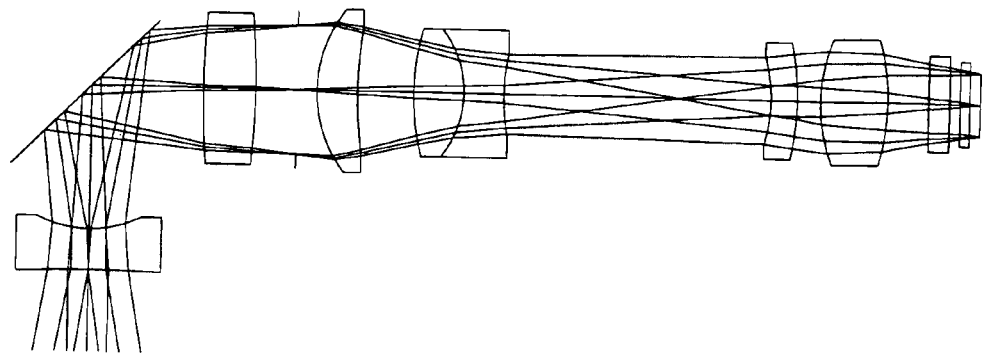
FIGS. 9A–9C are sectional views that show the lens configuration of a zoom optical system according to the second embodiment of the present invention, taken along the optical axis. Specifically.

Preceding the description of the embodiments, the functions of the present invention are explained. While a deformable mirror, a liquid crystal lens. etc. are categorized into the deformable element, explanation is made here referring to the deformable mirror as an example.

According to the present invention, by imparting a focusing function to the reflecting surface of the deformable mirror, a mechanical driving structure is needed only for magnification varying groups. Therefore, it is not necessary to use a motor, a driving circuit and so on for focusing, and thus the lens frame structure can be extremely simple. As a result, compact-sizing and cost reduction can be achieved for the entire imaging apparatus. In addition, since the deformable mirror is driven by electrostatic force and is instantly deformable, focusing can be performed at high speed. In addition, a zoom optical system with a very small power consumption and a low operation noise can be realized.

Also, according to the present invention, a zoom optical system satisfies the following condition (1-1):

$$0.40 < |\beta_{DMW}| |\beta_{DMW}| < 1.0 \qquad (1\text{-}1)$$

where $\beta_{DMW}$ is a magnification, at the wide-angle end position, of all of lens groups that are disposed on the image side of the deformable mirror (deformable element). This specifies the condition for focusing with an appropriate amount of deformation of the deformable element. A value of $|\beta_{DMW}|$ smaller than the lower limit of Condition (1-1) requires a large amount of deformation of the deformable mirror for focusing because of the small magnification, and accordingly a large power consumption, and thus is not preferable. In addition, since the deformable mirror is arranged at a decentered position from the optical axis, the large amount of deformation of the deformable mirror would cause a large amount of asymmetric, decentered aberrations, in particular, asymmetric coma, to be generated and thus is unfavorable. On the other hand, a value of $|\beta_{DMW}|$ exceeding the upper limit makes it possible to perform focusing with a small amount of deformation of the variable mirror because of the large magnification. However, such an optical system is sensitive to other manufacture errors also, and thus is difficult to manufacture.

It is much preferred that either of the following conditions is satisfied:

$$0.50 < |\beta_{DMW}| < 0.9 \quad (1\text{-}2)$$

$$0.55 < |\beta_{DMW}| < 0.8 \quad (1\text{-}3)$$

If $|\beta_{DMW}|$ is within either range specified above, the amount of deformation of the deformable mirror (deformable element) can be more reasonably designed.

Also, according to the present invention, at least one rotationally symmetric surface of lenses constituting the lens groups is decentered from the optical axis. Whereby, it is possible to compensate for decentered aberrations of the deformable mirror, and consequently to provide a high-performance zoom optical system.

Also, according to the present invention, the deformable mirror has a rotationally asymmetric curved surface, that is, a free-formed surface. This configuration can reduce decentered aberrations caused at the deformable mirror to very small amounts.

Also, according to the present invention, a zoom optical system has a deformable mirror and a magnification varying group, and the deformable mirror has a focusing function and is disposed before the magnification varying group. This feature can remove out-of-focus condition caused by zooming. The deformable mirror is desirably disposed before the lens group that mainly has the magnification varying function. An explanation is made below in this regard. In a case where the deformable mirror is used for focusing, the power of the deformable mirror is to be changed according as the object distance is changed. Here, in a configuration where the deformable mirror is disposed after the magnification varying group, if zooming-in operation is performed with the object distance being kept even the same, the magnification of the lens group disposed on the object side of the deformable mirror increases. As a result, due to the change of magnification of the lens group caused by zooming-in, a larger amount of deformation of the reflecting surface is needed than under the wide-angle condition. Too large an amount of deformation of the reflecting surface generates a large amount of decentered aberrations and thus is not preferable.

Thus, in a configuration where the deformable mirror is disposed before (i.e. on the object side of) the magnification varying group as in the present invention, a magnification of lenses that are disposed before the deformable mirror is not changed by zooming. For example, in a case where focusing is made to change the object distance from the infinity to the proximity, it can be achieved with the same amount of deformation of the surface irrespective the zoom condition in the range from the wide-angle end to the telephoto end. That is, this configuration is favorable in view of optical performance. In addition, this configuration is favorable in that design for controlling the deformable mirror can be made simple. Therefore, according to the present invention, the above-described configuration is employed in consideration of design feasibility of an imaging optical system.

Also, according to the present invention, the deformable mirror is deformable from a predetermined first state to a second state where the zoom optical system is focused on an object that is placed at the infinity, from the second state to a third state where the zoom optical system is focused on an object that is placed at the proximity, and from the third state to a predetermined fourth state that is different from the first state, and satisfies the following condition:

$$4 \cdot Fno \cdot P < Zf < 30 \cdot Fno \cdot P \quad (2\text{-}1)$$

where $Zf$ is an amount of shift of the image surface, at the wide-angle end position, when deformation is made from the first state to the second state and also when deformation is made from the third state to the fourth state, P is a value given by $P = \sqrt{(Px \cdot Py)}$ where Px is a dimension in x direction of a pixel included in an image pickup element and Py is a dimension in y direction of the pixel in the image pickup element, and Fno is an F number of an imaging optical system.

Condition (2-1) is a condition for appropriately performing focusing by the contrast method using an image pickup element such as a CCD, and limits the defocus amount of an image. Usually, for detecting the in-focus position in an autofocus operation, the system defocuses an image back and forth from the in-focus position and searches for the peak of contrast, to detect the in-focus position.

A value of $Zf$ smaller than the lower limit of Condition (2-1) causes shortage of the defocus amount, and thus makes it difficult to detect the contrast of a low-contrast image or in a dark place. On the other hand, a value of $Zf$ exceeding the upper limit causes an unnecessarily large defocus amount, and thus requires the deformable mirror to have a large maximum amount of deformation, to cause a large amount of generation of decentered aberrations.

In this regard, a value of $Zf$ within either range specified below raises the autofocus accuracy and thus is much preferable:

$$5 \cdot Fno \cdot P < Zf < 25 \cdot Fno \cdot P \quad (2\text{-}2)$$

$$6 \cdot Fno \cdot P < Zf < 20 \cdot Fno \cdot P \quad (2\text{-}3).$$

Also, according to the present invention, a zoom optical system satisfies the following condition:

$$0.1 \leq |md/\sqrt{(f_w \times f_t)}| < 5.0 \quad (3\text{-}1)$$

where md (in micrometer) is a maximum amount of deformation of the deformable mirror (deformable element), $f_w$ is a focal length of the zoom optical system at the wide-angle end position, and $f_t$ is a focal length of the zoom optical system at the telephoto end position.

Condition (3-1) limits the maximum amount of deformation of the deformable mirror, as normalized by focal length. Satisfaction of this condition assures that the amount of deformation of the deformable mirror falls within an appropriate range. A value of $|md/\sqrt{(f_w \times f_t)}|$ smaller than the lower limit causes shortage of the amount of deformation, and accordingly the shortest photographing range has to be designed long. Alternatively, a magnification of lens units arranged on the image side of the deformable mirror has to be increased. In this case, however, requirement for manufacture accuracy of the lenses and the like becomes more severe. On the other hand, a value of $|md/\sqrt{(f_w \times f_t)}|$ greater than the upper limit causes so large an amount of deformation that generation of decentered aberrations increase, and thus makes it difficult to achieve the desired optical performance.

In addition, a value of $|md/\sqrt{(f_w \times f_t)}|$ within either range specified below is much preferable:

$$0.3 \leq |md/\sqrt{(f_w \times f_t)}| < 4.0 \quad (3\text{-}2)$$

$$0.5 \leq |md/\sqrt{(f_w \times f_t)}| < 3.0 \quad (3\text{-}3).$$

Also, according to the present invention, the following condition is satisfied at least at one position in a zooming range:

$$0.2 < \theta i < 4.0 \quad (4\text{-}1)$$

where θi is an angle formed by an optical axis and the image pickup surface.

Condition (4-1) limits an angle made by the optical axis and the image pickup surface, to determine the condition for appropriately compensating for asymmetric curvature of field of the lens system. A value of θi smaller than the lower limit of Condition (4-1) causes undercompensation of asymmetric curvature of field, tilt of the image surface and the like, to make it difficult to attain the desired optical performance. On the other hand, a value of θi exceeding the upper limit of Condition (4-1) causes a great difference between the central light and marginal (in horizontal or vertical direction) light in incident angle. As a result, shading characteristic of the sensor differs between the center and the periphery thereof and thus attenuation of amount of light on the periphery in the horizontal or vertical direction becomes large, which phenomenon is not preferable.

If a value of θi satisfies either range specified below, asymmetric curvature of field and asymmetric peripheral attenuation of amount of light can be reduced in better condition:

$$0.2 < \theta i < 3.0 \quad (4\text{-}2)$$

$$0.2 < \theta i < 2.0 \quad (4\text{-}3)$$

Also, according to the present invention, a zoom optical system is configured to include at least one refracting surface that is formed as a rotationally asymmetric surface, or a free-formed surface.

It is impossible to completely prevent decentered aberrations from being generated at the deformable mirror in every zoom condition for every object distance. Therefore, by using another rotationally asymmetric surface, that is, a free-formed surface, as a compensator element for compensating for the decentered aberrations, very good imaging performance can be obtained.

Also, according to the present invention, a zoom optical system is configured to give each lens surface a shift for compensating for decentered aberrations caused by the deformable mirror, and satisfies the following condition:

$$0.001 \leq |\delta/\sqrt{(f_w \times f_t)}| < 0.5 \quad (5\text{-}1)$$

where δ is an amount of shift of the lens surface.

Condition (5-1) limits the amount of shift of a lens surface of the optical system, to determine the condition regarding the surface that has a largest amount of decentration in the optical system. If a value of $|\delta/\sqrt{(f_w \times f_t)}|$ falls below the lower limit of Condition (5-1), compensation for decentered aberrations cannot be achieved. On the other hand, if a value of $|\delta/\sqrt{(f_w \times f_t)}|$ exceeds the upper limit, the lens surface itself generates a large amount of decentered aberrations.

In addition, if the optical system is configured to satisfy the following condition, decentered aberrations can be compensated for more appropriately:

$$0.010 \leq |\delta/\sqrt{(f_w \times f_t)}| < 0.2 \quad (5\text{-}2)$$

Also, according to the present invention, a zoom optical system at least includes, in order from the object side, a first group having a negative power and being fixed in a magnification change, a second group having a positive power and being movable in a magnification change, and a third group movable in a magnification change, wherein the first group has a deformable mirror and satisfies the following condition:

$$-0.5 < f_{1a}/f_{1b} < -0.03 \quad (6\text{-}1)$$

where $f_{1a}$ is a power of a negative lens unit arranged on the object side of the deformable mirror (deformable element) in the first group, and $f_{1b}$ is a power of a positive lens unit disposed on the image side of the deformable mirror (deformable element) in the first group.

Condition (6-1) limits powers of lens units, in the first group, disposed before and after the deformable mirror.

Under the condition where the deformable mirror is manufactured by semiconductor processing, one with a smaller effective diameter can be produced at lower cost. Therefore, by designing a power of the negative lens unit disposed on the object side of the deformable mirror to be strong, the height of off-axial rays can be set low specifically at the wide-angle end. In this way, according to the present invention, since an area for rays incident on the deformable mirror can be made small, cost reduction can be achieved. If a value of $f_{1a}/f_{1b}$ falls below the lower limit of Condition (6-1), the power of the negative lens unit disposed on the object side of the deformable mirror becomes very weak. In this case, the height of off-axial rays cannot be made small at the wide-angle end. As a result, such a configuration causes bulkiness of the deformable mirror, fails to less generate decentered aberrations at the deformable mirror, and thus is not preferable. On the other hand, if the upper limit is exceeded, the deformable mirror can be made small. However, such a configuration makes it difficult to compensate for rotationally symmetric aberrations, particularly coma and chromatic aberration of magnification, and thus is not preferable.

In addition, a value of $f_{1a}/f_{1b}$ within either range specified below assures size reduction, cost reduction and good performance of the deformable element and thus is preferable;

$$-0.3 < f_{1a}/f_{1b} < -0.05 \quad (6\text{-}2)$$

$$-0.2 < f_{1a}/f_{1b} < -0.07 \quad (6\text{-}3)$$

Also, according to the present invention, in a zoom optical system, the second group mainly contributes to a magnification varying function, and the power of the second group satisfies the following condition:

$$0.5 < f_2/\sqrt{(f_w \times f_t)} < 5.0 \quad (7\text{-}1)$$

Condition (7-1) limits the focal length of the magnification varying group. A value of $f_2/\sqrt{(f_w \times f_t)}$ smaller than the lower limit of the condition signifies a short focal length. In this case, while it is necessary to enhance power of individual lenses in the second group, axial marginal rays in particular reach a high position and thus make it difficult to compensate for spherical aberration. In addition, such a configuration makes it difficult to compensate, inside the second group, for chromatic aberrations and accordingly causes large fluctuation of aberrations in accordance with a zooming operation. On the other hand, a value of $f_2/\sqrt{(f_w \times f_t)}$ exceeding the upper limit of the condition signifies a long focal length. Resultantly, the entire system cannot have a shortened length, to render the apparatus bulky.

In addition, satisfaction of either of the following conditions makes it possible to provide a small-sized, high-performance zoom optical system and thus is favorable:

$$1.0 < f_2/\sqrt{(f_w \times f_t)} < 4.0 \tag{7-2}$$

$$1.5 < f_2/\sqrt{(f_w \times f_t)} < 3.0 \tag{7-3}$$

Also, according to the present invention, a zoom optical system satisfies either or both of the following conditions:

$$0.2 < |\beta_{2W}| < 0.8 \tag{8-1}$$

$$0.5 < SD/f_w < 5.0 \tag{9-1}$$

where SD is a distance from the front-side principal point of the second group to the most object-side surface of the second group, and $\beta_{2W}$ is a magnification from the second group to a rearmost lens unit at the wide-angle end position.

Condition (8-1) limits the magnification. Condition (9-1) limits the position of the principal point of the second group. These are conditions for setting the total length of the optical system as short as possible.

For the purpose of simplifying the explanation, a two-group zoom lens is explained here. In a zooming using negative-positive two groups, the distance IO from the object to the image surface is given by:

$$IO = f_v(-\eta - (1/\eta) - 2)$$

where $f_v$ is a focal length of the variator and $\eta$ is a magnification of the variator. When $\eta = -1$, the total length of the zoom optical system becomes shortest. Therefore, it is desirable that the variator takes the magnification value of −1 at a position between the wide-angle end and the telephoto end. In this way, by setting the wide-angle end magnification in the range specified by Condition (8-1), a shortened total length of the zoom optical system can be achieved.

The equation set forth above shows that the total length of the zoom optical system can be shortened by decreasing the focal length $f_V$ of the variator. However, since the configuration of the zoom optical system according to the present invention requires a space for insertion of the deformable mirror and an air space between the first group and the second group for zooming, even if $f_V$ is merely reduced, it is difficult to relay and re-image, with a desired magnification using the magnification varying group, an object image (virtual image) formed by the first group. To solve this problem, the principal point of the magnification varying group can be arranged as much on the object side as possible by satisfying Condition (9-1). As a result, the focal length of the magnification varying group can be set small with a desired magnification, and accordingly a shortened total length can be achieved.

Also, by arranging the principal point as much on the object side as possible, the focal length of the second group can be shortened. In the ranges specified by Condition (8-1) and condition (9-1), compact sizing can be achieved.

Moreover, if the following conditions are satisfied, it is possible to provide a smaller-sized zoom lens with higher performance:

$$0.25 < |\beta_{2W}| < 0.6 \tag{8-2}$$

$$0.3 < |\beta_{2W}| < 0.5 \tag{8-3}$$

$$1.0 < SD/f_w < 4.0 \tag{9-2}$$

$$1.5 < SD/f_w < 3.0 \tag{9-3}$$

Also, according to the present invention, an imaging apparatus uses the zoom optical system set forth above. This application provides an imaging apparatus that can work with a very small number of movable lenses, with very low power consumption and low operation noise.

Regarding the type of zoom lens that uses a negative front lens group as set forth above, those configured to move the positive lens as the magnification varying group are in the main stream. This configuration can realize a wide-angle zoom lens. In addition, arranging the deformable mirror in the negative lens group allows the deformable mirror to be made small, and thus has merits for cost reduction etc. Alternatively, a zoom lens may be configured as a type having a positive front lens group. In this case, however, it is preferred that the negative lens group acts as the magnification varying group. This configuration can achieve a zoom lens with a high magnification ratio.

Also, the reflecting surface of the deformable mirror may be configured to have such a shape as to compensate for degradation of optical performance caused by fabrication error of lenses. This configuration can drastically reduce the number of defective products, to suppress fabrication cost.

Also, in a zooming operation, the stop surface (aperture stop) may be independently moved, to be positioned as close to the reflecting surface of the deformable mirror as possible this arrangement can reduce the effective diameter for rays of the reflecting surface of the deformable mirror and thus is preferable.

Also, the image pickup element may be arranged so that its short side is parallel with the direction of decentration of the reflecting surface of the deformable mirror. This arrangement can reduce the effective diameter for rays of the reflecting surface of the deformable mirror, as well as is advantageous in view of compensation for aberrations, and thus is desirable. On the other hand, in view of design convenience of digital camera etc, it is preferable that the long side of the image pickup element is parallel with the direction of decentration of the reflecting surface of the deformable mirror.

In addition, the zoom optical system may be configured so that the reflecting surface of the deformable mirror has a compensator function only, and pan-focus operation is performed via other lenses. This configuration is favorable in view of size reduction and cost reduction.

In reference to the drawings, description is made of the embodiments of the zoom optical system according to the present invention.

First, those matters commonly applied to all the embodiments are described. Each embodiment relates to a zoom optical system in which the deformable mirror has a focusing function. An image pickup element used in each embodiment on the image surface has a pixel pitch of 2.5 μm, 1600 pixels horizontally by 1200 pixels vertically, and a picture size of 3.0×4.0 mm.

In lens data, "ASP" signifies aspherical surface, "FFS" signifies free-formed surface, and "DM" signifies deformable mirror. Each of coefficients unlisted in data tables for aspherical surface, free-formed surface etc. has a value of zero. W, S, and T signify wide-angle end, intermediate state, and telephoto end, respectively. In a line of a variable space $D_i$ (i=1, 2, 3), values at the wide-angle end, the intermediate state, and the telephoto end are listed in this order. Regarding refractive index and Abbe's number, values for d-line rays (wavelength 587.56 nm) are listed. A length is expressed in millimeters, and an angle is expressed in degrees. In addition, in each embodiment, two plane parallel plates are inserted on the most image side. These area cover glass of an image pickup element, an infrared cutoff filter, and a low pass filter.

In each embodiment, Z axis of the coordinate system in reference to the object surface is defined by a straight line that is perpendicular to the object surface. A direction that intersects Z axis at right angles is defined as a direction of Y axis, and an axis that forms a right-hand system along with Y axis and Z axis is defined as X axis.

A surface decentration is determined by shift (expressed by X, Y, and Z for components in X-axis direction, Y-axis direction, and Z-axis direction, respectively) of the vertex position of the surface from the origin of the reference coordinate system and tilt (expressed by α, β, and γ in degrees) of the center axis of the surface in reference to X axis, Y axis and Z axis. When the kth surface is subject to decentration, the origin of the coordinate system as a reference for decentration is determined as a point to which the vertex position of the (k−1)th surface is shifted in Z-axis direction by the surface separation. Decentration is operated in the order of X shift, Y shift, Z shift, α tilt, β tilt, and γ tilt. In this case, a positive value of α or β means counterclockwise rotation in reference to the positive direction of the corresponding axis, while a positive value of γ means clockwise rotation in reference to the positive direction of Z axis.

In the following embodiments, decentration includes two types; Decenter-And-Return (hereafter referred to DAR) and DEcenter-Only (hereafter referred to DEO). In decentration by DAR, if the kth surface is decentered, coordinate systems on and after the (k+1)th surface coincide with the coordinate system of the (k−1)th surface. The vertex position of the (k+1)th surface is defined as a point shifted from the vertex position of the (k−1)th surface by the surface separation in the Z-axis direction. On the other hand, in the case of DEO, if the kth surface is decentered, coordinate systems on or after the (k+1) th surface coincide with the coordinate system of the kth surface after decentration. The vertex position of the (k+1)th surface is defined as a point shifted from the vertex position of the kth surface after decentration by the surface separation in the Z-axis direction.

The shape data of a deformable mirror specifies the shapes in the states where the object distance is at infinity and at proximity, respectively, and, in addition, the shapes at the limits of deformation (far point margin and near point margin), for the contrast method is used for focusing.

The deformable mirror is deformable from a predetermined first state to a second state where the zoom optical system is focused on an object that is placed at the infinity, from the second state to a third state where the zoom optical system is focused on an object that is placed at the proximity, and from the third state to a predetermined fourth state that is different from the first state. In accordance with the deformation, the image surface (the position of the image of the object) also is shifted in such a manner as to satisfy Condition (2-1). Condition (2-1) limits the amount of shift Zf of the image surface at the wide-angle end, because shift of the image surface is large at the wide angle end. FIG. 1 illustrates relationship between the first through fourth states and the amount of deformation of a reflecting surface (dimensions: ellipse of 10×7 mm) of a deformable mirror, using a threefold zoom lens as an example. Here, the amount of deformation of the reflecting surface is taken along the abscissa. Also, (T) denotes the telephoto condition, (S) denotes the intermediate condition, and (W) denotes the wide-angle end condition. Under each zoom condition, the first state corresponds to the planar-shape state of the reflecting surface, the second state corresponds to the amount of deformation where the zoom lens is focused on an object placed at the infinity, the third state corresponds to the amount of deformation where the zoom lens is focused on an object placed at the proximity, and the fourth state corresponds to the maximum amount of deformation, which is required for detecting the contrast of the object placed at the proximity.

A free-formed surface used in the present invention is defined by the following equation (a) where Z axis appearing therein is the axis of the free-formed surface:

$$Z = cr^2 / \{1 + \sqrt{1-(1+k)c^2r^2}\} + \sum_{j=2}^{M} c_j X^m Y^n \qquad (a)$$

The first term of Equation (a) expresses the spherical surface component. The second term of Equation (a) expresses the free-formed surface component. In the term of the spherical surface component, c represents a curvature at the vertex, k represents a conic constant, and $r=\sqrt{X^2+Y^2}$.

The term of the free-formed surface component is expanded as shown in the following equation:

$$\sum_{j=2}^{M} C_j X^m Y^n = C_2 X + C_3 Y + C_4 X^2 + C_5 XY + C_6 Y^2 + C_7 X^3 + C_8 X^2 Y +$$
$$C_9 XY^2 + C_{10} Y^3 + C_{11} X^4 + C_{12} X^3 Y + C_{13} X^2 Y^2 +$$
$$C_{14} XY^3 + C_{15} Y^4 + C_{16} X^5 + C_{17} X^4 Y + C_{18} X^3 Y^2 +$$
$$C_{19} X^2 Y^3 + C_{20} XY^4 + C_{21} Y^5 + C_{22} X^6 + C_{23} X^5 Y +$$
$$C_{24} X^4 Y^2 + C_{25} X^3 Y^3 + C_{26} X^2 Y^4 + C_{27} XY^5 + C_{28} Y^6 +$$
$$C_{29} X^7 + C_{30} X^6 Y + C_{31} X^5 Y^2 + C_{32} X^4 Y^3 + C_{33} X^3 Y^4 +$$
$$C_{34} X^2 Y^5 + C_{35} XY^6 + C_{36} Y^7$$

where $C_j$ (j is integer equal to or greater than 2) is a coefficient.

In general, a free-formed surface as expressed above does not have a plane of symmetry along X-Z plane or along Y-Z plane. However, upon all terms with odd-numbered powers of X being nullified, the free-formed surface can define only one plane of symmetry that is parallel to Y-Z plane.

An aspherical surface used in the present invention is defined by the following equation:

$$Z=(Y^2/r)/[1+\{1-(1+k)\cdot(Y/r)^2\}^{1/2}]+aY^4+bY^6+cY^8+dY^{10} \ldots$$

where Z is taken along the optical axis, Y is taken along a direction perpendicular to the optical axis, r is a radius of paraxial curvature, k is a conical coefficient, and a, b, c, and d are aspherical coefficients.

First Embodiment

As shown in FIGS. 2A–2C, a zoom optical system according to the first embodiment of the present invention is a twofold zoom optical system including, in order from the object side, a first group G1 having a negative power, a second group G2 having a positive power, and a third group G3 having a positive power. Zooming is made by moving the second group G2 and the third group G3 while keeping the first group G1 fixed, defocused condition caused thereby being compensated for by deforming the reflecting surface of the deformable mirror M disposed in the first group G1.

Also, this zoom optical system is designed so that the focal length is 4.42–8.85, the open F-number is 2.8–4.7, the photographing proximity is 300, and the image surface (image pickup element) is tilted in reference to the optical axis.

In FIGS. 2A–2C, the object surface is not shown. The distances d1, d3–d8, which are measured from the reference surfaces, are not shown, either.

FIGS. 3A–3L through FIGS. 8A–8L show lateral aberrations for several wavelength regions of the zoom optical system according to this embodiment. FIGS. 3A–3L are lateral aberration diagrams in the wide-angle end condition in the case where the object distance is infinite. FIGS. 4A–4L are lateral aberration diagrams in the intermediate condition in the case where the object distance is infinite. FIGS. 5A–5L are lateral aberration diagrams in the telephoto end condition in the case where the object distance is infinite. FIGS. 6A–6L are lateral aberration diagrams in the wide-angle end condition in the case where the object distance is 300 mm. FIGS. 7A–7L are lateral aberration diagrams in the intermediate condition in the case where the object distance is 300 mm. FIGS. 8A–8L are lateral aberration diagrams in the telephoto end condition in the case where the object distance is 300 mm.

Of these diagrams, each of FIGS. 3A, 4A, 5A, 6A, 7A and 8A shows a Y-direction lateral aberration of a chief ray that traverses a point where X-direction field angle is zero and Y-direction field angle is zero; each of FIGS. 3B, 4B, 5B, 6B, 7B and 8B shows an X-direction lateral aberration of the chief ray that traverses the point where X-direction field angle is zero and Y-direction field angle is zero; each of FIGS. 3C, 4C, 5C, 6C, 7C and 8C shows Y-direction lateral aberration of a chief ray that traverses a point where X-direction field angle is zero and Y-direction field angle is extreme in negative direction; each of FIGS. 3D, 4D, 5D, 6D, 7D and 8D shows X-direction lateral aberration of the chief ray that traverses the point where X-direction field angle is zero and Y-direction field angle is extreme in negative direction; each of FIGS. 3E, 4E, 5E, 6E, 7E and 8E shows Y-direction lateral aberration of a chief ray that traverses a point where X-direction field angle is extreme in positive direction and Y-direction field angle is extreme in negative direction; each of FIGS. 3F, 4F, 5F, 6F, 7F and 8F shows X-direction lateral aberration of the chief ray that traverses the point where X-direction field angle is extreme in positive direction and Y-direction field angle is extreme in negative direction; each of FIGS. 3G, 4G, 5G, 6G, 7G and 8G shows Y-direction lateral aberration of a chief ray that traverses a point where X-direction field angle is extreme in positive direction and Y-direction field angle is zero; each of FIGS. 3H, 4H, 5H, 6H, 7H and 8H shows X-direction lateral aberration of the chief ray that traverses the point where X-direction field angle is extreme in positive direction and Y-direction field angle is zero; each of FIGS. 3I, 4I, 5I, 6I, 7I and 8I shows Y-direction lateral aberration of a chief ray that traverses a point where X-direction field angle is extreme in positive direction and Y-direction field angle is extreme in positive direction; each of FIGS. 3J, 4J, 5J, 6J, 7J and 8J shows X-direction lateral aberration of the chief ray that traverses the point where X-direction field angle is extreme in positive direction and Y-direction field angle is extreme in positive direction; each of FIGS. 3K, 4K, 5K, 6K, 7K and 8K shows Y-direction lateral aberration of a chief ray that traverses a point where X-direction field angle is zero and Y-direction field angle is extreme in positive direction; and each of FIGS. 3L, 4L, 5L, 6L, 7L and 8L shows X-direction lateral aberration of the chief ray that traverses the point where X-direction field angle is zero and Y-direction field angle is extreme in positive direction.

Numerical data of the first embodiment are shown below.

| Surface Number | Radius of Curvature | Surface Separation | Decentration | Refractive Index | Abbe's Number |
|---|---|---|---|---|---|
| object surface | ∞ | ∞ | | | |
| 1 | ∞ (ref. surface 1) | 0.00 | | | |
| 2 | −81.296 | 2.00 | decentration(1) | 1.8147 | 37.0 |
| 3 | ASP[1] | rtn to ref. surface 1 | | | |
| 4 | ∞ (ref. surface 1) | 9.20 | | | |
| 5 | ∞ (ref. surface 2) | 0.00 | decentration(2) | | |
| 6 | DM[1] | rtn to ref. surface 2 | | | |
| 7 | ∞ (ref. surface 2) | 0.00 | | | |
| 8 | ∞ (ref. surface 3) | 5.50 | decentration(3) | | |
| 9 | 64.675 | 2.50 | decentration(4) | 1.8467 | 23.8 |
| 10 | −59.724 | D1 | decentration(4) | | |
| 11 | stop surface | 1.00 | decentration(5) | | |
| 12 | ASP[2] | 2.00 | decentration(5) | 1.7433 | 49.3 |
| 13 | 23.653 | 2.67 | decentration(5) | | |
| 14 | 13.149 | 2.50 | decentration(5) | 1.4970 | 81.6 |
| 15 | −4.824 | 1.80 | decentration(5) | 1.8052 | 25.4 |
| 16 | ASP[3] | D2 | decentration(5) | | |
| 17 | −8.260 | 1.38 | decentration(5) | 1.7859 | 44.2 |
| 18 | −15.127 | 1.00 | decentration(5) | | |
| 19 | 9.062 | 3.32 | decentration(5) | 1.5831 | 59.4 |
| 20 | ASP[4] | D3 | decentration(5) | | |
| 21 | ∞ | 1.00 | | 1.5477 | 62.8 |
| 22 | ∞ | 0.50 | | | |
| 23 | ∞ | 0.50 | decentration(6) | 1.5163 | 64.1 |

-continued

| 24 | ∞ | 0.50 |
| image surface | ∞ | 0.00 |

ASP[1]

Radius of curvature 5.563  
$a = -8.8887 \times 10^{-4}$  
$c = -5.3507 \times 10^{-7}$  
$k = 0.0000 \times 10^{0}$  
$b = -6.5743 \times 10^{-6}$  
$d = 3.5511 \times 10^{-10}$

ASP[2]

Radius of curvature 6.487  
$a = 5.2358 \times 10^{-4}$  
$c = 2.7222 \times 10^{-8}$  
$k = -1.1863 \times 10^{0}$  
$b = 5.9510 \times 10^{-6}$  
$d = 5.3043 \times 10^{-9}$

ASP[3]

Radius of curvature 12.386  
$a = 1.2905 \times 10^{-3}$  
$c = -2.6076 \times 10^{-6}$  
$k = 0.0000 \times 10^{0}$  
$b = 5.2343 \times 10^{-5}$  
$d = 3.0305 \times 10^{-7}$

ASP[4]

Radius of curvature -10.680  
$a = 8.2570 \times 10^{-4}$  
$c = 2.7602 \times 10^{-7}$  
$k = 1.8193 \times 10^{0}$  
$b = -3.7866 \times 10^{-6}$  
$d = -4.1272 \times 10^{-9}$

[DM1]

| | W far point margin W300 mm | S far point margin S300 mm | T far point margin T300 mm | W∞ W near point margin | S∞ S near point margin | T∞ T near point margin |
|---|---|---|---|---|---|---|
| C4 | 0.000 | 0.000 | 0.000 | $-0.2583 \times 10^{-3}$ | $-0.1716 \times 10^{-3}$ | $-0.9456 \times 10^{-4}$ |
|    | $-0.4924 \times 10^{-3}$ | $-4066 \times 10^{-3}$ | $-0.3336 \times 10^{-3}$ | $-0.7730 \times 10^{-3}$ | $-0.5690 \times 10^{-3}$ | $-0.4302 \times 10^{-3}$ |
| C6 | 0.000 | 0.000 | 0.000 | $-0.1348 \times 10^{-3}$ | $-0.8671 \times 10^{-4}$ | $-0.4806 \times 10^{-4}$ |
|    | $-0.2575 \times 10^{-3}$ | $-0.2107 \times 10^{-3}$ | $0.1756 \times 10^{-3}$ | $0.4054 \times 10^{-3}$ | $-0.2980 \times 10^{-3}$ | $-0.2274 \times 10^{-3}$ |
| C8 | 0.000 | 0.000 | 0.000 | $-0.7347 \times 10^{-5}$ | $-0.2751 \times 10^{-5}$ | $-0.3118 \times 10^{-5}$ |
|    | $-0.1601 \times 10^{-4}$ | $0.1275 \times 10^{-4}$ | $-0.1574 \times 10^{-4}$ | $-0.2758 \times 10^{-4}$ | $-0.2201 \times 10^{-4}$ | $-0.2120 \times 10^{-4}$ |
| C10 | 0.000 | 0.000 | 0.000 | $-0.4714 \times 10^{-5}$ | $-0.1823 \times 10^{-5}$ | $-0.1274 \times 10^{-5}$ |
|    | $-0.1076 \times 10^{-4}$ | $-0.9004 \times 10^{-5}$ | $-0.9750 \times 10^{-5}$ | $-0.1952 \times 10^{-4}$ | $-0.1506 \times 10^{-4}$ | $-0.1308 \times 10^{-4}$ |
| C11 | 0.000 | 0.000 | 0.000 | $-0.2388 \times 10^{-5}$ | $0.2118 \times 10^{-5}$ | $0.2098 \times 10^{-6}$ |
|    | $-0.3384 \times 10^{-5}$ | $0.7650 \times 10^{-6}$ | $-0.7970 \times 10^{-6}$ | $-0.4259 \times 10^{-5}$ | $-0.1772 \times 10^{-6}$ | $-0.8507 \times 10^{-6}$ |
| C13 | 0.000 | 0.000 | 0.000 | $-0.1119 \times 10^{-5}$ | $0.2638 \times 10^{-5}$ | $0.9920 \times 10^{-7}$ |
|    | $-0.2393 \times 10^{-5}$ | $0.8904 \times 10^{-6}$ | $-0.1501 \times 10^{-5}$ | $-0.3884 \times 10^{-5}$ | $-0.7166 \times 10^{-6}$ | $-0.1868 \times 10^{-5}$ |
| C15 | 0.000 | 0.000 | 0.000 | $-0.6459 \times 10^{-6}$ | $0.3842 \times 10^{-6}$ | $0.5763 \times 10^{-7}$ |
|    | $-0.1132 \times 10^{-5}$ | $-0.2843 \times 10^{-6}$ | $-0.6338 \times 10^{-6}$ | $-0.1764 \times 10^{-5}$ | $-0.8075 \times 10^{-6}$ | $-0.8207 \times 10^{-6}$ |
| Y | 0.000 | 0.000 | 0.000 | 0.245 | 0.197 | 0.223 |
|   | 0.298 | 0.334 | 0.410 | 0.345 | 0.382 | 0.426 |
| Z | 0.0000 | 0.0000 | 0.0000 | 0.0035 | 0.0018 | 0.0011 |
|   | 0.0065 | 0.0048 | 0.0042 | 0.0100 | 0.0069 | 0.0053 |

Decentration[1] (DEO)

X 0.000  Y 0.341  Z 0.000  
α 0.000  β 0.000  γ 0.000

Decentration[2] (DEO)

X 0.000  Y 0.362  Z 0.000  
α 45.000  β 0.000  γ 0.000

Decentration[3] (DEO)

X 0.000  Y 0.000  Z 0.000  
α 45.000  β 0.000  γ 0.000

Decentration[4] (DAR)

X 0.000  Y -0.038  Z 0.000  
α 0.000  β 0.000  γ 0.000

Decentration[5] (DAR)

X 0.000  Y 0.013  Z 0.000  
α 0.000  β 0.000  γ 0.000

Decentration[6] (DEO)

X 0.000  Y 0.018  Z 0.000  
α -0.31  β 0.000  γ 0.000

-continued

|    | W      | S     | T      |
|----|--------|-------|--------|
| D1 | 10.941 | 6.539 | 2.000  |
| D2 | 2.459  | 7.894 | 13.343 |
| D3 | 3.940  | 2.910 | 2.000  |

Second Embodiment

Figure 9B:
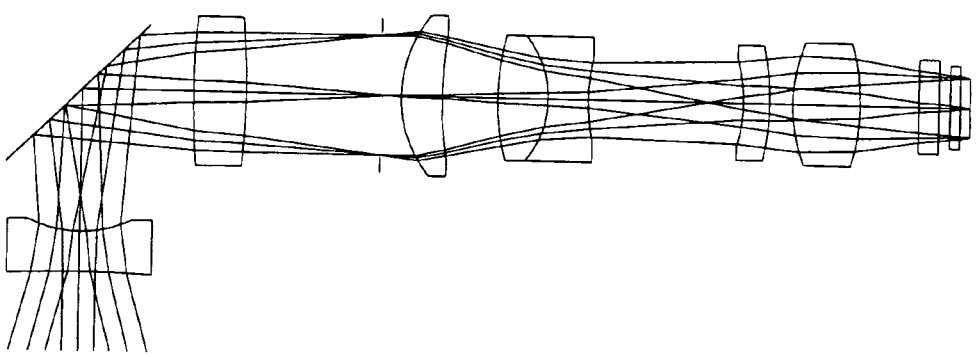
Figure 9A:
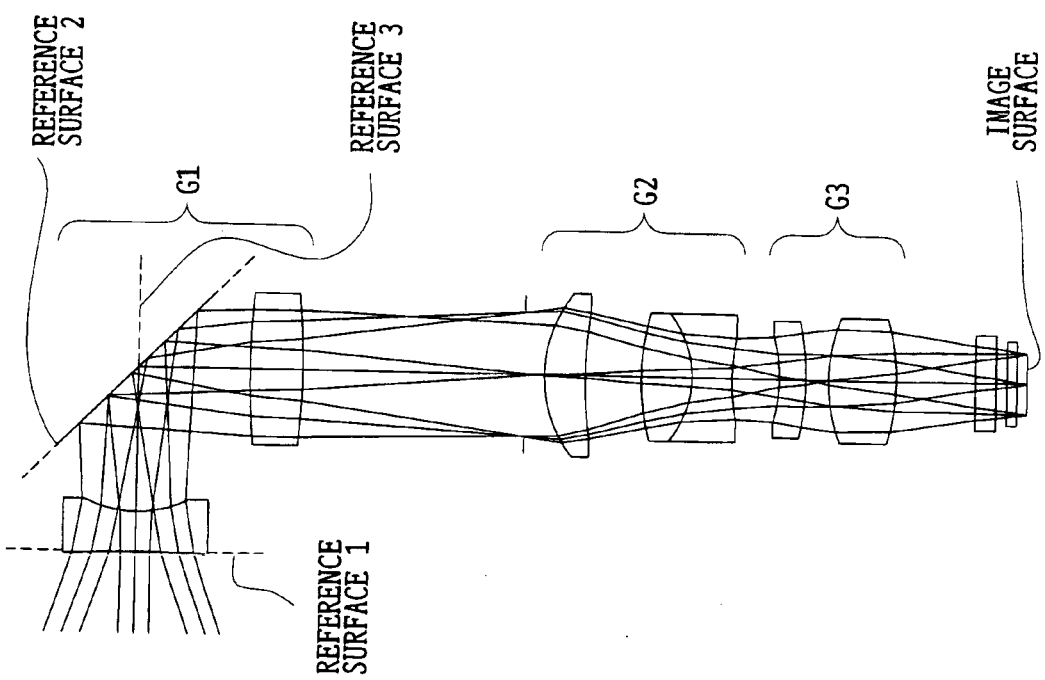
Figure 11C:
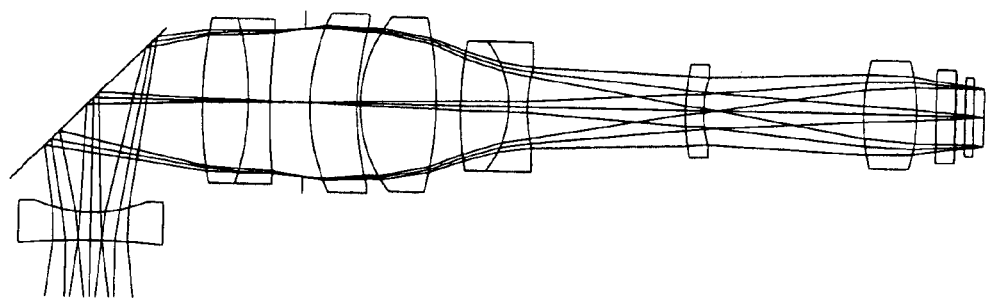
FIGS. 11A–11C are sectional views that show the lens configuration of a zoom optical system according to the fourth embodiment of the present invention, taken along the optical axis. Specifically.
Figure 11B:
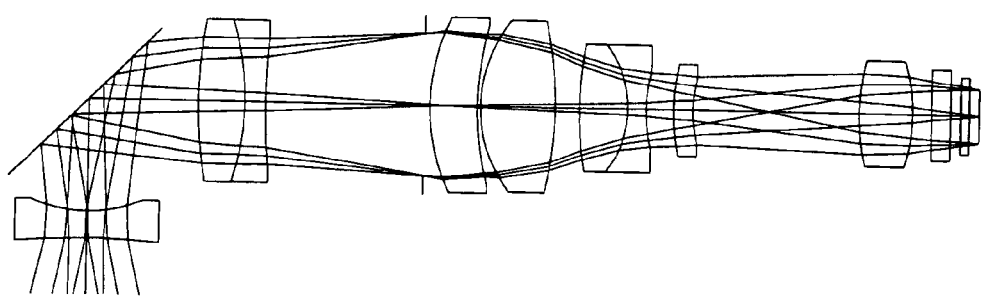
Figure 11A:
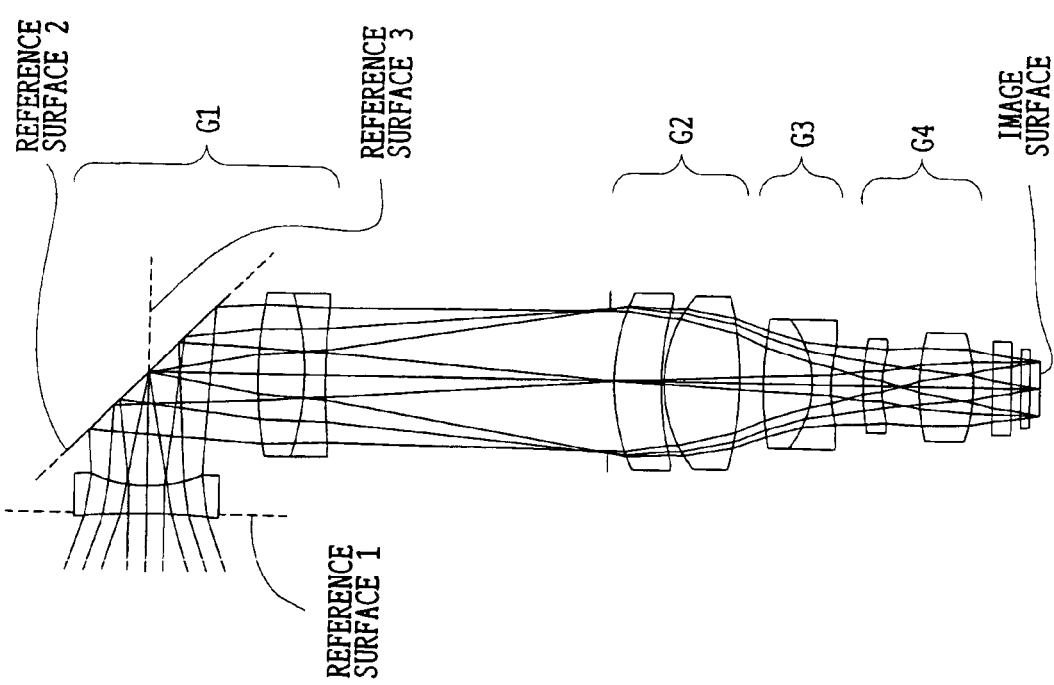

As shown in FIGS. 9A–9C, a zoom optical system according to the second embodiment of the present invention is a twofold zoom optical system including, in order from the object side, a first group G1 having a negative power, a second group G2 having a positive power, and a third group G3 having a positive power. Zooming is made by moving the second group G2 and the third group G3 while keeping the first group G1 fixed, defocused condition caused thereby being compensated for by deforming the reflecting surface of the deformable mirror M disposed in the first group G1.

Also, this zoom optical system is designed so that the focal length is 4.43–8.86, the open F-number is 2.8–4.7, the photographing proximity is 180, and the image surface (image pickup element) is tilted in reference to the optical axis. It is noted that the deformable mirror is not designed to cause 90-degree reflection.

Numerical data of the second embodiment are shown below.

| Surface Number | Radius of Curvature | Surface Separation | Decentration | Refractive Index | Abbe's Number |
|---|---|---|---|---|---|
| object surface | ∞ | ∞ | | | |
| 1 | ∞ (ref. surface 1) | 0.00 | | | |
| 2 | −86.524 | 2.00 | decentration(1) | 1.8147 | 37.0 |
| 3 | ASP[1] | rtn to ref. surface 1 | decentration(2) | | |
| 4 | ∞ (ref. surface 1) | 9.06 | | | |
| 5 | ∞ (ref. surface 2) | 0.00 | decentration(3) | | |
| 6 | DM[1] | rtn to ref. surface 2 | | | |
| 7 | ∞ (ref. surface 2) | 0.00 | | | |
| 8 | ∞ (ref. surface 3) | 5.50 | decentration(4) | | |
| 9 | 64.435 | 2.50 | decentration(5) | 1.8467 | 23.8 |
| 10 | −60.009 | D1 | decentration(5) | | |
| 11 | stop surface | 1.00 | decentration(6) | | |
| 12 | ASP[2] | 2.00 | decentration(6) | 1.7433 | 49.3 |
| 13 | 24.009 | 2.70 | decentration(6) | | |
| 14 | 13.460 | 2.50 | decentration(6) | 1.4970 | 81.6 |
| 15 | −4.863 | 1.98 | decentration(6) | 1.8052 | 25.4 |
| 16 | ASP[3] | D2 | decentration(6) | | |
| 17 | −8.109 | 1.29 | decentration(6) | 1.7859 | 44.2 |
| 18 | −14.573 | 1.12 | decentration(6) | | |
| 19 | 9.213 | 3.29 | decentration(6) | 1.5831 | 59.4 |
| 20 | ASP[4] | D3 | decentration(6) | | |
| 21 | ∞ | 1.00 | | 1.5477 | 62.8 |
| 22 | ∞ | 0.50 | | | |
| 23 | ∞ | 0.50 | decentration(7) | 1.5163 | 64.1 |
| 24 | ∞ | 0.50 | | | |
| image surface | ∞ | 0.00 | | | |

ASP[1]

Radius of curvature 5.536
$a = -9.0378 \times 10^{-4}$
$c = -5.2670 \times 10 \times 10^{-7}$
$k = 0.0000 \times 10^0$
$b = -7.1381 \times 10^{-6}$
$d = -2.1534 \times 10^{-10}$

ASP[2]

Radius of curvature 6.541
$a = 5.1087 \times 10^{-4}$
$c = 8.9890 \times 10^{-9}$
$k = -1.1917 \times 10^0$
$b = 5.8677 \times 10^{-6}$
$d = 5.5888 \times 10^{-9}$

ASP[3]

Radius of curvature 12.966
$a = 1.2692 \times 10^{-3}$
$c = 1.2496 \times 10^{-6}$
$k = 0.0000 \times 10^0$
$b = 4.6407 \times 10^{-5}$
$d = 1.6239 \times 10^{-7}$ -continued

ASP[4]

Radius of curvature −10.467  
$a = 8.5068 \times 10^{-4}$  
$c = 2.7477 \times 10^{-7}$  
$k = 1.8389 \times 10^{0}$  
$b = -3.4378 \times 10^{-6}$  
$d = -3.4931 \times 10^{-9}$

[DM1]

| | W far point margin W300 mm | S far point margin S300 mm | T far point margin T300 mm | W∞ W near point margin | S∞ S near point margin | T∞ T near point margin |
|---|---|---|---|---|---|---|
| C4 | 0.000 | 0.000 | 0.000 | $-0.2668 \times 10^{-3}$ | $-0.1821 \times 10^{-3}$ | $-0.1023 \times 10^{-3}$ |
|    | $-0.6616 \times 10^{-3}$ | $-0.5798 \times 10^{-3}$ | $-0.5067 \times 10^{-3}$ | $-0.9485 \times 10^{-3}$ | $-0.7466 \times 10^{-3}$ | $-0.6062 \times 10^{-3}$ |
| C6 | 0.000 | 0.000 | 0.000 | $-0.1361 \times 10^{-3}$ | $-0.9046 \times 10^{-4}$ | $-0.5153 \times 10^{-4}$ |
|    | $0.3392 \times 10^{-3}$ | $-0.2960 \times 10^{-3}$ | $-0.2623 \times 10^{-3}$ | $-0.4867 \times 10^{-3}$ | $-0.3842 \times 10^{-3}$ | $-0.3148 \times 10^{-3}$ |
| C8 | 0.000 | 0.000 | 0.000 | $-0.1207 \times 10^{-4}$ | $-0.5077 \times 10^{-5}$ | $-0.4541 \times 10^{-5}$ |
|    | $-0.2539 \times 10^{-4}$ | $-0.2267 \times 10^{-4}$ | $-0.2643 \times 10^{-4}$ | $-0.3774 \times 10^{-4}$ | $-0.3270 \times 10^{-4}$ | $-0.3204 \times 10^{-4}$ |
| C10 | 0.000 | 0.000 | 0.000 | $-0.6540 \times 10^{-5}$ | $-0.3129 \times 10^{-5}$ | $-0.2446 \times 10^{-5}$ |
|     | $-0.1452 \times 10^{-4}$ | $-0.1320 \times 10^{-4}$ | $-0.1392 \times 10^{-4}$ | $-0.2343 \times 10^{-4}$ | $-0.1877 \times 10^{-4}$ | $-0.1687 \times 10^{-4}$ |
| C11 | 0.000 | 0.000 | 0.000 | $-0.2849 \times 10^{-5}$ | $0.2341 \times 10^{-5}$ | $0.8283 \times 10^{-6}$ |
|     | $-0.4785 \times 10^{-5}$ | $-0.1303 \times 10^{-6}$ | $-0.1234 \times 10^{-5}$ | $-0.5849 \times 10^{-5}$ | $0.1109 \times 10^{-5}$ | $-0.1248 \times 10^{-5}$ |
| C13 | 0.000 | 0.000 | 0.000 | $-0.1837 \times 10^{-5}$ | $0.2429 \times 10^{-5}$ | $0.1320 \times 10^{-6}$ |
|     | $-0.4000 \times 10^{-5}$ | $-0.4138 \times 10^{-6}$ | $-0.2346 \times 10^{-5}$ | $-0.5456 \times 10^{-5}$ | $-0.1980 \times 10^{-5}$ | $-0.2600 \times 10^{-5}$ |
| C15 | 0.000 | 0.000 | 0.000 | $-0.7730 \times 10^{-6}$ | $0.2457 \times 10^{-6}$ | $-0.5556 \times 10^{-7}$ |
|     | $-0.1423 \times 10^{-5}$ | $-0.5619 \times 10^{-6}$ | $-0.7517 \times 10^{-6}$ | $0.2236 \times 10^{-5}$ | $0.9590 \times 10^{-6}$ | $-0.8499 \times 10^{-6}$ |
| Y | 0.000 | 0.000 | 0.000 | 0.332 | 0.309 | 0.377 |
|   | 0.307 | 0.344 | 0.400 | 0.343 | 0.371 | 0.406 |
| Z | 0.0000 | 0.0000 | 0.0000 | 0.0037 | 0.0019 | 0.0011 |
|   | 0.0088 | 0.0071 | 0.0063 | 0.0124 | 0.0092 | 0.0075 |

Decentration[1] (DEO)

X 0.000  Y 0.443  Z 0.000  
α 0.000  β 0.000  γ 0.000

Decentration[2] (DAR)

X 0.000  Y 0.000  Z 0.000  
α −0.737  β 0.000  γ 0.000

Decentration[3] (DEO)

X 0.000  Y 0.207  Z 0.000  
α 44.679  β 0.000  γ 0.000

Decentration[4] (DEO)

X 0.000  Y 0.000  Z 0.000  
α 45.000  β 0.000  γ 0.000

Decentration[5] (DAR)

X 0.000  Y 0.081  Z 0.000  
α 0.000  β 0.000  γ 0.000

Decentration[6] (DAR)

X 0.000  Y −0.085  Z 0.000  
α 0.000  β 0.000  γ 0.000

Decentration[7] (DEO)

X 0.000  Y −0.142  Z 0.000  
α −0.603  β 0.000  γ 0.000

| | W | S | T |
|---|---|---|---|
| D1 | 10.859 | 6.509 | 2.000 |
| D2 | 2.331 | 7.713 | 13.116 |
| D3 | 3.923 | 2.692 | 2.000 |

Third Embodiment

As shown in FIGS. 10A–10C, a zoom optical system according to the third embodiment of the present invention is a threefold zoom optical system including, in order from the object side, a first group G1 having a negative power, a second group G2 having a positive power, a third group G3 having a negative power, and a fourth group G4 having a positive power. Zooming is made by moving the second group G2 and the third group G3 while keeping the first group G1 and the fourth group G4 fixed, defocused condition caused thereby being compensated for by deforming the reflecting surface of the deformable mirror M disposed in the first group G1.

Also, this zoom optical system is designed so that the focal length is 4.43–13.31, the open F-number is 2.4–5.1, the photographing proximity is 180, and the image surface (image pickup element) is tilted in reference to the optical axis. It is noted that the deformable mirror is not designed to cause 90-degree reflection.

Numerical data of the third embodiment are shown below.

| Surface Number | Radius of Curvature | Surface Separation | Decentration | Refractive Index | Abbe's Number |
|---|---|---|---|---|---|
| object surface | ∞ | ∞ | | | |
| 1 | ∞ (ref. surface 1) | 0.00 | | | |
| 2 | −480.678 | 2.00 | decentration(1) | 1.8467 | 23.8 |
| 3 | ASP[1] | rtn to ref. surface 1 | | | |
| 4 | ∞ (ref. surface 1) | 9.01 | | | |
| 5 | ∞ (ref. surface 2) | 0.00 | decentration(2) | | |
| 6 | DM[1] | rtn to ref. surface 2 | | | |
| 7 | ∞ (ref. surface 2) | 0.00 | | | |
| 8 | ∞ (ref. surface 3) | 5.00 | decentration(3) | | |
| 9 | 33.245 | 1.20 | decentration(4) | 1.7725 | 49.6 |
| 10 | 10.904 | 2.00 | decentration(4) | 1.8467 | 23.8 |
| 11 | 49.354 | D1 | decentration(4) | | |
| 12 | ASP[2] | 3.89 | decentration(5) | 1.7433 | 49.3 |
| 13 | ASP[3] | 1.55 | decentration(5) | | |
| 14 | stop surface | 0.64 | decentration(5) | | |
| 15 | 9.438 | 3.26 | decentration(5) | 1.6180 | 63.3 |
| 16 | −4.775 | 1.25 | decentration(5) | 1.8467 | 23.8 |
| 17 | ASP[4] | D2 | decentration(5) | | |
| 18 | 14.561 | 1.00 | decentration(5) | 1.7725 | 49.6 |
| 19 | 7.788 | D3 | decentration(5) | | |
| 20 | ASP[5] | 2.75 | decentration(5) | 1.5831 | 59.4 |
| 21 | ASP[6] | 1.00 | decentration(5) | | |
| 22 | ∞ | 1.00 | | 1.5477 | 62.8 |
| 23 | ∞ | 0.50 | | | |
| 24 | ∞ | 0.50 | decentration(6) | 1.5163 | 64.1 |
| 25 | ∞ | 0.50 | | | |
| image surface | ∞ | 0.00 | | | |

ASP[1]

Radius of curvature 6.365
$a = -4.5300 \times 10^{-4}$
$c = 9.6476 \times 10^{-8}$
$k = 0.0000 \times 10^{0}$
$b = -9.1854 \times 10^{-6}$
$d = -6.9184 \times 10^{-9}$

ASP[2]

Radius of curvature 7.434
$a = -2.2815 \times 10^{-5}$
$c = 1.5231 \times 10^{-8}$
$k = 0.0000 \times 10^{0}$
$b = 1.7029 \times 10^{-7}$
$d = -1.2902 \times 10^{-9}$

ASP[3]

Radius of curvature 33.739
$a = 9.8091 \times 10^{-5}$
$c = -1.0176 \times 10^{-7}$
$k = 0.0000 \times 10^{0}$
$b = 2.2898 \times 10^{-6}$
$d = -2.3603 \times 10^{-9}$

ASP[4]

Radius of curvature 10.371
$a = 1.0165 \times 10^{-3}$
$c = 6.4627 \times 10^{-6}$
$k = 0.0000 \times 10^{0}$
$b = -1.5744 \times 10^{-6}$
$d = -5.9073 \times 10^{-7}$

ASP[5]

Radius of curvature 17.565
$a = -1.2595 \times 10^{-3}$
$c = -3.8294 \times 10^{-6}$
$k = 1.4245 \times 10^{1}$
$b = 4.1321 \times 10^{-5}$
$d = 1.2993 \times 10^{-7}$

ASP[6]

Radius of curvature −7.551
$a = -4.0966 \times 10^{-4}$
$c = -4.9017 \times 10^{-6}$
$k = -1.1203 \times 10^{0}$
$b = 6.6602 \times 10^{-5}$
$d = 1.7390 \times 10^{-7}$

[DM1]

| | W far point margin W300 mm | S far point margin S300 mm | T far point margin T300 mm | W∞ W near point margin | S∞ S near point margin | T∞ T near point margin |
|---|---|---|---|---|---|---|
| C4 | 0.000 | 0.000 | 0.000 | $0.2886 \times 10^{-3}$ | $-0.1091 \times 10^{-3}$ | $-0.5917 \times 10^{-4}$ |
|    | $-0.7463 \times 10^{-3}$ | $-0.5800 \times 10^{-3}$ | $-0.5376 \times 10^{-3}$ | $-0.1068 \times 10^{-2}$ | $-0.7096 \times 10^{-3}$ | $-0.5940 \times 10^{-3}$ |
| C6 | 0.000 | 0.000 | 0.000 | $-0.1440 \times 10^{-3}$ | $-0.5500 \times 10^{-4}$ | $-0.2951 \times 10^{-4}$ |
|    | $-0.3835 \times 10^{-3}$ | $-0.3045 \times 10^{-3}$ | $-0.2849 \times 10^{-3}$ | $-0.5495 \times 10^{-3}$ | $-0.3722 \times 10^{-3}$ | $-0.3142 \times 10^{-3}$ |
| C8 | 0.000 | 0.000 | 0.000 | $-0.2865 \times 10^{-5}$ | $-0.2772 \times 10^{-5}$ | $-0.2413 \times 10^{-6}$ |
|    | $-0.1906 \times 10^{-4}$ | $-0.2606 \times 10^{-4}$ | $0.2400 \times 10^{-3}$ | $-0.3112 \times 10^{-4}$ | $-0.3481 \times 10^{-4}$ | $-0.2703 \times 10^{-4}$ |
| C10 | 0.000 | 0.000 | 0.000 | $0.3788 \times 10^{-6}$ | $0.4124 \times 10^{-6}$ | $0.2948 \times 10^{-6}$ |
|     | $-0.9620 \times 10^{-5}$ | $-0.1372 \times 10^{-4}$ | $-0.1271 \times 10^{-4}$ | $-0.1559 \times 10^{-4}$ | $-0.1620 \times 10^{-4}$ | $-0.1402 \times 10^{-4}$ |

-continued

| | | | | | | |
|---|---|---|---|---|---|---|
| C11 | 0.000 | 0.000 | 0.000 | $0.1072 \times 10^{-5}$ | $-0.1510 \times 10^{-5}$ | $0.1329 \times 10^{-5}$ |
| | $-0.7490 \times 10^{-6}$ | $-0.3219 \times 10^{-5}$ | $0.6655 \times 10^{-6}$ | $-0.6148 \times 10^{-6}$ | $-0.3600 \times 10^{-5}$ | $0.9372 \times 10^{-6}$ |
| C13 | 0.000 | 0.000 | 0.000 | $0.1514 \times 10^{-5}$ | $0.8893 \times 10^{-6}$ | $0.1528 \times 10^{-5}$ |
| | $-0.1072 \times 10^{-5}$ | $-0.3274 \times 10^{-5}$ | $-0.3317 \times 10^{-6}$ | $-0.1521 \times 10^{-5}$ | $-0.3848 \times 10^{-5}$ | $-0.1861 \times 10^{-6}$ |
| C15 | 0.000 | 0.000 | 0.000 | $0.4045 \times 10^{-6}$ | $-0.1298 \times 10^{-6}$ | $0.3634 \times 10^{-6}$ |
| | $-0.3002 \times 10^{-6}$ | $-0.1022 \times 10^{-5}$ | $0.2492 \times 10^{-6}$ | $-0.3548 \times 10^{-6}$ | $-0.1011 \times 10^{-5}$ | $-0.2566 \times 10^{-6}$ |
| Y | 0.000 | 0.000 | 0.000 | $-0.038$ | $-0.084$ | $-0.272$ |
| | 0.305 | 0.496 | 0.554 | 0.349 | 0.492 | 0.556 |
| Z | 0.0000 | 0.0000 | 0.0000 | 0.0054 | 0.0028 | 0.0007 |
| | 0.0153 | 0.0129 | 0.0104 | 0.0217 | 0.0156 | 0.0114 |

Decentration[1] (DEO)

| | | |
|---|---|---|
| X 0.000 | Y 0.022 | Z 0.000 |
| α −0.018 | β 0.000 | γ 0.000 |

Decentration[2] (DEO)

| | | |
|---|---|---|
| X 0.000 | Y 0.034 | Z 0.000 |
| α 45.065 | β 0.000 | γ 0.000 |

Decentration[3] (DEO)

| | | |
|---|---|---|
| X 0.000 | Y 0.000 | Z 0.000 |
| α 45.000 | β 0.000 | γ 0.000 |

Decentration[4] (DAR)

| | | |
|---|---|---|
| X 0.000 | Y −0.034 | Z 0.000 |
| α 0.000 | β 0.000 | γ 0.000 |

Decentration[5] (DAR)

| | | |
|---|---|---|
| X 0.000 | Y −0.020 | Z 0.000 |
| α 0.000 | β 0.000 | γ 0.000 |

Decentration[6] (DEO)

| | | |
|---|---|---|
| X 0.000 | Y −0.072 | Z 0.000 |
| α −0.670 | β 0.000 | γ 0.000 |

| | W | S | T |
|---|---|---|---|
| D1 | 15.417 | 8.809 | 2.000 |
| D2 | 2.366 | 2.012 | 8.716 |
| D3 | 2.105 | 9.071 | 9.176 |

Fourth Embodiment

As shown in FIGS. 1A–11C, a zoom optical system according to the fourth embodiment of the present invention is a threefold zoom optical system including, in order from the object side, a first group G1 having a negative power, a second group G2 having a positive power, a third group G3 having a negative power, and a fourth group G4 having a positive power. Zooming is made by moving the second group G2 and the third group G3 while keeping the first group G1 and the fourth group G4 fixed, defocused condition caused thereby being compensated for by deforming the reflecting surface of the deformable mirror M disposed in the first group G1.

Also, this zoom optical system is designed so that the focal length is 4.43–13.05, the open F-number is 2.4–4.9, the photographing proximity is 300, and the image surface (image pickup element) is tilted in reference to the optical axis.

Numerical data of the fourth embodiment are shown below.

| Surface Number | Radius of Curvature | Surface Separation | Decentration | Refractive Index | Abbe's Number |
|---|---|---|---|---|---|
| object surface | ∞ | ∞ | | | |
| 1 | ∞ (ref. surface 1) | 0.00 | | | |
| 2 | −47.743 | 1.50 | decentration(1) | 1.8211 | 24.1 |
| 3 | ASP[1] | rtn to ref. surface 1 | | | |
| 4 | ∞ (ref. surface 1) | 7.60 | | | |
| 5 | ∞ (ref. surface 2) | 0.00 | decentration(2) | | |
| 6 | DM[1] | rtn to ref. surface 2 | | | |
| 7 | ∞ (ref. surface 2) | 0.00 | | | |
| 8 | ∞ (ref. surface 3) | 5.78 | decentration(3) | | |
| 9 | 25.335 | 2.50 | decentration(4) | 1.8467 | 23.8 |
| 10 | −14.680 | 1.10 | decentration(4) | 1.8010 | 35.0 |
| 11 | 35.517 | D1 | decentration(4) | | |
| 12 | stop surface | 0.30 | decentration(5) | | |
| 13 | ASP[2] | 2.54 | decentration(5) | 1.7433 | 49.3 |

-continued

| | | | | | |
|---|---|---|---|---|---|
| 14 | ASP[3] | 0.15 | decentration(5) | | |
| 15 | 7.504 | 4.00 | decentration(5) | 1.4970 | 81.6 |
| 16 | −20.230 | 1.27 | decentration(5) | | |
| 17 | 21.832 | 2.58 | decentration(5) | 1.4970 | 81.6 |
| 18 | −5.453 | 1.01 | decentration(1) | 1.8211 | 24.1 |
| 19 | ASP[4] | D2 | decentration(5) | | |
| 20 | 14.345 | 1.00 | decentration(5) | 1.7725 | 49.6 |
| 21 | 7.807 | D3 | decentration(5) | | |
| 22 | 13.725 | 2.79 | decentration(6) | 1.5831 | 59.4 |
| 23 | ASP[5] | 1.00 | decentration(6) | | |
| 24 | ∞ | 1.00 | | 1.5477 | 62.8 |
| 25 | ∞ | 0.50 | | | |
| 26 | ∞ | 0.50 | decentration(7) | 1.5163 | 64.1 |
| 27 | ∞ | 0.50 | | | |
| image surface | ∞ | 0.00 | | | |

ASP[1]

Radius of curvature 6.887  
$a = -4.4013 \times 10^{-4}$  
$c = -1.9313 \times 10^{-7}$  
$k = 0.0000 \times 10^0$  
$b = -2.1659 \times 10^{-6}$  
$d = 2.9132 \times 10^{-9}$

ASP[2]

Radius of curvature 10.880  
$a = -9.7605 \times 10^{-6}$  
$c = -8.869 \times 10^{-8}$  
$k = 0.0000 \times 10^0$  
$b = -1.1227 \times 10^{-6}$  
$d = -3.8474 \times 10^{-10}$

ASP[3]

Radius of curvature 19.403  
$a = 1.3107 \times 10^{-4}$  
$c = -1.6542 \times 10^7$  
$k = 0.0000 \times 10^0$  
$b = -1.0519 \times 10^7$  
$d = 1.6633 \times 10^{-8}$

ASP[4]

Radius of curvature 10.476  
$a = 9.3990 \times 10^{-4}$  
$c = 3.1683 \times 10^6$  
$k = 0.0000 \times 10^0$  
$b = 1.8524 \times 10^{-4}$  
$d = -2.8955 \times 10^7$

ASP[5]

Radius of curvature −8.768  
$a = 1.1357 \times 10^3$  
$c = 2.5249 \times 10^6$  
$k = 0.0000 \times 10^0$  
$b = -5.0333 \times 10^5$  
$d = -6.2330 \times 10^8$

DM [1]

| | W far point margin W300 mm | S far point margin S300 mm | T far point margin T300 mm | W∞ W near point margin | S∞ S near point margin | T∞ T near point margin |
|---|---|---|---|---|---|---|
| C4 | 0.000 | 0.000 | 0.000 | $-0.4701 \times 10^{-3}$ | $-0.2019 \times 10^{-3}$ | $-0.1054 \times 10^{-3}$ |
| | $-0.7820 \times 10^{-3}$ | $-0.5219 \times 10^{-3}$ | $-0.4337 \times 10^{-3}$ | $-0.1289 \times 10^{-2}$ | $-0.7401 \times 10^{-3}$ | $-0.5308 \times 10^{-3}$ |
| C6 | 0.000 | 0.000 | 0.000 | $-0.2355 \times 10^{-3}$ | $-0.1028 \times 10^{-3}$ | $-0.5361 \times 10^{-4}$ |
| | $-0.3948 \times 10^{-3}$ | $-0.2754 \times 10^{-3}$ | $-0.2319 \times 10^{-3}$ | $-0.6608 \times 10^{-3}$ | $-0.3953 \times 10^{-3}$ | $-0.2847 \times 10^{-3}$ |
| C8 | 0.000 | 0.000 | 0.000 | $0.4917 \times 10^{-5}$ | $-0.6248 \times 10^{-5}$ | $-0.3485 \times 10^{-5}$ |
| | $-0.3790 \times 10^{-5}$ | $-0.2178 \times 10^{-4}$ | $-0.2184 \times 10^{-4}$ | $-0.1975 \times 10^{-4}$ | $-0.3588 \times 10^{-4}$ | $-0.2732 \times 10^{-4}$ |
| C10 | 0.000 | 0.000 | 0.000 | $0.1956 \times 10^{-5}$ | $-0.4002 \times 10^{-5}$ | $-0.1610 \times 10^{-5}$ |
| | $-0.3923 \times 10^{-5}$ | $-0.1362 \times 10^{-4}$ | $-0.1155 \times 10^{-4}$ | $-0.1676 \times 10^{-4}$ | $0.2142 \times 10^{-4}$ | $-0.1461 \times 10^{-4}$ |
| C11 | 0.000 | 0.000 | 0.000 | $-0.4932 \times 10^{-6}$ | $-0.2006 \times 10^{-5}$ | $0.1769 \times 10^{-5}$ |
| | $-0.1041 \times 10^{-5}$ | $-0.3461 \times 10^{-5}$ | $0.1253 \times 10^{-5}$ | $-0.1758 \times 10^{-5}$ | $-0.4222 \times 10^{-5}$ | $0.1272 \times 10^{-5}$ |
| C13 | 0.000 | 0.000 | 0.000 | $0.1960 \times 10^{-6}$ | $-0.1223 \times 10^{-5}$ | $0.1890 \times 10^{-5}$ |
| | $0.3321 \times 10^{-6}$ | $-0.1301 \times 10^{-5}$ | $0.1199 \times 10^{-5}$ | $0.1212 \times 10^{-5}$ | $-0.1299 \times 10^{-5}$ | $0.7590 \times 10^{-6}$ |
| C15 | 0.000 | 0.000 | 0.000 | $-0.6048 \times 10^{-7}$ | $-0.5001 \times 10^{-6}$ | $0.3751 \times 10^{-6}$ |
| | $-0.5046 \times 10^{-6}$ | $-0.9983 \times 10^{-6}$ | $0.1483 \times 10^{-7}$ | $-0.1026 \times 10^{-5}$ | $-0.1180 \times 10^{-5}$ | $-0.1628 \times 10^{-6}$ |
| C17 | 0.000 | 0.000 | 0.000 | $0.4701 \times 10^{-6}$ | $-0.1488 \times 10^{-6}$ | $0.2223 \times 10^{-6}$ |
| | $-0.8961 \times 10^{-6}$ | $-0.4215 \times 10^{-6}$ | $0.2954 \times 10^{-6}$ | $-0.1634 \times 10^{-5}$ | $-0.8806 \times 10^{-7}$ | $0.2643 \times 10^{-6}$ |
| C19 | 0.000 | 0.000 | 0.000 | $0.1035 \times 10^{-6}$ | $0.1271 \times 10^{-6}$ | $0.2083 \times 10^{-6}$ |
| | $0.4279 \times 10^{-6}$ | $0.6560 \times 10^{-6}$ | $0.3502 \times 10^{-6}$ | $0.1141 \times 10^{-5}$ | $0.1090 \times 10^{-5}$ | $0.2833 \times 10^{-6}$ |
| C21 | 0.000 | 0.000 | 0.000 | $-0.5516 \times 10^{-7}$ | $0.2286 \times 10^{-7}$ | $0.2540 \times 10^{-7}$ |
| | $-0.9944 \times 10^{-7}$ | $0.2876 \times 10^{-7}$ | $0.4060 \times 10^{-7}$ | $-0.9009 \times 10^{-7}$ | $0.8811 \times 10^{-7}$ | $0.3091 \times 10^{-7}$ |
| Y | 0.000 | 0.000 | 0.000 | −0.030 | 0.338 | 0.348 |
| | 0.192 | 0.508 | 0.588 | 0.340 | 0.541 | 0.613 |
| Z | 0.0000 | 0.0000 | 0.0000 | 0.0058 | 0.0028 | 0.0010 |
| | 0.0097 | 0.0068 | 0.0051 | 0.0160 | 0.0096 | 0.0062 |

-continued

Decentration[1] (DEO)

| | | |
|---|---|---|
| X 0.000 | Y 0.014 | Z 0.000 |
| α 0.000 | β 0.000 | γ 0.000 |

Decentration[2] (DEO)

| | | |
|---|---|---|
| X 0.000 | Y 0.000 | Z 0.000 |
| α 45.000 | β 0.000 | γ 0.000 |

Decentration[3] (DEO)

| | | |
|---|---|---|
| X 0.000 | Y 0.000 | Z 0.000 |
| α 45.000 | β 0.000 | γ 0.000 |

Decentration[4] (DAR)

| | | |
|---|---|---|
| X 0.000 | Y 0.010 | Z 0.000 |
| α 0.000 | β 0.000 | γ 0.000 |

Decentration[5] (DAR)

| | | |
|---|---|---|
| X 0.000 | Y −0.019 | Z 0.000 |
| α 0.000 | β 0.000 | γ 0.000 |

Decentration[6] (DAR)

| | | |
|---|---|---|
| X 0.000 | Y −0.164 | Z 0.000 |
| α 0.000 | β 0.000 | γ 0.000 |

Decentration[7] (DEO)

| | | |
|---|---|---|
| X 0.000 | Y −0.091 | Z 0.000 |
| α −0.907 | β 0.000 | γ 0.000 |

| | W | S | T |
|---|---|---|---|
| D1 | 14.919 | 8.321 | 1.800 |
| D2 | 1.702 | 1.500 | 8.485 |
| D3 | 2.000 | 8.804 | 8.342 |

Fifth Embodiment

Figure 12C:
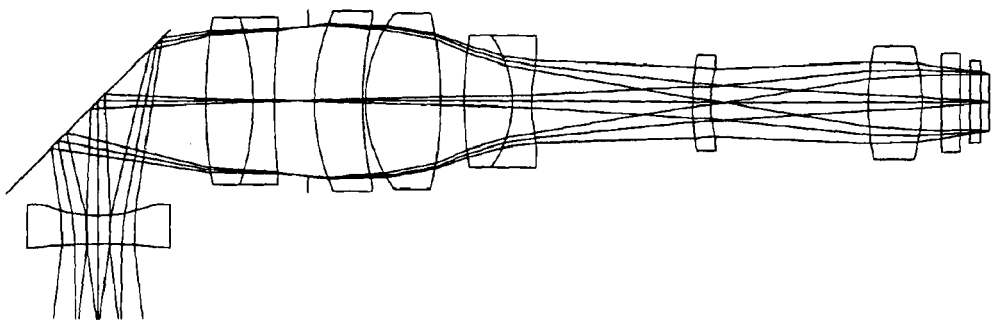
FIGS. 12A–12C are sectional views that show the lens configuration of a zoom optical system according to the fifth embodiment of the present invention, taken along the optical axis. Specifically.
Figure 12B:
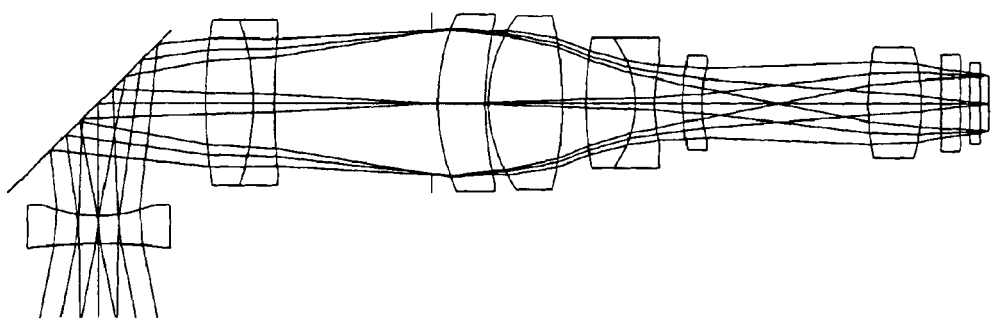
Figure 12A:
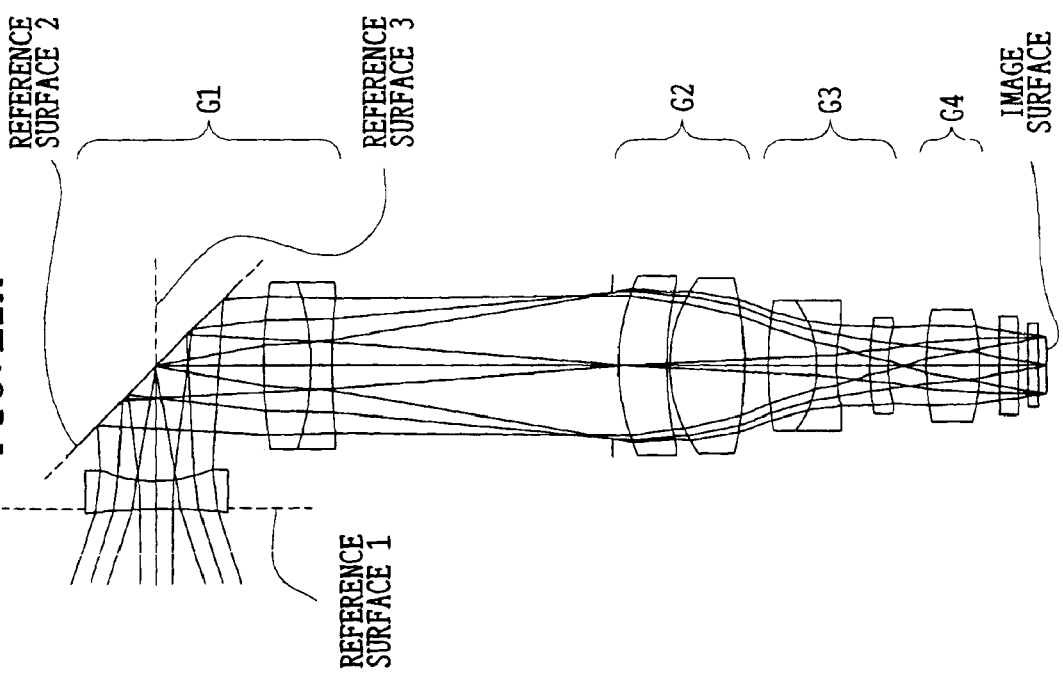

As shown in FIGS. 12A–12C, a zoom optical system according to the fifth embodiment of the present invention is a threefold zoom optical system including, in order from the object side, a first group G1 having a negative power, a second group G2 having a positive power, a third group G3 having a negative power, and a fourth group G4 having a positive power. Zooming is made by moving the second group G2 and the third group G3 while keeping the first group G1 and the fourth group G4 fixed, defocused condition caused thereby being compensated for by deforming the reflecting surface of the deformable mirror M disposed in the first group G1. Also, a free-formed surface is used in the first lens.

Also, this zoom optical system is designed so that the focal length is 4.42–13.16, the open F-number is 2.4–4.9, the photographing proximity is 300, and the image surface (image pickup element) is tilted in reference to the optical axis.

Numerical data of the fifth embodiment are shown below.

| Surface Number | Radius of Curvature | Surface Separation | Decentration | Refractive Index | Abbe's Number |
|---|---|---|---|---|---|
| object surface | ∞ | ∞ | | | |
| 1 | ∞ (ref. surface 1) | 0.00 | | | |
| 2 | FFS[1] | 1.50 | | 1.8211 | 24.1 |
| 3 | ASP[1] | rtn to ref. surface 1 | | | |
| 4 | ∞ (ref. surface 1) | 7.60 | | | |
| 5 | ∞ (ref. surface 2) | 0.00 | decentration(1) | | |
| 6 | DM[1] | rtn to ref. surface 2 | | | |
| 7 | ∞ (ref. surface 2) | 0.00 | | | |
| 8 | ∞ (ref. surface 3) | 5.70 | decentration(2) | | |
| 9 | 25.824 | 2.50 | | 1.8467 | 23.8 |
| 10 | −14.376 | 1.10 | | 1.8010 | 35.0 |
| 11 | 36.230 | D1 | | | |
| 12 | stop surface | 0.30 | | | |
| 13 | ASP[2] | 2.54 | | 1.7433 | 49.3 |
| 14 | ASP[3] | 0.15 | | | |
| 15 | 7.503 | 4.00 | | 1.4970 | 81.6 |
| 16 | −20.632 | 1.26 | | | |
| 17 | 21.137 | 2.60 | | 1.4970 | 81.6 |
| 18 | −5.540 | 1.00 | | 1.8211 | 24.1 |
| 19 | ASP[4] | D2 | | | |
| 20 | 14.818 | 1.00 | | 1.7725 | 49.6 |

-continued

| | | | | | |
|---|---|---|---|---|---|
| 21 | 7.945 | D3 | | | |
| 22 | 13.918 | 2.83 | decentration(3) | 1.5831 | 59.4 |
| 23 | ASP[5] | 1.00 | decentration(3) | | |
| 24 | ∞ | 1.00 | | 1.5477 | 62.8 |
| 25 | ∞ | 0.50 | | | |
| 26 | ∞ | 0.50 | decentration(4) | 1.5163 | 64.1 |
| 27 | ∞ | 0.50 | | | |
| image surface | ∞ | 0.00 | | | |

ASP[1]

Radius of curvature 6.918
$a = -5.0270 \times 10^{-4}$
$c = -3.2111 \times 10^{-7}$
$k = 0.0000 \times 10^{0}$
$b = -9.4492 \times 10^{-7}$
$d = 5.6042 \times 10^{-9}$

ASP[2]

Radius of curvature 10.876
$a = -1.4553 \times 10^{-6}$
$c = -8.7026 \times 10^{-8}$
$k = 0.0000 \times 10^{0}$
$b = -6.9792 \times 10^{-7}$
$d = -1.8139 \times 10^{-10}$

ASP[3]

Radius of curvature 19.313
$a = 1.4326 \times 10^{-4}$
$c = -1.5317 \times 10^{-7}$
$k = 0.0000 \times 10^{0}$
$b = 4.0596 \times 10^{-7}$
$d = 1.5219 \times 10^{-9}$

ASP[4]

Radius of curvature 10.459
$a = 9.2067 \times 10^{-4}$
$c = 3.5008 \times 10^{-6}$
$k = 0.0000 \times 10^{0}$
$b = 1.5437 \times 10^{-5}$
$d = -3.0040 \times 10^{-7}$

ASP[5]

Radius of curvature -8.832
$a = 1.2320 \times 10^{-3}$
$c = 2.2696 \times 10^{-6}$
$k = 0.0000 \times 10^{0}$
$b = -5.2691 \times 10^{-5}$
$d = -4.7515 \times 10^{-8}$

FFS[1]

Radius of curvature -46.082
$C_4 = 3.3879 \times 10^{-4}$
$C_8 = -7.5837 \times 10^{-5}$
$C_{11} = -3.5539 \times 10^{-5}$
$C_{15} = -3.9740 \times 10^{-5}$
$C_6 = 2.9998 \times 10^{-4}$
$C10 = -7.8600 \times 10^{-5}$
$C_{13} = -9.1294 \times 10^{-5}$

[DM1]

| | W far point margin W300 mm | S far point margin S300 mm | T far point margin T300 mm | W∞ W near point margin | S∞ S near point margin | T∞ T near point margin |
|---|---|---|---|---|---|---|
| C4 | 0.000 | 0.000 | 0.000 | $-0.4776 \times 10^{-3}$ | $-0.2056 \times 10^{-3}$ | $-0.1084 \times 10^{-3}$ |
| | $-0.7932 \times 10^{-3}$ | $-0.5303 \times 10^{-3}$ | $-0.4321 \times 10^{-3}$ | $-0.1299 \times 10^{-2}$ | $-0.7433 \times 10^{-3}$ | $-0.5338 \times 10^{-3}$ |
| C6 | 0.000 | 0.000 | 0.000 | $-0.2414 \times 10^{-3}$ | $-0.1154 \times 10^{-3}$ | $-0.6409 \times 10^{-4}$ |
| | $-0.4046 \times 10^{-3}$ | $-0.2919 \times 10^{-3}$ | $-0.2373 \times 10^{-3}$ | $-0.6725 \times 10^{-3}$ | $-0.4081 \times 10^{-3}$ | $-0.2960 \times 10^{-3}$ |
| C8 | 0.000 | 0.000 | 0.000 | $-0.1982 \times 10^{-5}$ | $-0.1437 \times 10^{-4}$ | $-0.7319 \times 10^{-5}$ |
| | $-0.1080 \times 10^{-4}$ | $-0.2969 \times 10^{-4}$ | $-0.2667 \times 10^{-4}$ | $-0.2655 \times 10^{-4}$ | $-0.4241 \times 10^{-4}$ | $-0.3174 \times 10^{-4}$ |
| C10 | 0.000 | 0.000 | 0.000 | $-0.3305 \times 10^{-6}$ | $-0.7974 \times 10^{-5}$ | $-0.3597 \times 10^{-5}$ |
| | $-0.6195 \times 10^{-5}$ | $-0.1844 \times 10^{-4}$ | $0.1165 \times 10^{-4}$ | $-0.1906 \times 10^{-4}$ | $-0.2473 \times 10^{-4}$ | $-0.1719 \times 10^{-4}$ |
| C11 | 0.000 | 0.000 | 0.000 | $0.1132 \times 10^{-5}$ | $-0.1566 \times 10^{-5}$ | $0.2669 \times 10^{-5}$ |
| | $0.7647 \times 10^{-6}$ | $-0.3238 \times 10^{-5}$ | $0.2482 \times 10^{-5}$ | $0.2794 \times 10^{-6}$ | $-0.3574 \times 10^{-5}$ | $0.2137 \times 10^{-5}$ |
| C13 | 0.000 | 0.000 | 0.000 | $-0.1604 \times 10^{-5}$ | $-0.4161 \times 10^{-5}$ | $0.8574 \times 10^{-6}$ |
| | $-0.1144 \times 10^{-5}$ | $-0.2868 \times 10^{-5}$ | $-0.3435 \times 10^{-6}$ | $-0.9291 \times 10^{-7}$ | $-0.3372 \times 10^{-5}$ | $0.2122 \times 10^{-6}$ |
| C15 | 0.000 | 0.000 | 0.000 | $-0.1538 \times 10^{-6}$ | $-0.7522 \times 10^{-6}$ | $0.4315 \times 10^{-6}$ |
| | $-0.5910 \times 10^{-6}$ | $-0.2189 \times 10^{-5}$ | $0.1410 \times 10^{-5}$ | $-0.1050 \times 10^{-5}$ | $-0.1366 \times 10^{-5}$ | $-0.2493 \times 10^{-6}$ |
| C17 | 0.000 | 0.000 | 0.000 | $-0.4046 \times 10^{-6}$ | $-0.3576 \times 10^{-6}$ | $0.2110 \times 10^{-6}$ |
| | $-0.7934 \times 10^{-6}$ | $-0.5708 \times 10^{-6}$ | $0.3467 \times 10^{-6}$ | $-0.1456 \times 10^{-5}$ | $-0.1576 \times 10^{-6}$ | $0.3422 \times 10^{-6}$ |
| C19 | 0.000 | 0.000 | 0.000 | $-0.2641 \times 10^{-6}$ | $-0.3961 \times 10^{-6}$ | $-0.6849 \times 10^{-9}$ |
| | $0.1109 \times 10^{-5}$ | $0.4289 \times 10^{-6}$ | $0.7533 \times 10^{-7}$ | $0.7712 \times 10^{-6}$ | $0.6742 \times 10^{-6}$ | $0.2023 \times 10^{-6}$ |
| C21 | 0.000 | 0.000 | 0.000 | $-0.9612 \times 10^{-7}$ | $0.4907 \times 10^{-8}$ | $0.4198 \times 10^{-7}$ |
| | $-0.1375 \times 10^{-6}$ | $-0.1488 \times 10^{-6}$ | $0.2320 \times 10^{-6}$ | $0.1135 \times 10^{-6}$ | $0.7898 \times 10^{-7}$ | $0.3313 \times 10^{-7}$ |
| Y | 0.000 | 0.000 | 0.000 | 0.142 | 0.672 | 0.760 |
| | 0.282 | 0.747 | 0.416 | 0.386 | 0.617 | 0.696 |
| Z | 0.0000 | 0.0000 | 0.0000 | 0.0057 | 0.0027 | 0.0009 |
| | 0.0096 | 0.0068 | 0.0048 | 0.0158 | 0.0095 | 0.0061 |

-continued

| Decentration[1] (DEO) | | |
|---|---|---|
| X 0.000 | Y 0.000 | Z 0.000 |
| α 45.000 | β 0.000 | γ 0.000 |

| Decentration[2] (DEO) | | |
|---|---|---|
| X 0.000 | Y 0.000 | Z 0.000 |
| α 45.000 | β 0.000 | γ 0.000 |

| Decentration[3] (DAR) | | |
|---|---|---|
| X 0.000 | Y −0.141 | Z 0.000 |
| α 0.000 | β 0.000 | γ 0.000 |

| Decentration[4] (DEO) | | |
|---|---|---|
| X 0.000 | Y 0.000 | Z 0.000 |
| α −1.324 | β 0.000 | γ 0.000 |

|    | W | S | T |
|---|---|---|---|
| D1 | 14.961 | 8.351 | 1.800 |
| D2 | 1.703 | 1.500 | 8.516 |
| D3 | 2.000 | 8.817 | 8.354 |

Sixth Embodiment

As shown in FIGS. 13A–13C, a zoom optical system according to the sixth embodiment of the present invention is a threefold zoom optical system including, in order from the object side, a first group G1 having a negative power, a second group G2 having a positive power, a third group G3 having a negative power, and a fourth group G4 having a positive power. Zooming is made by moving the second group G2 and the third group G3 while keeping the first group G1 and the fourth group G4 fixed, defocused condition caused thereby being compensated for by deforming the reflecting surface of the deformable mirror M disposed in the first group G1. Also, free-formed surfaces are used in the first lens and the ninth lens.

Also, this zoom optical system is designed so that the focal length is 4.60–13.16, the open F-number is 2.4–4.9, and the photographing proximity is 300.

Numerical data of the sixth embodiment are shown below.

| Surface Number | Radius of Curvature | Surface Separation | Decentration | Refractive Index | Abbe's Number |
|---|---|---|---|---|---|
| object surface | ∞ | ∞ | | | |
| 1 | ∞ (ref. surface 1) | 0.00 | | | |
| 2 | FFS[1] | 1.50 | | 1.8211 | 24.1 |
| 3 | ASP[1] | rtn to ref. surface 1 | | | |
| 4 | ∞ (ref. surface 1) | 7.60 | | | |
| 5 | ∞ (ref. surface 2) | 0.00 | decentration(1) | | |
| 6 | DM[1] | rtn to ref. surface 2 | | | |
| 7 | ∞ (ref. surface 2) | 0.00 | | | |
| 8 | ∞ (ref. surface 3) | 5.59 | decentration(2) | | |
| 9 | 31.358 | 2.50 | | 1.8467 | 23.8 |
| 10 | −13.454 | 1.10 | | 1.8010 | 35.0 |
| 11 | 51.801 | D1 | | | |
| 12 | stop surface | 0.30 | | | |
| 13 | ASP[2] | 2.51 | | 1.7433 | 49.3 |
| 14 | ASP[3] | 0.31 | | | |
| 15 | 7.616 | 4.00 | | 1.4970 | 81.6 |
| 16 | −19.548 | 1.26 | | | |
| 17 | 21.997 | 2.60 | | 1.4970 | 81.6 |
| 18 | −5.421 | 1.00 | | 1.8211 | 24.1 |
| 19 | ASP[4] | D2 | | | |
| 20 | 16.284 | 1.00 | | 1.7725 | 49.6 |
| 21 | 7.855 | D3 | | | |
| 22 | FFS[2] | 3.07 | | 1.5831 | 59.4 |
| 23 | ASP[5] | 1.00 | | | |
| 24 | ∞ | 1.00 | | 1.5477 | 62.8 |
| 25 | ∞ | 0.50 | | | |
| 26 | ∞ | 0.50 | | 1.5163 | 64.1 |
| 27 | ∞ | 0.50 | | | |
| image surface | ∞ | 0.00 | | | |

-continued

ASP[1]

Radius of curvature 7.691  
$a = 3.9154 \times 10^{-4}$  
$c = -2.3133 \times 10^{-7}$  
$k = 0.0000 \times 10^{0}$  
$b = 3.1019 \times 10^{-7}$  
$d = 4.9494 \times 10^{-9}$

ASP[2]

Radius of curvature 10.908  
$a = -5.9481 \times 10^{-6}$  
$c = -8.9048 \times 10^{-8}$  
$k = 0.0000 \times 10^{0}$  
$b = -8.6207 \times 10^{-7}$  
$d = -6.0956 \times 10^{-10}$

ASP[3]

Radius of curvature 19.683  
$a = 1.3853 \times 10^{-4}$  
$c = -1.6138 \times 10^{-7}$  
$k = 0.0000 \times 10^{0}$  
$b = 2.3740 \times 10^{-7}$  
$d = 1.1250 \times 10^{-9}$

ASP[4]

Radius of curvature 10.363  
$a = 8.7177 \times 10^{-4}$  
$c = 3.4971 \times 10^{-6}$  
$k = 0.0000 \times 10^{0}$  
$b = 1.1716 \times 10^{-5}$  
$d = -3.2195 \times 10^{-7}$

ASP[5]

Radius of curvature −11.187  
$a = 8.5641 \times 10^{-4}$  
$c = 2.0357 \times 10^{-6}$  
$k = 0.0000 \times 10^{0}$  
$b = -4.0057 \times 10^{-5}$  
$d = -4.6335 \times 10^{-8}$

FFS[1]

Radius of curvature −30.261  
$C_4 = -2.0354 \times 10^{-3}$  
$C_8 = -1.4385 \times 10^{-5}$  
$C_6 = -2.0052 \times 10^{-3}$  
$C_{10} = 3.0406 \times 10^{-5}$

FFS[2]

Radius of curvature 8.248  
$C_4 = -1.3618 \times 10^{-2}$  
$C_8 = 1.4383 \times 10^{-4}$  
$C_6 = -1.4060 \times 10^{-2}$  
$C_{10} = 1.9187 \times 10^{-4}$e

[DM1]

| | W far point margin W300 mm | S far point margin S300 mm | T far point margin T300 mm | W∞ W near point margin | S∞ S near point margin | T∞ T near point margin |
|---|---|---|---|---|---|---|
| C4 | 0.000 | 0.000 | 0.000 | $-0.4091 \times 10^{-3}$ | $-0.1808 \times 10^{-3}$ | $-0.1002 \times 10^{-3}$ |
| | $-0.7167 \times 10^{-3}$ | $-0.4956 \times 10^{-3}$ | $-0.4179 \times 10^{-3}$ | $-0.1175 \times 10^{-2}$ | $-0.6957 \times 10^{-3}$ | $-0.5153 \times 10^{-3}$ |
| C6 | 0.000 | 0.000 | 0.000 | $-0.2390 \times 10^{-3}$ | $-0.1020 \times 10^{-3}$ | $-0.5129 \times 10^{-4}$ |
| | $-0.3996 \times 10^{-3}$ | $-0.2715 \times 10^{-3}$ | $-0.2224 \times 10^{-3}$ | $-0.6419 \times 10^{-3}$ | $-0.3796 \times 10^{-3}$ | $-0.2736 \times 10^{-3}$ |
| C8 | 0.000 | 0.000 | 0.000 | $-0.1662 \times 10^{-4}$ | $-0.1127 \times 10^{-4}$ | $-0.5904 \times 10^{-4}$ |
| | $-0.2363 \times 10^{-4}$ | $-0.2670 \times 10^{-4}$ | $-0.2320 \times 10^{-4}$ | $-0.3662 \times 10^{-4}$ | $-0.3850 \times 10^{-4}$ | $-0.2805 \times 10^{-4}$ |
| C10 | 0.000 | 0.000 | 0.000 | $-0.8200 \times 10^{-5}$ | $-0.5460 \times 10^{-5}$ | $-0.1364 \times 10^{-5}$ |
| | $-0.1379 \times 10^{-4}$ | $-0.1452 \times 10^{-4}$ | $0.1022 \times 10^{-4}$ | $-0.2493 \times 10^{-4}$ | $-0.2111 \times 10^{-4}$ | $-0.1294 \times 10^{-4}$ |
| C11 | 0.000 | 0.000 | 0.000 | $0.8239 \times 10^{-7}$ | $-0.1932 \times 10^{-5}$ | $0.1775 \times 10^{-5}$ |
| | $0.5142 \times 10^{-6}$ | $-0.2677 \times 10^{-5}$ | $0.1655 \times 10^{-5}$ | $0.6897 \times 10^{-8}$ | $-0.3375 \times 10^{-5}$ | $0.1528 \times 10^{-5}$ |
| C13 | 0.000 | 0.000 | 0.000 | $0.1091 \times 10^{-5}$ | $-0.2150 \times 10^{-5}$ | $0.1289 \times 10^{-5}$ |
| | $0.1942 \times 10^{-5}$ | $-0.1561 \times 10^{-5}$ | $0.4270 \times 10^{-6}$ | $0.3032 \times 10^{-5}$ | $-0.1939 \times 10^{-5}$ | $0.6749 \times 10^{-6}$ |
| C15 | 0.000 | 0.000 | 0.000 | $-0.1816 \times 10^{-6}$ | $-0.2918 \times 10^{-6}$ | $0.5349 \times 10^{-6}$ |
| | $-0.4828 \times 10^{-6}$ | $-0.8033 \times 10^{-6}$ | $0.1058 \times 10^{-5}$ | $-0.7254 \times 10^{-6}$ | $-0.9680 \times 10^{-6}$ | $0.1629 \times 10^{-6}$ |
| C17 | 0.000 | 0.000 | 0.000 | $-0.4761 \times 10^{-6}$ | $-0.4224 \times 10^{-6}$ | $0.1575 \times 10^{-6}$ |
| | $-0.7404 \times 10^{-6}$ | $-0.4457 \times 10^{-6}$ | $0.2891 \times 10^{-6}$ | $-0.1508 \times 10^{-5}$ | $-0.2614 \times 10^{-6}$ | $0.3110 \times 10^{-6}$ |
| C19 | 0.000 | 0.000 | 0.000 | $0.2695 \times 10^{-6}$ | $-0.1315 \times 10^{-6}$ | $0.1309 \times 10^{-6}$ |
| | $0.4519 \times 10^{-6}$ | $0.4466 \times 10^{-6}$ | $0.2393 \times 10^{-6}$ | $0.1182 \times 10^{-5}$ | $0.7615 \times 10^{-6}$ | $0.2939 \times 10^{-6}$ |
| C21 | 0.000 | 0.000 | 0.000 | $-0.2295 \times 10^{-7}$ | $0.6685 \times 10^{-7}$ | $0.5300 \times 10^{-7}$ |
| | $-0.6352 \times 10^{-7}$ | $0.4578 \times 10^{-7}$ | $0.2184 \times 10^{-6}$ | $0.1775 \times 10^{-7}$ | $0.9900 \times 10^{-7}$ | $0.7132 \times 10^{-7}$ |
| Y | 0.000 | 0.000 | 0.000 | 0.455 | 0.406 | 0.020 |
| | 0.469 | 0.551 | 0.343 | 0.481 | 0.557 | 0.537 |
| Z | 0.0000 | 0.0000 | 0.0000 | 0.0049 | 0.0024 | 0.0010 |
| | 0.0086 | 0.0063 | 0.0048 | 0.0142 | 0.0089 | 0.0060 |

Decentration[1] (DEO)

X 0.00  
α 45.00  
Y 0.00  
β 0.00  
Z 0.00  
γ 0.00

Decentration[2] (DEO)

X 0.00  
α 45.00  
Y 0.00  
β 0.00  
Z 0.00  
γ 0.00

-continued

|    | W      | S     | T     |
|----|--------|-------|-------|
| D1 | 14.654 | 8.029 | 1.800 |
| D2 | 1.500  | 1.891 | 7.884 |
| D3 | 2.400  | 8.638 | 8.876 |

Seventh Embodiment

Figure 14C:
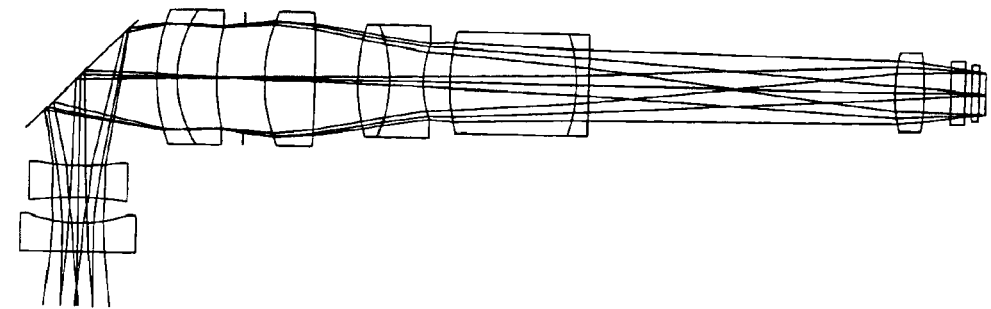
FIGS. 14A–14C are sectional views that show the lens configuration of a zoom optical system according to the seventh embodiment of the present invention, taken along the optical axis. Specifically.
Figure 14B:
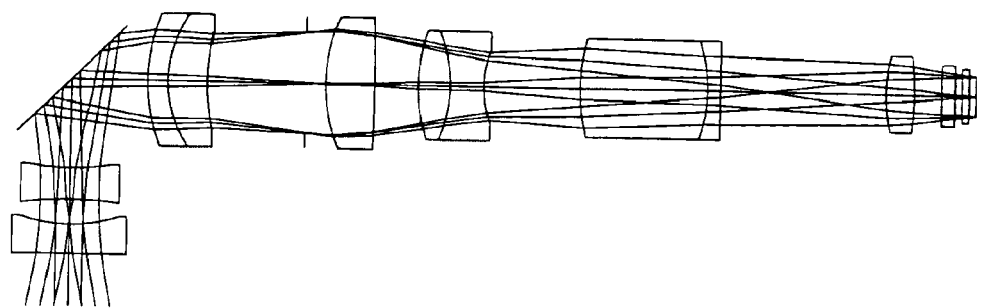
Figure 14A:
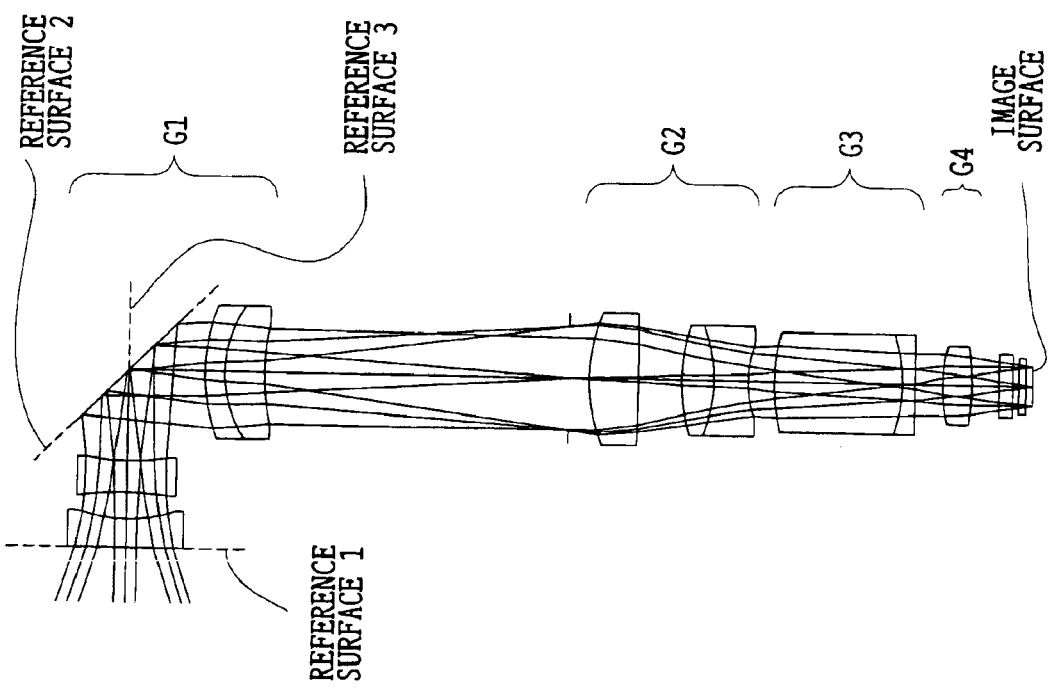

As shown in FIGS. 14A–14C, a zoom optical system according to the seventh embodiment of the present invention is a threefold zoom optical system including, in order from the object side, a first group G1 having a negative power, a second group G2 having a positive power, a third group G3 having a positive power, and a fourth group G4 having a positive power. Zooming is made by moving the second group G2 and the third group G3 while keeping the first group G1 and the fourth group G4 fixed, defocused condition caused thereby being compensated for by deforming the reflecting surface of the deformable mirror M disposed in the first group G1.

Also, this zoom optical system is designed so that the focal length is 4.42–13.26, the open F-number is 2.8–5.4, the photographing proximity is 300, and the second lens is tilted in reference to the optical axis.

Numerical data of the seventh embodiment are shown below.

| Surface Number | Radius of Curvature | Surface Separation | Decentration | Refractive Index | Abbe's Number |
|---|---|---|---|---|---|
| object surface | ∞ | ∞ | | | |
| 1 | ∞ (ref. surface 1) | 0.00 | | | |
| 2 | 261.185 | 2.21 | | 1.8467 | 23.8 |
| 3 | 10.923 | 1.97 | | | |
| 4 | −34.120 | 2.37 | decentration(1) | 1.5831 | 59.4 |
| 5 | ASP[1] | rtn to ref. surface 1 | | | |
| 6 | ∞ (ref. surface 1) | 11.19 | | | |
| 7 | ∞ (ref. surface 2) | 0.00 | decentration(2) | | |
| 8 | DM[1] | rtn to ref. surface 2 | | | |
| 9 | ∞ (ref. surface 2) | 0.00 | | | |
| 10 | ∞ (ref. surface 3) | 5.80 | decentration(3) | | |
| 11 | 14.661 | 1.42 | | 1.7288 | 27.8 |
| 12 | 8.756 | 2.94 | | 1.8467 | 23.8 |
| 13 | ASP[2] | 22.79 | | | |
| 14 | stop surface | 1.50 | | | |
| 15 | ASP[3] | 3.77 | | 1.7433 | 49.3 |
| 16 | −177.694 | 3.23 | | | |
| 17 | 13.597 | 2.33 | | 1.6510 | 56.1 |
| 18 | −11.091 | 2.50 | | 1.8064 | 28.8 |
| 19 | 7.052 | 2.08 | | | |
| 20 | 15.361 | 9.59 | | 1.6510 | 56.1 |
| 21 | −11.889 | 0.89 | | 1.8010 | 35.0 |
| 22 | 163.462 | 2.00 | | | |
| 23 | 13.525 | 2.16 | | 1.5831 | 59.4 |
| 24 | ASP[4] | 2.00 | | | |
| 25 | ∞ | 1.00 | | 1.5477 | 62.8 |
| 26 | ∞ | 0.50 | | | |
| 27 | ∞ | 0.50 | | 1.5163 | 64.1 |
| 28 | ∞ | 0.50 | | | |
| image surface | ∞ | 0.00 | | | |

ASP[1]

Radius of curvature 14.084
$a = -1.9901 \times 10^{-4}$
$c = -1.1169 \times 10^{-7}$
$k = -3.5257 \times 10^{0}$
$b = 2.1387 \times 10^{-6}$
$d = 3.4151 \times 10^{-9}$

ASP[2]

Radius of curvature 18.427
$a = 8.1216 \times 10^{-5}$
$c = 5.5968 \times 10^{-9}$
$k = 0.0000 \times 10^{0}$
$b = 1.4542 \times 10^{-7}$
$d = 5.7158 \times 10^{-12}$

ASP[3]

Radius of curvature 12.302
$a = 4.1027 \times 10^{-5}$
$c = -5.5062 \times 10^{-9}$
$k = -1.1544 \times 10^{0}$
$b = 2.4362 \times 10^{-7}$
$d = 1.8604 \times 10^{-10}$ -continued

ASP[4]

Radius of curvature −23.815  $k = 2.9908 \times 10^{1}$
$a = 6.6134 \times 10^{-4}$  $b = 1.5613 \times 10^{-5}$
$c = -1.4499 \times 10^{-6}$  $d = 9.6153 \times 10^{-8}$

[DM1]

| | W far point margin W300 mm | S far point margin S300 mm | T far point margin T300 mm | W∞ W near point margin | S∞ S near point margin | T∞ T near point margin |
|---|---|---|---|---|---|---|
| C4 | 0.000 | 0.000 | 0.000 | $-0.1372 \times 10^{-3}$ | $-0.581 \times 10^{-4}$ | $-0.3535 \times 10^{-4}$ |
|  | $-0.3586 \times 10^{-3}$ | $-0.2809 \times 10^{-3}$ | $-0.2622 \times 10^{-3}$ | $-0.5096 \times 10^{-3}$ | $-0.3356 \times 10^{-3}$ | $-0.2968 \times 10^{-3}$ |
| C6 | 0.000 | 0.000 | 0.000 | $-0.7106 \times 10^{-4}$ | $-0.2862 \times 10^{-4}$ | $-0.1723 \times 10^{-4}$ |
|  | $-0.1854 \times 10^{-3}$ | $-0.1467 \times 10^{-3}$ | $-0.1381 \times 10^{-3}$ | $-0.2624 \times 10^{-3}$ | $-0.1761 \times 10^{-3}$ | $-0.1563 \times 10^{-3}$ |
| C8 | 0.000 | 0.000 | 0.000 | $-0.4083 \times 10^{-5}$ | $-0.3575 \times 10^{-7}$ | $0.6002 \times 10^{-6}$ |
|  | $-0.1066 \times 10^{-4}$ | $-0.1034 \times 10^{-4}$ | $-0.1081 \times 10^{-4}$ | $-0.1549 \times 10^{-4}$ | $-0.1409E \times 10^{-4}$ | $-0.1264 \times 10^{-4}$ |
| C10 | 0.000 | 0.000 | 0.000 | $-0.4233 \times 10^{-6}$ | $0.1356 \times 10^{-6}$ | $0.1598E \times 10^{-6}$ |
|  | $-0.4065 \times 10^{-5}$ | $-0.4575 \times 10^{-5}$ | $-0.5126 \times 10^{-5}$ | $-0.5005 \times 10^{-5}$ | $0.5095 \times 10^{-5}$ | $0.5487 \times 10^{-5}$ |
| C11 | 0.000 | 0.000 | 0.000 | $-0.2105 \times 10^{-6}$ | $0.8449 \times 10^{-6}$ | $0.2917 \times 10^{-6}$ |
|  | $-0.5868 \times 10^{-6}$ | $-0.4753 \times 10^{-8}$ | $-0.2458 \times 10^{-6}$ | $-0.7745 \times 10^{-6}$ | $-0.2758 \times 10^{-6}$ | $-0.2008 \times 10^{-6}$ |
| C13 | 0.000 | 0.000 | 0.000 | $-0.1043 \times 10^{-6}$ | $0.8558 \times 10^{-6}$ | $0.3364 \times 10^{-6}$ |
|  | $-0.5517 \times 10^{-6}$ | $-0.2327 \times 10^{-6}$ | $-0.4614 \times 10^{-6}$ | $-0.8959 \times 10^{-6}$ | $-0.6189 \times 10^{-6}$ | $-0.4447 \times 10^{-6}$ |
| C15 | 0.000 | 0.000 | 0.000 | $0.7041 \times 10^{-7}$ | $0.1812 \times 10^{-6}$ | $0.6993 \times 10^{-7}$ |
|  | $-0.1353 \times 10^{-6}$ | $-0.1571 \times 10^{-7}$ | $-0.1042 \times 10^{-6}$ | $-0.2290 \times 10^{-7}$ | $0.9523 \times 10^{-7}$ | $-0.4442 \times 10^{-7}$ |
| Y | 0.000 | 0.000 | 0.000 | 0.077 | −0.082 | −0.143 |
|  | 0.264 | 0.391 | 0.457 | 0.236 | 0.372 | 0.440 |
| Z | 0.0000 | 0.0000 | 0.0000 | 0.0017 | 0.0006 | 0.0004 |
|  | 0.0045 | 0.0034 | 0.0033 | 0.0063 | 0.0041 | 0.0037 |

Decentration[1]

X 0.000  Y 0.009  Z 0.000
α 0.190  β 0.000  γ 0.000

Decentration[2]

X 0.000  Y 0.000  Z 0.000
α 45.000  β 0.000  γ 0.000

Decentration[3]

X 0.000  Y 0.000  Z 0.000
α 45.000  β 0.000  γ 0.000

Values of the numerical conditions set forth above for each embodiment are shown in the table below.

| | (1-1) | (2-1) Zf | | (3-1) | (4-1) θi | | (5-1) |
|---|---|---|---|---|---|---|---|
| Condition | $\beta_{DMW}$ | W | T | $md/\sqrt{f_w \cdot f_t}$ | W | T | $|\delta/\sqrt{f_w \cdot f_t}|$ |
| 1st emb. | −0.70 | 0.077 | 0.102 | 1.60 | 0.31 | 0.25 | 0.005 |
| 2nd emb. | −0.70 | 0.077 | 0.102 | 1.98 | 0.61 | 0.25 | 0.071 |
| 3rd emb. | −0.60 | 0.072 | 0.107 | 2.83 | 0.69 | 0.50 | 0.004 |
| 4th emb. | −0.61 | 0.102 | 0.166 | 2.11 | 1.78 | 1.64 | 0.022 |
| 5th emb. | −0.61 | 0.102 | 0.166 | 2.07 | 2.15 | 2.18 | 0.018 |
| 6th emb. | −0.63 | 0.102 | 0.166 | 1.82 | 0.01 | 0.01 | 0.000 |
| 7th emb. | −0.65 | 0.044 | 0.088 | 0.82 | 0.00 | 0.00 | 0.001 |

| | Focal length in G1 | | | Focal length of G2 | | | front surface to principal point in G2 | |
|---|---|---|---|---|---|---|---|---|
| Condition | front unit $f_{1a}$ | rear unit $f_{1b}$ | (6-1) $f_{1a}/f_{1b}$ | $f_2$ | (7-1) $f_2/\sqrt{f_w \cdot f_t}$ | (8-1) $\beta_{2W}$ | SD | (9-1) $SD/f_W$ |
| 1st emb. | −6.32 | 37.02 | −0.17 | 17.04 | 2.72 | −0.32 | 11.30 | 2.56 |
| 2nd emb. | −6.32 | 37.04 | −0.17 | 16.87 | 2.69 | −0.33 | 11.06 | 2.50 |
| 3rd emb. | −7.41 | 73.52 | −0.10 | 12.15 | 1.58 | −0.45 | 7.20 | 1.63 |
| 4th emb. | −7.24 | 65.12 | −0.11 | 11.96 | 1.58 | −0.45 | 8.00 | 1.82 |
| 5th emb. | −7.23 | 65.89 | −0.11 | 11.93 | 1.56 | −0.45 | 7.90 | 1.79 |

-continued

| | | | | | | | | |
|---|---|---|---|---|---|---|---|---|
| 6th emb. | −7.34 | 63.87 | −0.11 | 12.02 | 1.54 | −0.43 | 8.07 | 1.75 |
| 7th emb. | −6.82 | 43.22 | −0.16 | 23.80 | 3.11 | −0.39 | 16.31 | 3.69 |

The zoom optical system according to the present invention as described above is applicable to a film camera, a digital camera, a TV camera, a camera for a personal data assistant (PDA), a monitor camera, robot eyes, an electronic endoscope, etc.

Regarding the zoom optical system set forth above, the description has been made of the type configured to have a reflecting surface in a lens group. However, regarding a zoom optical system having no reflecting surface also, use of an optical element having a deformable surface, for example, a variable focus lens can achieve effects such as size reduction, cost reduction, power saving, and operation noise reduction. Moreover, a variable focus mirror having no deformable surface is applicable to the embodiments set forth above. Regarding the variable focus mirror, an example is explained in reference FIG. 40, later.

Hereafter, explanation is made of configuration examples of the variable optical-property optical element (for example, a variable mirror, a variable focus lens) applicable to the zoom optical system according to the present invention.

Figure 15:
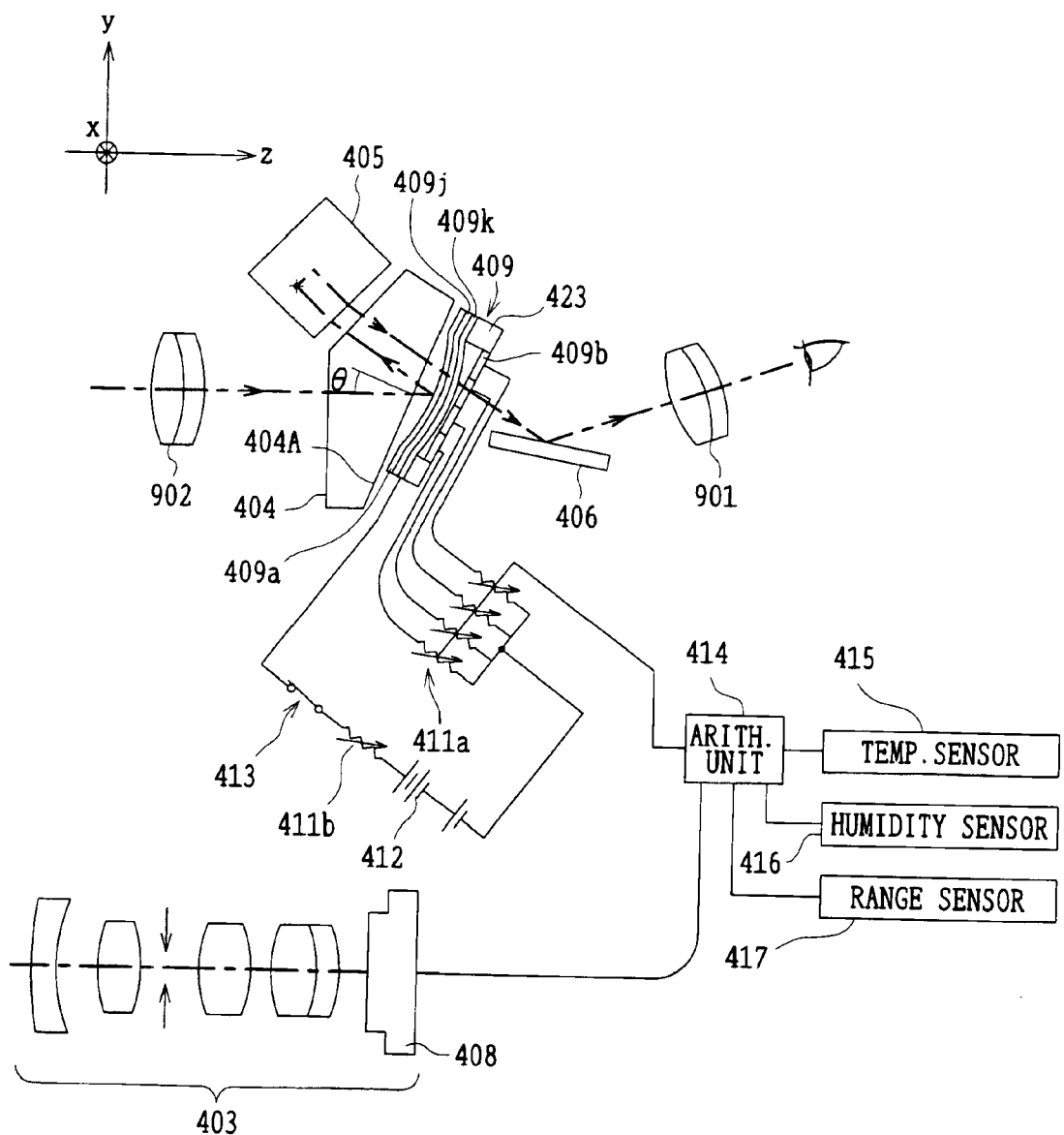
FIG. 15 is a schematic configuration diagram of a digital camera's Keplerian finder using a deformable mirror, as a deformable element that is applicable to the zoom optical system according to the present invention.

FIG. 15 shows a digital camera's Keplerian finder using a variable optical-property mirror, as a variable mirror that is applicable to the zoom optical system according to the present invention. This configuration example is applicable to a silver halide film camera, as a matter of course. Reference is first made to a variable optical-property mirror 409.

The variable optical-property mirror 409 is a variable optical-property deformable mirror (hereafter simply called a deformable mirror) in which the periphery of a deformable three-layer structure composed of an electrode 409k, a deformable substrate 409j, and a thin film (reflecting surface) 409a, which is an aluminum coating formed on the substrate 409j and functions as a reflecting surface, is fixed on a support 423, and a plurality of electrodes 409b provided in a spaced relation with the electrode 409k are fixed on the lower side of the support 423. The reference numeral 411a denotes a plurality of variable resistors connected with the electrodes 409b, respectively. The reference numeral 412 denotes a power supply connected, as interposed between, with the electrode 409k and the electrodes 409b through variable resistors 411b and a power switch 413. The reference numeral 414 denotes an arithmetical unit for controlling resistance values of the plurality of variable resistors 411a. The reference numerals 415, 416, and 417 denote a temperature sensor, a humidity sensor, and a range sensor, respectively, connected with the arithmetical unit 414. These members and elements are arranged as shown in the figure, to constitute an optical apparatus.

Each of surfaces of an objective lens 902, an eyepiece 901, a prism 404, a rectangular isosceles prism 405, a mirror 406 and the deformable mirror 409 may have, not necessarily limited to planer surfaces, any shape such as a spherical or rotationally symmetric aspherical surface, a spherical, planar or rotationally symmetric aspherical surface that has a decentration in reference to the optical axis, an aspherical surface that defines planes of symmetry, only one plane of symmetry or no plane of symmetry, a free-formed surface, and a surface having a nondifferentiable point or line. In addition, irrespective of whether it is a reflecting surface or a refracting surface, any surface is applicable as long as it can exert some effect on light. Hereafter, such a surface is generally referred to as an expanded curved surface. It is noted that decentration implies either one or both of displacement (shift) and tilt.

Also, it is designed so that, when a voltage is applied between the plurality of electrodes 409b and the electrode 409k, the thin film 409a is deformed by electrostatic force to change its surface shape, as in the case of the membrane mirror referred to, for example, in "Handbook of Microlithography, Micromachining and Microfabriation", edited by P. Rai-Choudhury, Vol.2: Micromachining and Microfabriation, p. 495, Fig. 8.58, SPIE PRESS or "Optics Communication", Vol.140, pp. 187–190, 1997. Whereby, not only can focus adjustment be made in conformance with diopter of an observer, but also it is possible to suppress degradation of image forming performance, which results from deformation or change of refractive indices of the lenses 901 and 902 and/or the prism 404, the rectangular isosceles prism 405 and the mirror 406 caused by temperature change or humidity change, from expansion/contraction and deformation of lens frames, or from assembling errors of parts such as optical elements and frames. In this way, focus adjustment and compensation for aberrations caused by the focus adjustment can always be performed appropriately.

Figure 17:
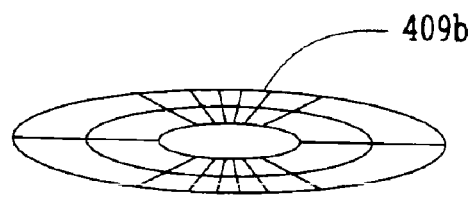
FIG. 17 is an explanatory diagram that shows one aspect of electrodes used in the deformable mirror shown in FIG. 16.
Figure 18:
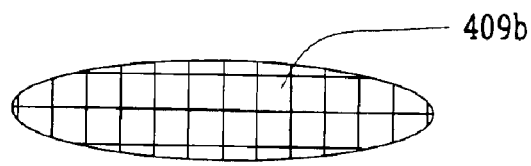
FIG. 18 is an explanatory diagram that shows another aspect of electrodes used in the deformable mirror shown in FIG. 16.

Also, the profile of the electrodes 409b has a concentric or rectangular division pattern as shown in FIGS. 17 and 18, and may be selected in accordance with deformation pattern of the thin film 409a.

In the case where the deformable mirror 409 is used, light from the object is refracted at each of entrance surfaces and exit surfaces of the objective lens 902 and the prism 404, is reflected at the deformable mirror 409, is transmitted through the prism 404, is further reflected at the rectangular isosceles prism 405 (in FIG. 15, the mark "+" on the path of rays indicates that rays travel toward the rear side of the figure), is reflected at the mirror 406, and enters the observer's eye via the eyepiece 901. In this way, the lenses 901 and 902, the prisms 404 and 405, and the deformable mirror 409 constitute an observation optical system of the optical apparatus. Optimizing the surface shape and thickness of each of these optical elements can minimize aberrations on the object surface.

In other words, the shape of the thin film 409a, which functions as a reflecting surface, is controlled in such a manner that resistance values of the variable resistors 411a are changed by signals from the arithmetical unit 414, to optimize image forming performance. Signals that have intensities according to ambient temperature, humidity and distance to the object are input into the arithmetical unit 414 from the temperature sensor 415, the humidity sensor 416, and the range sensor 417. In order to compensate for degradation of image forming performance caused by the ambient temperature and humidity and the distance to the object, the arithmetical unit 414 outputs signals for determining resistance values of the variable resistors 411a upon taking into account these input signals, so that voltages which determine the shape of the thin film 409a are applied to the electrodes 409b. In this way, since the thin film 409a is deformed by voltages applied to the electrodes 409b, or electrostatic force, it can assume various shapes including aspherical surfaces in accordance with conditions. It is noted that the range sensor 417 is dispensable. In this case, it is only necessary to move the imaging lens 403, which is provided as the imaging optical system of the digital camera, to the position where high-frequency components of an image signal from a solid-state image sensor 408 are substantially maximized, to calculate the object distance on the basis of this position, and to deform the deformable mirror 409 so that an observer's eye is focused on the object image. Also, fabricating the deformable mirror 409 using lithography is favorable, because high fabrication accuracy and good quality are easily obtained.

Also, if the deformable substrate 409*j* is made of synthetic resin such as polyimide, it is favorable in that the thin film could be considerably deformed even at a low voltage. Also, to integrally form the prism 404 and the deformable mirror 409 into a unit is convenient for assembly.

In the example of FIG. 15, since the reflecting surface 409*a* and the deformable electrode 409*k* are integrally formed as spaced via the deformable substrate 409*j* sandwiched between, there is a merit of choice from several manufacturing methods. Also, the reflecting surface 409*a* maybe designed to be used as the electrode 409*k* also. In this case, since these two are configured into one, the structure is simplified, which is a merit.

Although not shown in the figure, the solid-state image sensor 408 may be integrally formed on the substrate of the deformable mirror 409 by a lithography process.

Also, if the lenses 901 and 902, the prisms 404 and 405, and the mirror 406 are formed with plastic molds, curved surfaces with any desirable shapes can be easily formed and the fabrication also is simple. In the above description, the lenses 901 and 902 are arranged separately from the prism 404. However, if the prisms 404 and 405, the mirror 406, and the deformable mirror 409 can be designed to eliminate aberrations without the lenses 902 and 901, the prisms 404 and 405 and the deformable mirror 409 will form one optical block, to facilitate assembling. A part or all of the lenses 901 and 902, the prisms 404 and 405, and the mirror 406 may be made of glass. Such a configuration would assure an imaging system having a better accuracy. The reflecting surface of the deformable mirror preferably is shaped as a freeformed surface, because thereby compensation for aberration is facilitated and thus is advantageous.

In the example of FIG. 15, although the arithmetical unit 404, the temperature sensor 415, the humidity sensor 416, and the range sensor 417 are provided so that temperature change, humidity change, and change of the object distance are compensated for by the deformable mirror 409, the system configuration is not necessarily limited to this specific one. That is, the arithmetical unit 414, the temperature sensor 415, the humidity sensor 416 and the range sensor 417 may be removed from the configuration so that the deformable mirror 409 compensates for change of the observer's diopter alone.

Figure 16:
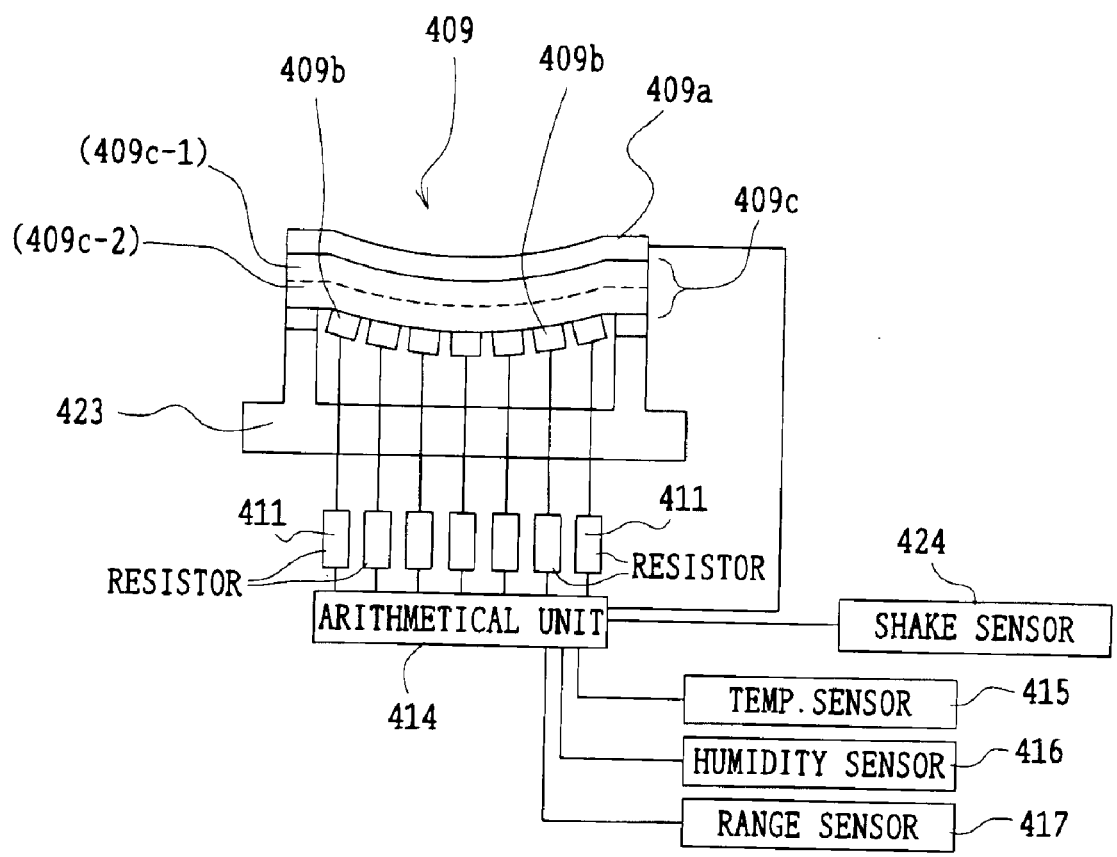
FIG. 16 is a schematic configuration diagram that shows another example of the deformable mirror applicable as a variable mirror.

FIG. 16 shows another example of the deformable mirror 409 applicable as a variable mirror used in the zoom optical system according to the present invention.

In the deformable mirror 409 of this example, a piezoelectric element 409*c* is interposed between the thin film 409*a* and the electrodes 409*b*, and these elements are mounted on a support 423. By changing voltages applied to the piezoelectric element 409*c* for individual electrodes 409*b* to cause different expansion or contraction in the piezoelectric element 409*c* portion by portion, the configuration allows the shape of the thin film 409*a* to be changed.

Arrangement of the electrodes 409*b* may be chosen from a concentric division pattern as illustrated in FIG. 17, a rectangular division pattern as illustrated in FIG. 18, and any other appropriate pattern. In FIG. 16, the reference numeral 424 denotes a shake sensor connected with the arithmetical unit 414. The shake sensor 424 detects, for example, shake of a digital camera in photographing and changes voltages applied to the electrodes 409*b* via the arithmetical unit 414 and the variable resistors 411 so as to deform the thin film (reflecting surface) 409*a* for compensation for disturbance of the image by the shake. In this situation, focusing and compensation for temperature and humidity are performed upon signals from the temperature sensor 415, the humidity sensor 416, and the range sensor 417 also being taken into account simultaneously. In this case, since a stress that derives from the deformation of the piezoelectric element 409*c* is applied to the thin film 409*a*, it is good practice to give the thin film 409*a* a considerable thickness to have an appropriate strength. It is noted that the piezoelectric element 409*c* may have, as described later, a two-layer structure denoted by 409*c*-1 and 409*c*-2, depending on materials used.

Figure 19:
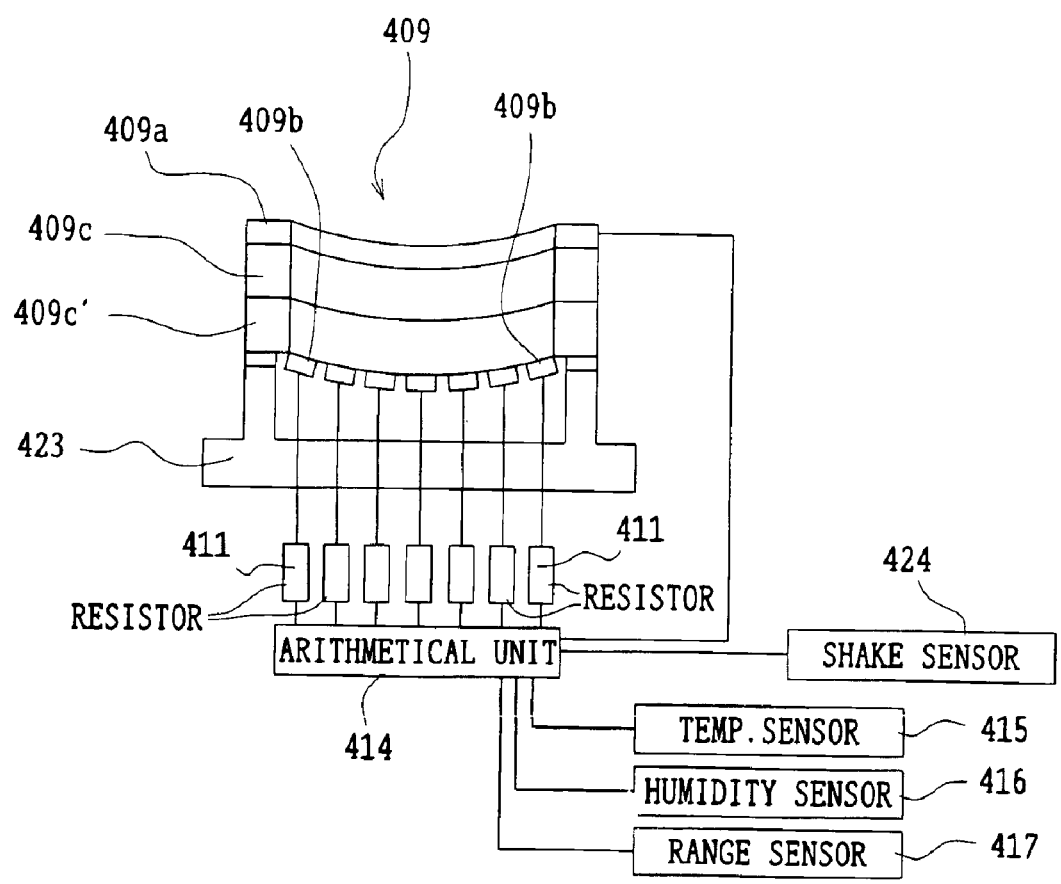
FIG. 19 is a schematic configuration diagram that shows still another example of the deformable mirror.

FIG. 19 shows still another example of the deformable mirror 409 applicable as a variable mirror used in the zoom optical system according to the present invention.

The deformable mirror of this example differs from the deformable mirror shown in FIG. 16 in that the piezoelectric element interposed between the thin film 409*a* and the plurality of electrodes 409*b* is composed of two piezoelectric elements 409*c* and 409*c'* made of substances having piezoelectric characteristics of opposite directionalities. Specifically, if the piezoelectric elements 409*c* and 409*c'* are made of ferroelectric crystals, they are arranged so that the crystal axes thereof are directed opposite to each other. In this case, when voltages are applied, since the piezoelectric elements 409*c* and 409*c'* expand or contract in opposite directions, the force to deform the thin film (reflecting surface) 409*a* becomes stronger than in the example of FIG. 16, to result in an advantage that the mirror surface can be considerably deformed. Other reference numerals in FIG. 19 are the same as those in FIG. 16.

Substances usable to construct the piezoelectric elements 409*c* and 409*c'* are, for example, piezoelectric substances or polycrystals or crystals thereof such as barium titanate, Rochelle salt, quartz crystal, tourmaline, KDP, ADP and lithium niobite; piezoelectric ceramics such as solid solution of $PbZrO_3$ and $PbTiO_3$; organic piezoelectric substances such as PVDF; and other ferroelectrics. In particular, the organic piezoelectric substance is preferable because it has a small value of Young's modulus and brings about a considerable deformation at a low voltage. In application of these piezoelectric elements, if they are made to have uneven thickness, it also is possible to properly deform the thin film 409*a* in each of the examples set forth above.

Also, as materials of the piezoelectric elements 409*c* and 409*c'*, macromolecular piezoelectric such as polyurethane, silicon rubber, acrylic elastomer, PZT, PLZT, and PVDF; vinylidene cyanide copolymer, copolymer of vinylidene fluoride and trifluoroethylene; etc. are usable.

Use of the organic substance having a piezoelectric property, the synthetic resin having a piezoelectric property, or the elastomer having a piezoelectric property is favorable because a considerable deformation of the surface of the deformable mirror can be achieved.

Figure 20:
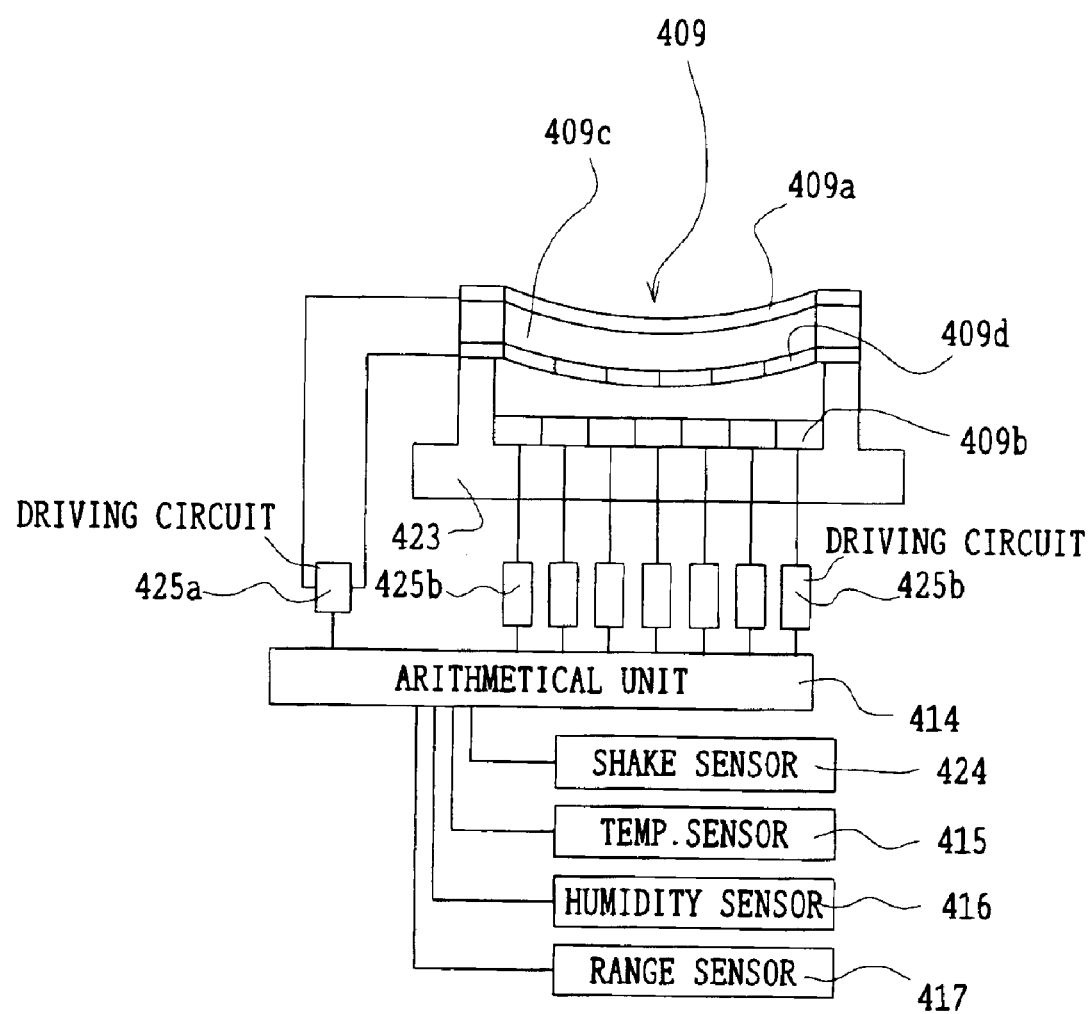
FIG. 20 is a schematic configuration diagram that shows still another example of the deformable mirror.

In the case where an electrostrictive substance such as acrylic elastomer or silicon rubber is used for the piezoelectric element 409*c* shown in FIGS. 16 and 20, the piezoelectric element 409c may have the structure in which another substrate 409c-1 and the electrostrictive substance 409c-2 are cemented together, as indicated by the broken line in FIG. 16.

FIG. 20 shows still another example of the deformable mirror 409 applicable as a variable mirror used in the zoom optical system according to the present invention.

The deformable mirror of this example is designed so that the piezoelectric element 409c is sandwiched between the thin film 409a and a plurality of electrodes 409d, and these are placed on the support 423. A voltage is applied to the piezoelectric element 409c, which is placed between the thin film 409a and the electrodes 409d, via a driving circuit 425a controlled by the arithmetical unit 414. Furthermore, apart from this, voltages are applied to the plurality of electrodes 409b also, which are formed on a bottom surface inside the support 423, via driving circuits 425b controlled by the arithmetical unit 414. Resultantly, the thin film 409a can be doubly deformed by electrostatic forces derived from the voltage applied between the thin film 409a and the electrodes 409d and from the voltages applied to the electrodes 409b. Therefore, this example has a merit that a larger number of deformation patterns are possible and a faster response is achieved than in the case of any examples previously set forth. Other reference numerals in FIG. 20 are the same as those in FIG. 16.

Also, the thin film 409a of the deformable mirror can be deformed into either a convex surface or a concave surface upon the sign of the voltages applied between the thin film 409a and the electrodes 409d being changed. In this case, it may be designed so that piezoelectric effect causes a considerable amount of deformation while electrostatic force causes a fine shape change. Alternatively, it may be designed so that piezoelectric effect is mainly used for deformation of a convex surface while electrostatic force is mainly used for deformation of a concave surface. It is noted that the electrodes 409d may be constructed of a single electrode or a plurality of electrodes like the electrodes 409b. The configuration of the electrodes 409d composed of a plurality of electrodes is illustrated in FIG. 20. In this description, piezoelectric effect, electrostrictive effect, and electrostriction are generally referred to as "piezoelectric effect". Thus, electrostrictive substance also is classified into piezoelectric substance.

Figure 21:
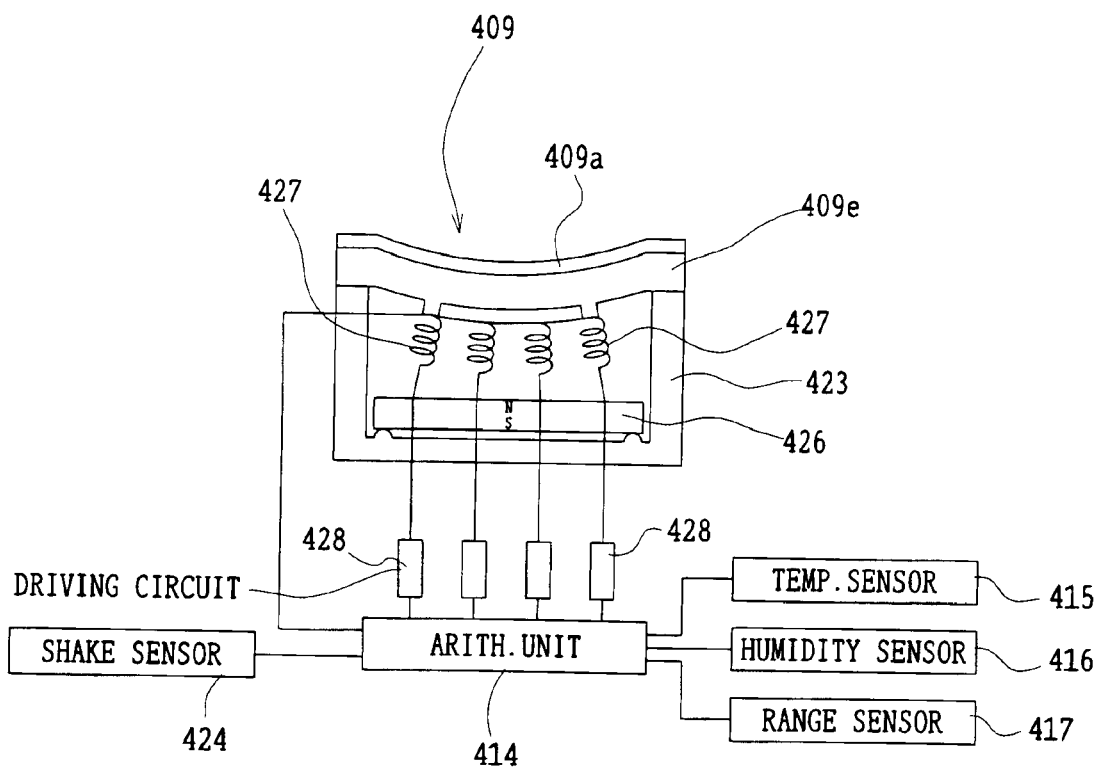
FIG. 21 is a schematic configuration diagram that shows still another example of the deformable mirror.

FIG. 21 shows still another example of the deformable mirror 409 applicable as a variable mirror used in the zoom optical system according to the present invention.

The deformable mirror of this example is designed to change the shape of the reflecting surface utilizing electromagnetic force. A permanent magnet 426 is fixed on the bottom surface inside of the support 423, and the periphery of the substrate 409e made of silicon nitride, polyimide or the like is mounted and fixed on the top face of the support 423. The surface of the substrate 409e is provided with the thin film 409a made of metal coating such as aluminum, to form the deformable mirror 409. A plurality of coils 427 are fixedly mounted on the back surface of the substrate 409e, and are connected with the arithmetical unit 414 via the driving circuits 428, respectively. Other reference numerals in FIG. 21 are the same as those in FIG. 16. When appropriate currents are supplied to the individual coils 427 from the individual driving circuits 428 based on output signals from the arithmetical unit 414, which depend on a required change of the optical system determined by the arithmetical unit on the basis of signals from the respective sensors 415, 416, 417, and 424, the coils 427 are repelled or attracted by the electromagnetic force acting with the permanent magnet 426, to deform the substrate 409e and the thin film 409a.

In this case, it can be designed so that different amounts of electric current flow through the respective coils 427. Also, the coils 427 may be provided as a single coil. Alternatively, it may be designed so that the permanent magnet 426 is mounted on the back surface of the substrate 409e and the coils 427 are arranged on the bottom surface inside the support 423. Also, fabricating the coils 427 as thin film coils by lithography process is preferable. In addition, a ferromagnetic iron core may be encased in each coil 427.

Figure 22:
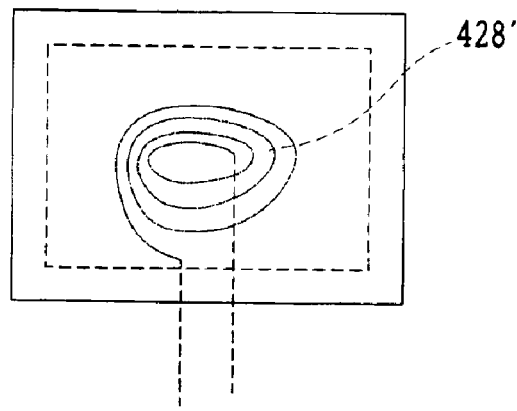
FIG. 22 is an explanatory diagram that shows the winding density of a thin-film coil in the example of FIG. 21.

In the case where thin film coils are used, it can be designed so that coil density of the thin-film coils 427 varies position by position on the back surface of the substrate 409e, as illustrated in FIG. 22 as a coil 428', thereby to give the substrate 409e and the thin film 409a a desirable deformation. Also, the coils 427 may be provided as a single coil, or may encase ferromagnetic iron cores inserted therein.

Figure 23:
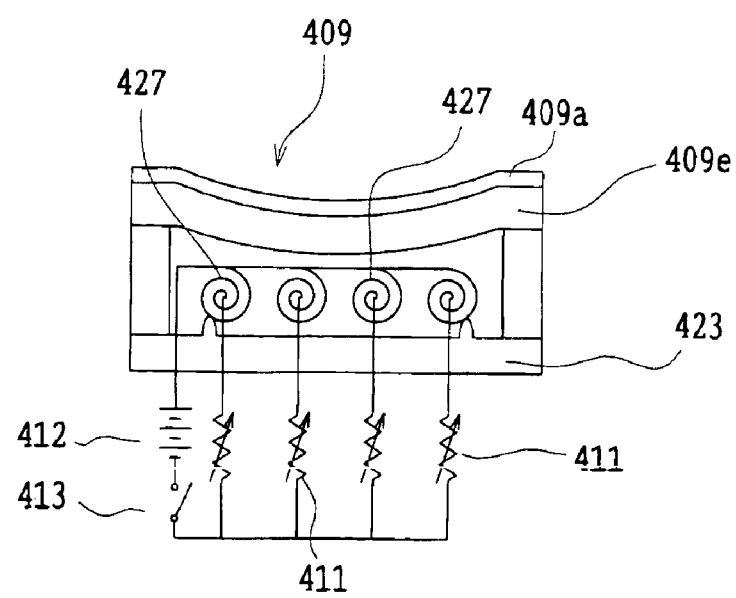
FIG. 23 is a schematic configuration diagram that shows still another example of the deformable mirror.

FIG. 23 shows still another example of the deformable mirror 409 applicable as a variable mirror used in the zoom optical system according to the present invention.

According to this example, the substrate 409e is made of a ferromagnetic such as iron and the thin film 409a as a reflecting film is made of aluminum or the like. The periphery of the substrate 409e is mounted and fixed on the top face of the support 423. The coils 427 are fixed on the bottom surface inside the support 423. In this case, since thin-film coils need not be provided on the back surface of the substrate 409e, the structure can be made simple, to reduce manufacture cost. Also, if the power switch 413 is replaced by an alternation and power on-off switch, directions of currents flowing through the coils 427 are changeable, and accordingly the substrate 409e and the thin film 409a are freely deformable.

Figure 24:
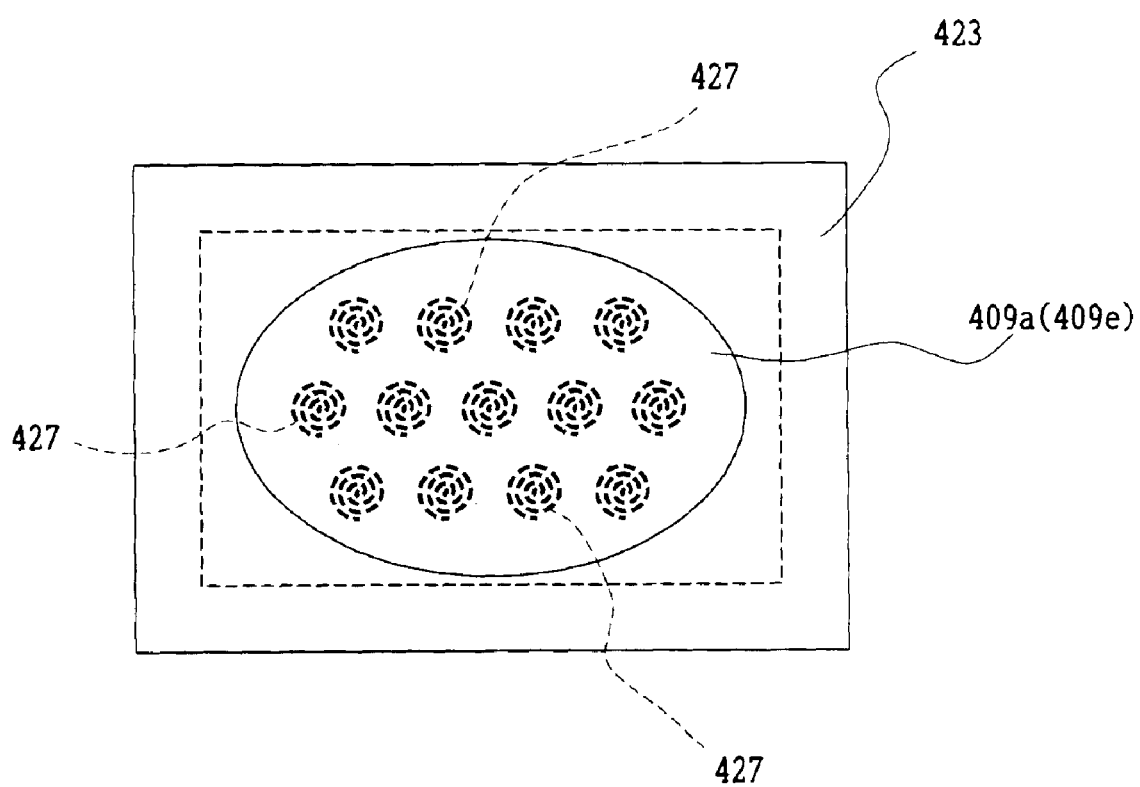
FIG. 24 is an explanatory diagram that shows one arrangement example of the coils in the example of FIG. 23.
Figure 25:
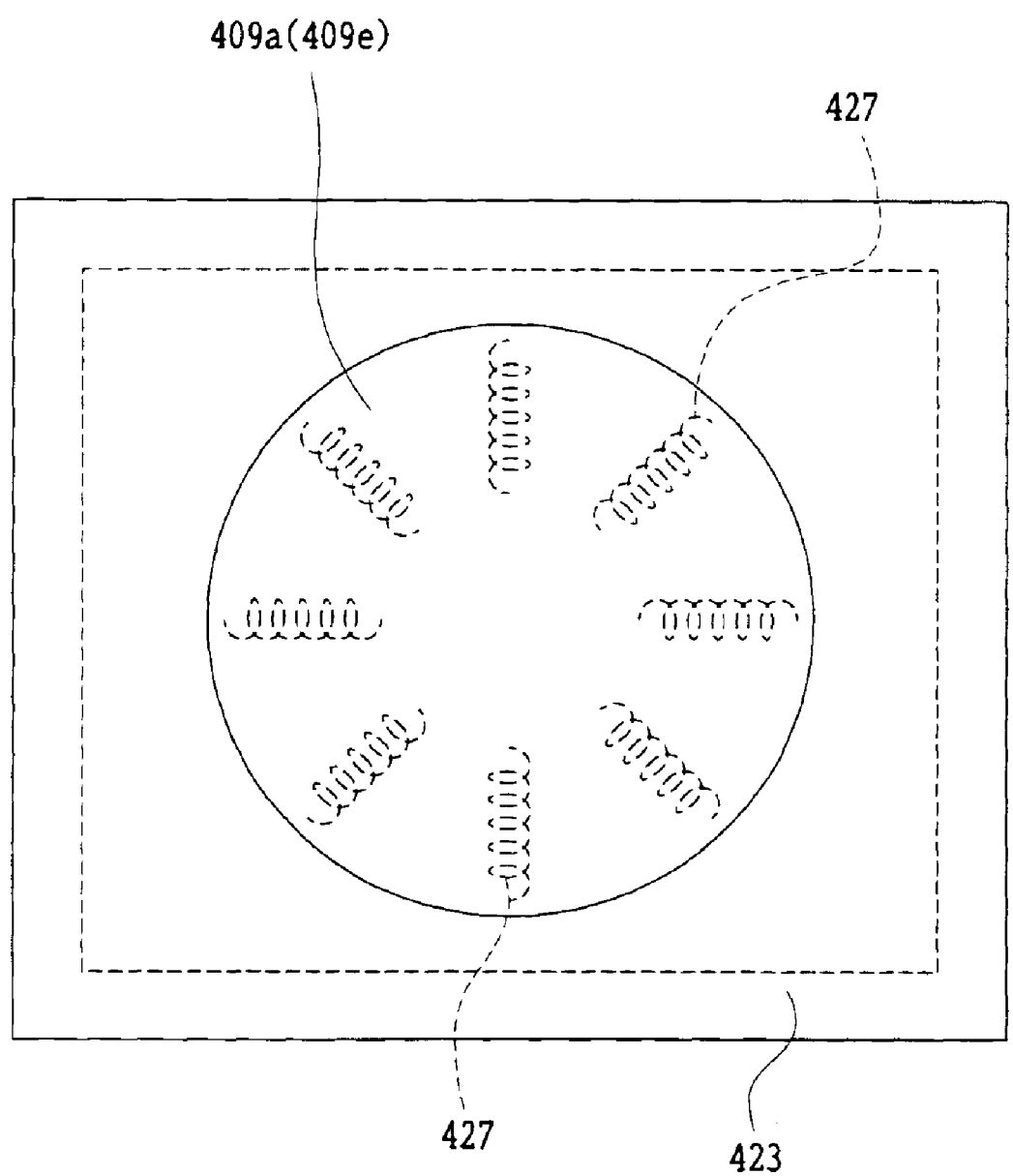
FIG. 25 is an explanatory diagram that show another arrangement example of the coils in the example of FIG. 23.
Figure 26:
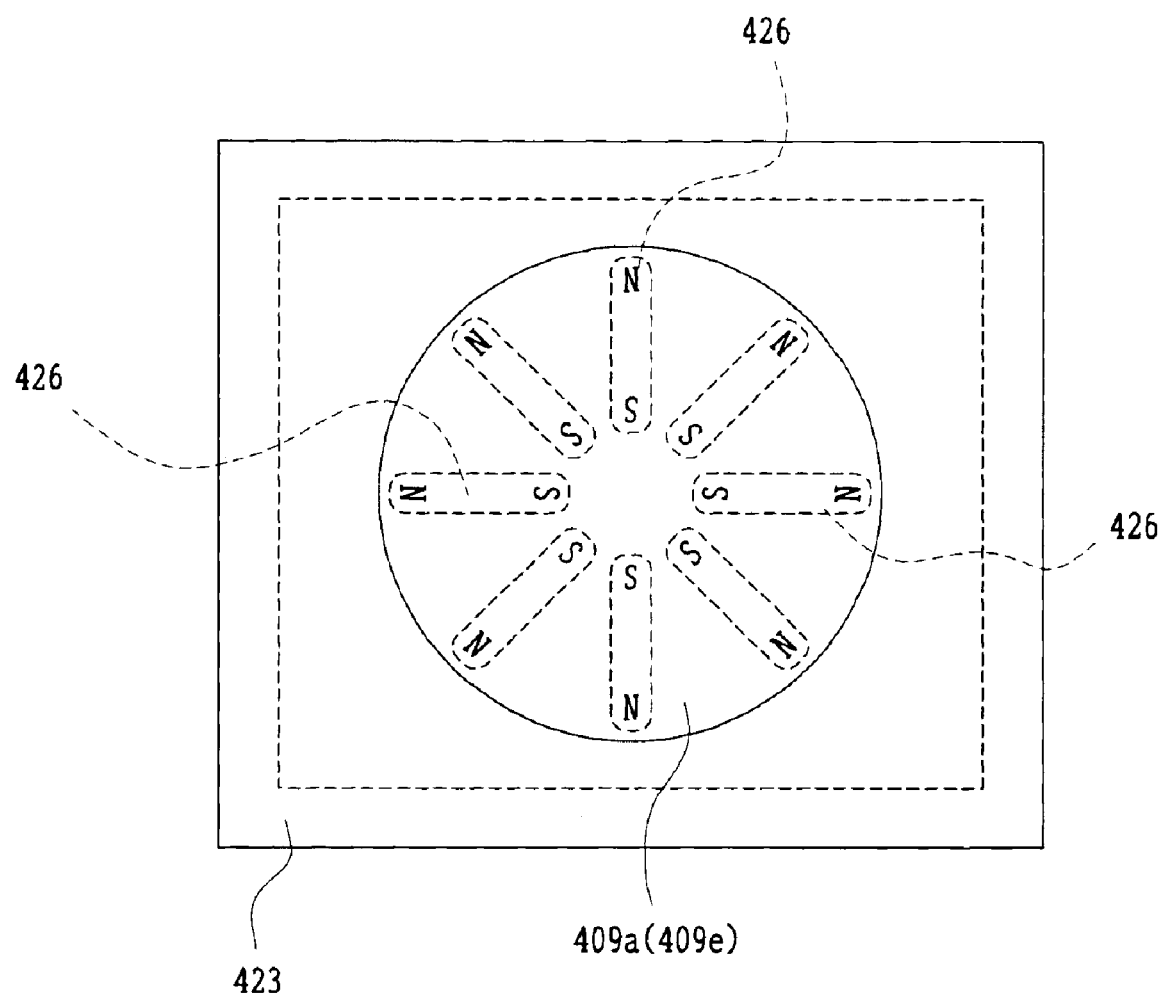
FIG. 26 is an explanatory diagram that shows an arrangement of permanent magnets that is suitable to the case where the coils are arranged as shown in FIG. 25 in the example of FIG. 21.

FIG. 24 shows an arrangement example of the coils 427 arranged in reference to the thin film 409a and the substrate 409e. FIG. 25 shows another arrangement example of the coils 427. These arrangements are applicable to the examples shown in FIG. 21, also. It is noted that FIG. 26 shows an arrangement of permanent magnets 426 that is suitable to the case where the coils 427 are arranged in a radial pattern as shown in FIG. 25. Specifically, the radial arrangement of the bar-shaped permanent magnets 426 as shown in FIG. 12 can give the substrate 409e and the thin film 409a finer deformation than the example shown in FIG. 21. In addition, deforming the substrate 409e and the thin film 409a by electromagnetic force (the examples of FIG. 7 and FIG. 9) has a merit that the substrate and the thin film can be driven at a lower voltage than in the case where electrostatic force is used.

While several examples of the deformable mirror are described above, two or more kinds of forces may be used for deformation of a mirror formed of a thin film as set forth in the example of FIG. 20. Specifically, two or more kinds of forces out of electrostatic force, electromagnetic force, piezoelectric effect, magnetrostriction, pressure of fluid, electric field, magnetic field, temperature change, electromagnetic wave, etc. may be simultaneously used, to deform the deformable mirror. Accordingly, if two or more different driving methods are used to make the variable optical-property optical element, substantial deformation and fine deformation can be simultaneously achieved, to realize a mirror surface with high accuracy.

Figure 27:
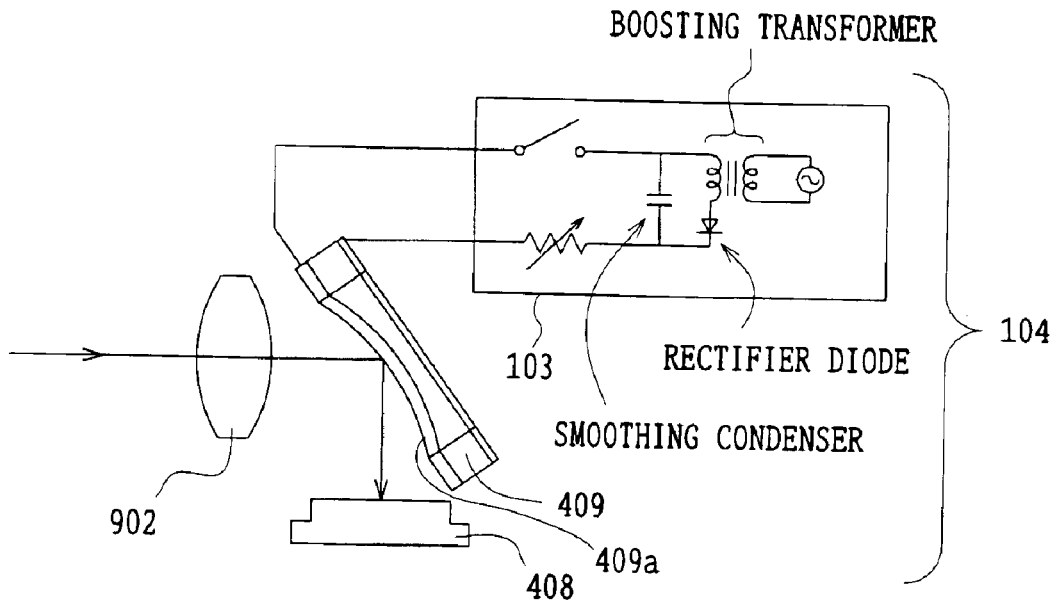
FIG. 27 is a schematic configuration diagram of an imaging system using a deformable mirror applicable to the zoom optical system according to the present invention, such an imaging system being applied to a digital camera of a cellular phone, a capsule endoscope, an electronic endoscope, a digital camera for a personal computer, and a digital camera for a PDA.

FIG. 27 shows an imaging system using the deformable mirror 409 that is applicable to the zoom optical system according to the present invention, such an imaging system being applied to a digital camera of a cellular phone, a capsule endoscope, an electronic endoscope, a digital camera for a personal computer, and a digital camera for a PDA.

In this imaging optical system, the deformable mirror 409, the lens 902, the solid-state image sensor 408, and a control system 103 form an imaging unit 104, namely one optical device. In the imaging unit 104 of this example, the configuration is made so that light from an object passing through the lens 902 is reflected at the thin film (reflecting surface) 409a of the deformable mirror 409 to be converged and imaged on the solid-state image sensor 408. The deformable mirror 409 is a kind of variable optical-property optical element, and is referred to as a variable focus mirror also.

According to this example, even when the object distance is changed, the object can be brought into focus by deformation of the reflecting surface 409a of the deformable mirror 409. Therefore, the configuration does not require any motor or the like to move the lenses and thus excels in achieving compact and lightweight design and low power consumption. Also, the imaging unit 104 is applicable, as an imaging optical system according to the present invention, to each of the examples. Also, if a plurality of deformable mirrors 409 are used, an optical system such as a zoom imaging optical system or a variable magnification imaging optical system can be constructed.

It is noted that, FIG. 27 shows a configuration example of the control system 103, which includes a boosting circuit of a transformer using coils. Specifically, use of a laminated piezoelectric transformer would facilitate compact design and thus is favorable. A boosting circuit may be used in any of the deformable mirrors and variable focus lenses of the present invention that use electricity, and, in particular, is useful for a deformable mirror or a variable focus lens that utilizes electrostatic force or piezoelectric effect. In order to use the deformable mirror 409 for focusing, it is only necessary to form an object image on the solid-state image sensor 408, for example, and to detect a state where high-frequency components of the object image are maximized while changing the focal length of the deformable mirror 409. In order to detect high-frequency components, it is only necessary to connect a processor including a microcomputer and so on with the solid-state image sensor 408 and to detect the high-frequency components therein.

Figure 28:
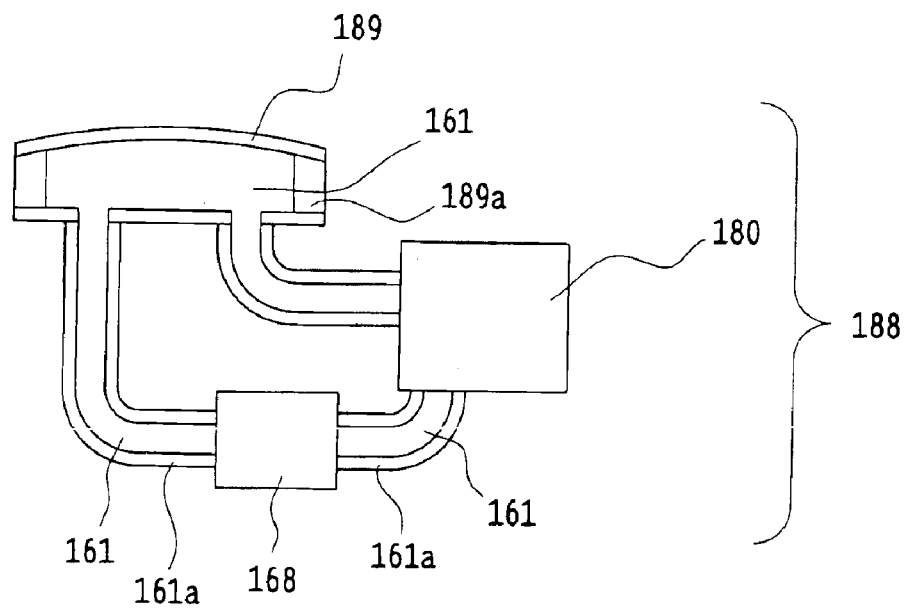
FIG. 28 is a schematic configuration diagram of a deformable mirror in which fluid is taken in and out by a micropump to deform a lens surface.

FIG. 28 relates to still another example of the deformable mirror applicable to the zoom optical system according to the present invention. The deformable mirror 188 of this example is constructed so that fluid 161 in a pipe 106a is taken in and out by a micropump 180 to deform a mirror surface, which is the outside surface of a reflecting film 189 spread across the upper face of a support 189a. This example has a merit that the mirror surface can be considerably deformed. Also, a liquid tank 168 is provided between the support 189a and the micropump 180, which are connected by the pipe, so that the fluid 161 can be supplied by a preset amount inside the support 189a.

The micropump 180 is, for example, a small-sized pump fabricated by micromachining technique and is configured to work using an electric power. As examples of pumps fabricated by the micromachining technique, there are those which use thermal deformation, piezoelectric substance, electrostatic force, etc.

Figure 29:
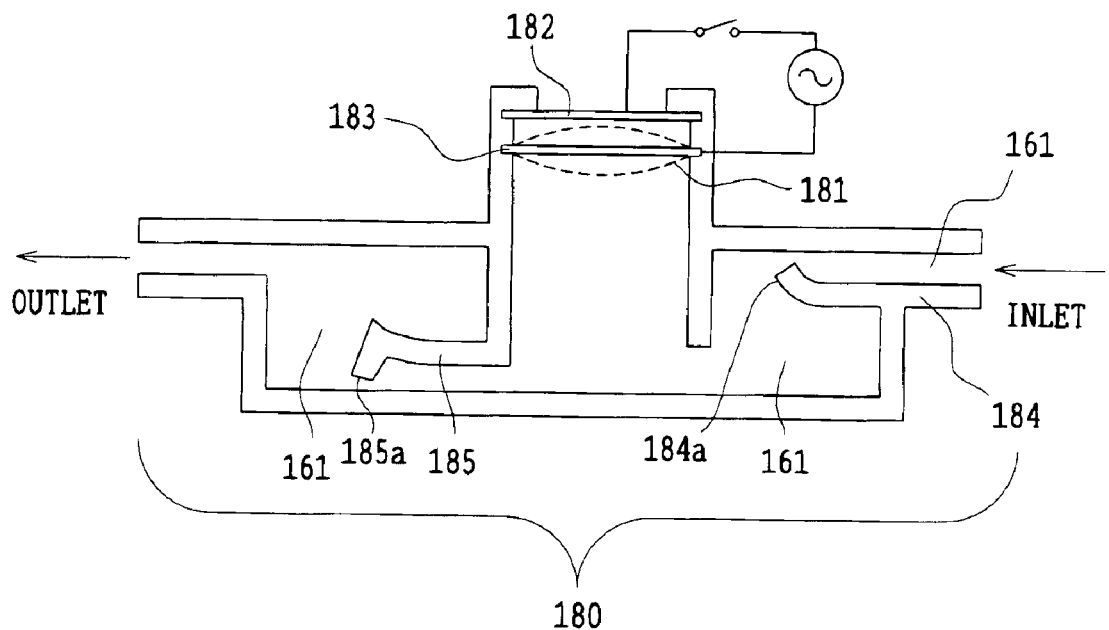
FIG. 29 is a schematic configuration diagram that shows one example of the micropump applicable to the deformable mirror.

FIG. 29 shows one example of the micropump. In the micropump 180, a vibrating plate 181 is vibrated by an electric force such as electrostatic force, piezoelectric effect or the like. FIG. 29 shows an example where vibration is caused by the electrostatic force. The reference numerals 182 and 183 denote electrodes. Also, the dash lines indicate the vibrating plate 181 as deformed. As the vibrating plate 181 vibrates, tips 184a and 185a of two valve 184 and 185 are opened and closed, to feed the fluid 161 from the right to the left.

The deformable mirror 188 of FIG. 28 functions as a deformable mirror upon the surface of the reflecting film 164 being deformed into a concave or convex shape in accordance with an amount of the fluid 161. In other words, the deformable mirror 188 is driven by the fluid 161. Organic or inorganic substance, such as silicon oil, air, water, and jelly, can be used as the fluid.

Also, a deformable mirror, a variable focus lens or the like using electrostatic force or piezoelectric effect sometimes requires a high voltage for driving it. In this case, as shown in FIG. 27, for example, a boosting transformer or a piezoelectric transformer is preferably used to configure the control system.

Also, if the thin film 409a or the reflecting film 189 for reflection is provided with a non-deformable portion to be fixed to the support 423 or the support 189a, this portion can be conveniently used as a reference surface for measuring the shape of the deformable mirror with an interferometer or the like.

Figure 30:
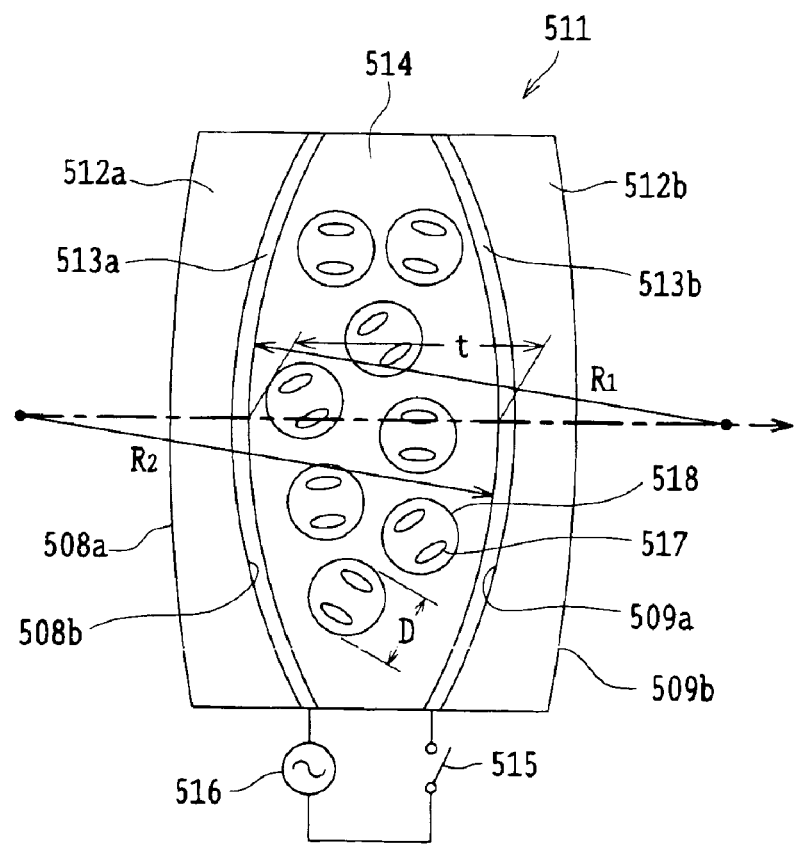
FIG. 30 is a diagram that shows the fundamental structure of a variable focus lens.

FIG. 30 shows the fundamental structure of a variable focus lens applicable to the zoom optical system according to the present invention. The variable focus lens 511 includes a first lens 512a having lens surfaces 508a and 508b as a first surface and a second surface, respectively, a second lens 512b having lens surfaces 509a and 509b as a third surface and a fourth surface, respectively, and a macromolecular dispersed liquid crystal layer 514 sandwiched between these lenses via transparent electrodes 513a and 513b. Incident light is converged through the first and second lenses 512a and 512b. The transparent electrodes 513a and 513b are connected with an alternating-current power supply 516 via a switch 515 so as to selectively apply an alternating-current electric field to the macromolecular dispersed liquid crystal layer 514. The macromolecular dispersed liquid crystal layer 514 is composed of a large number of minute macromolecular cells 518 with an arbitrary shape such as a sphere or a polyhedron each containing liquid crystal molecules 517, and its volume is equal to the sum of volumes occupied by macromolecules and the liquid crystal molecules 517 that constitute the macromolecular cells 518.

Here, the size of the macromolecular cell 518 is, in the case where the cell has a spherical shape, for example, chosen to satisfy the following condition:

$$2 \text{ nm} \leq D \leq \lambda/5 \tag{10}$$

where D is an average diameter of the cells and $\lambda$ is a wavelength of light in use. That is, since the size of a liquid crystal molecule 517 is greater than 2 nm, the lower limit of the average diameter is set to 2 nm. Also, while the upper limit value of D depends on a thickness t of the macromolecular dispersed liquid crystal layer 514 in the direction of the optical axis of the variable focus lens 511, it is preferred that D is not greater than $\lambda/5$ because a large value of D in reference to $\lambda$ would cause light to be scattered at the interface of the macromolecular cells 518 due to a difference in refractive index between the macromolecules and the liquid crystal molecules 517 constituting the macromolecular cell 518, to render the macromolecular dispersed liquid crystal layer 514 opaque. A high accuracy is not necessarily required, depending on an optical product using the variable focus lens. In this case, a diameter D not greater than the value of the wavelength $\lambda$ is satisfactory. It is noted that the transparency of the macromolecular dispersed liquid crystal layer 514 deteriorates with increasing thickness t.

Figure 31:
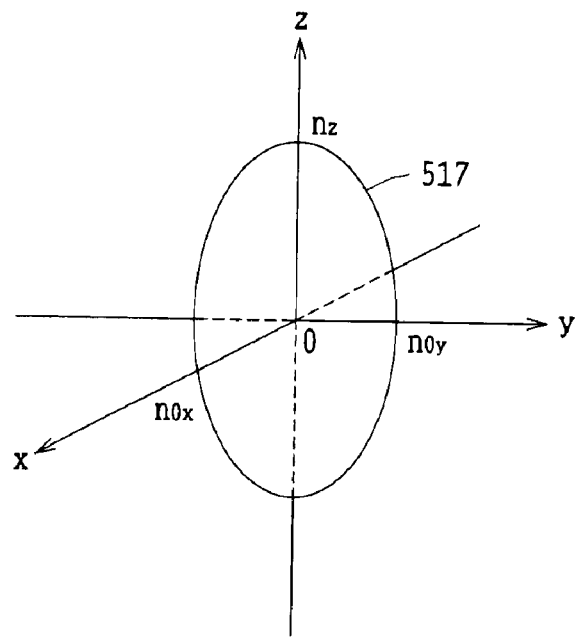
FIG. 31 is a view that presents a refractive-index ellipsoid of revolution of a uniaxial, nematic liquid crystal molecule.

Also, as liquid crystal molecules 517, uniaxial nematic liquid crystal molecules are used. The refractive index ellipsoid of the liquid crystal molecules 517 is shaped as shown in FIG. 31 and satisfies the following condition:

$$n_{ox}=n_{oy}=n_o \quad (11)$$

where $n_0$ is the refractive index for an ordinary ray and $n_{ox}$ and $n_{oy}$ are refractive indices in directions perpendicular to each other in a plane in which the ordinary ray lies.

Figure 32:
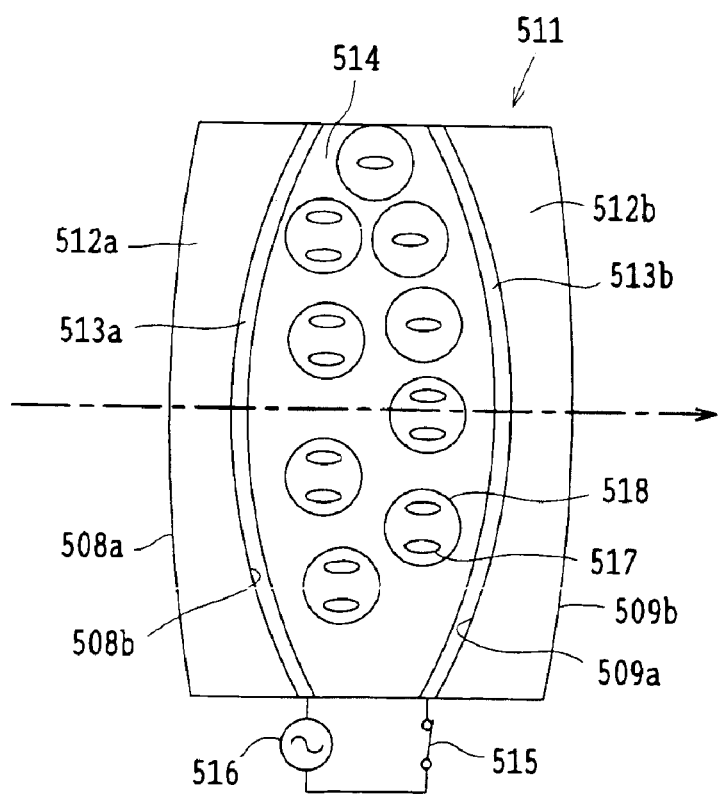
FIG. 32 is a diagram that shows a state where an electric field is applied to a macromolecular dispersed liquid crystal layer shown in FIG. 30.

Here, in the condition where the switch 515 is turned off, as shown in FIG. 30, that is, where no electric field is applied to the macromolecular dispersed liquid crystal layer 514, the liquid crystal molecules 517 are oriented in various directions, and thus the refractive index of the liquid crystal layer 514 for incident light becomes high, to provide a lens having a strong refracting power. In contrast, in the condition where the switch 515 is turned on, as shown in FIG. 32, that is, where an alternating-current electric field is applied to the macromolecular dispersed liquid crystal layer 514, the liquid crystal molecules 517 are oriented so that the direction of the major axis of the refractive index ellipsoid is parallel to the optical axis of the variable focus lens 511, and thus the refractive index becomes low, to provide a lens having a weak refracting power.

Figure 33:
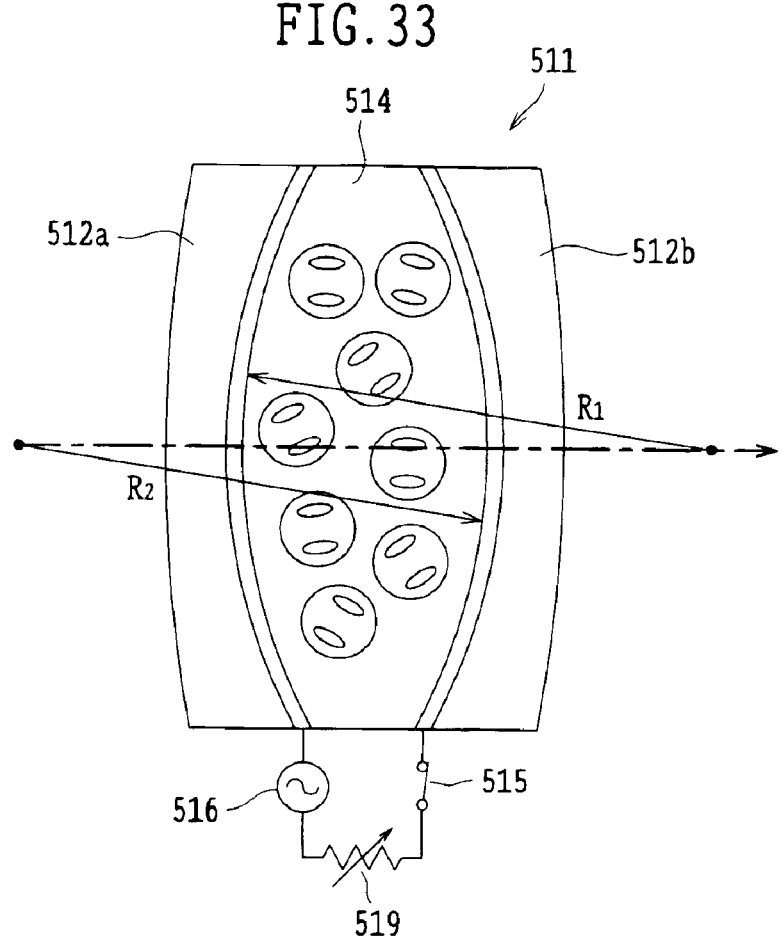
FIG. 33 is a diagram that shows one configuration example where the voltage applied to the macromolecular dispersed liquid crystal layer shown in FIG. 16 is variable.

The voltage applied to the macromolecular dispersed liquid crystal layer 514 may be varied stepwise or continuously by a variable resistor 519, as shown in FIG. 33, for example. Such a configuration allows the refracting power to be varied stepwise or continuously because the liquid crystal molecules 517 are oriented so that the major axis of the ellipsoid is gradually turned to be parallel with the optical axis of the variable focus lens 511 according as the applied voltage increases.

Here, the average refractive index $n_{LC}'$ of the liquid crystal molecules 517 in the condition shown in FIG. 30, that is, the condition where no electric field is applied to the macromolecular dispersed liquid crystal layer 514, is approximately given by:

$$(n_{ox}+n_{oy}+n_z)/3 = n_{LC}' \quad (12)$$

where, as shown in FIG. 31, the refractive index in the direction of the major axis of the refractive index ellipsoid is $n_z$.

Also, upon substituting the refractive index $n_e$ for the extraordinary ray into $n_z$, the average refractive index $n_{LC}$ in the condition where Equation (11) is established is given by:

$$(2n_o+n_e)/3 = n_{LC} \quad (13)$$

In this case, the refractive index $n_A$ of the macromolecular dispersed liquid crystal layer 514 is given by the Maxwell-Garnet's law as follows:

$$n_A = ff \cdot n_{LC}' + (1-ff)n_P \quad (14)$$

where the refractive index of the macromolecules constituting the macromolecular cells 518 is represented by $n_P$, and the volume ratio of the liquid crystal molecules 517 to the macromolecular dispersed liquid crystal layer 514 is represented by ff.

Consequently, the focal length $f_1$ of the variable focus lens 511 is given by:

$$1/f_1 = (n_A-1)(1/R_1-1/R_2) \quad (15)$$

where, as shown in FIGS. 30 and 33, the radii of curvature of the inner surfaces of the lenses 512a and 512b, that is, the surfaces on the side of the macromolecular dispersed liquid crystal layer 514, are represented by $R_1$ and $R_2$, respectively.

It is noted that a positive value is given to $R_1$ or $R_2$ when the center of curvature is located on the image point side. Also, refraction caused at the outer surfaces of the lenses 512a and 512b are removed from consideration. In other words, the focal length of the lens formed of the liquid crystal layer 514 alone is given by Equation (15).

Also, where the average refractive index for the ordinary ray is expressed by:

$$(n_{ox}+n_{oy})/2 = n_o' \quad (16)$$

the refractive index $n_B$ of the macromolecular dispersed liquid crystal layer 514 in the condition shown in FIG. 32, that is, the condition where an electric field is applied to the macromolecular dispersed liquid crystal layer 514, is given by:

$$n_B = ff \cdot n_o' + (1-ff)n_P \quad (17)$$

Consequently, in this condition, the focal length $f_2$ of the lens formed of the macromolecular dispersed liquid crystal layer 514 alone is given by:

$$1/f_2 = (n_B-1)(1/R_1-1/R_2). \quad (18)$$

Also, if a voltage lower than in the case of FIG. 18 is applied to the macromolecular dispersed liquid crystal layer 514, the focal length takes a value between the focal length $f_1$ given by Equation (15) and the focal length $f_2$ given by Equation (18).

From Equations (15) and (18), a change rate of the focal length caused by the macromolecular dispersed liquid crystal layer 514 is given by:

$$|(f_2-f_1)/f_2| = |(n_B-n_A)/(n_B-1)| \quad (19)$$

Thus, in order to increase the change rate, it is only necessary to increase the value of $n_B-n_A$. Here, since $$n_B-n_A = ff(n_o'-n_{LC}') \quad (20)$$

increasing $n_o'-n_{LC}'$ increases the change rate. In practice, since the refractive index $n_B$ of the macromolecular dispersed liquid crystal layer 514 is about 1.3–2, the following range can be set:

$$0.01 \leq |n_o'-n_{LC}'| \leq 10 \quad (21)$$

Under this condition, when ff=0.5, the focal length of the lens formed of the macromolecular dispersed liquid crystal layer 514 is changeable by 0.5% or greater, and accordingly an effective variable focus lens can be obtained. It is noted that, since choice of liquid crystal substances is restricted, the value of $|n_o'-n_{LC}'|$ cannot exceed 10.

The ground of the upper limit value of Expression (10) is explained below. Wilson and Eck, "Solar Energy Materials and Solar Cells", Vol. 31, 1993, published by Eleevier Science Publishers B. V. shows, in pp. 197–214 under the section title "Transmission variation using scattering/transparent switching films", the variation of transmittance τ in accordance with the size variation of a macromolecular liquid crystal. Also, FIG. 6 on page 206 of the same document shows that, under the condition where t=300 μm, ff=0.5, $n_P$=1.45, $n_{LC}$=1.585 and λ=500 nm, the theoretical value of transmittance τ is approximately 90% if r=5 nm (D=λ/50, D·t=λ·6 μm where the unit of D and λ is nanometers), and is approximately 50% if r=25 nm (D=λ/10), where the radius of the macromolecular dispersed liquid crystal is denoted by r.

Here, in a case where t=150 μm, for example, assuming that the transmittance τ varies as an exponential function of the thickness t, we can obtain that τ is approximately 71% when r=25 nm (D=λ/10, D·t=λ·15 μm). Similarly, in a case where t=75 μm, τ is approximately 80% when r=25 nm (D=λ/10, D·t=λ·7.5 μm)

These results introduce that, if $$D \cdot t \leq \lambda \cdot 15 \ \mu m \tag{22}$$

then τ becomes 70%–80% or more, to allow the liquid crystal to be practically used as a lens. Therefore, for example, in the case where t=75 μm, a sufficient transmittance can be obtained if D≤λ/5.

Also, the transmittance of the macromolecular dispersed liquid crystal layer 514 is raised as the value of $n_P$ approaches the value of $n_{LC}'$. On the other hand, if $n_o'$ and $n_P$ take values different from each other, the transmittance of the macromolecular dispersed liquid crystal layer 514 is degraded. Regarding the macromolecular dispersed liquid crystal layer 514 having the conditions shown in FIG. 30 and FIG. 32, the transmittance is improved on an average when the following condition is satisfied:

$$n_P = (n_o' + n_{LC}')/2 \tag{23}$$

Here, since the variable focus lens 511, which includes a lens formed of the macromolecular dispersed liquid crystal layer 514 between the first lens 512a and the second lens 512b, is used as a lens, it is preferred that its transmittance is, while being kept high, substantially constant whether in the condition of FIG. 16 or in the condition of FIG. 18. In order to achieve this, while choice is restricted for a substance of macromolecules constituting the macromolecular cells 518 and a substance of the liquid crystal molecules 517, for practical use, it is only necessary to satisfy the following condition:

$$n_o' \leq n_P \leq n_{LC}' \tag{24}$$

If Equation (23) is satisfied, the requirement by Condition (22) is moderated and it is only necessary to satisfy the following condition:

$$D \cdot t \leq \lambda \cdot 60 \ \mu m \tag{25}$$

The ground is as follows. According to the Fresnel's law, the reflectance is proportional to the square of the difference between refractive indices, and thus the amount of reflection of light at the interface between the macromolecules constituting the macromolecular cells 518 and the liquid crystal molecules 517, and accordingly the reduction in transmittance of the macromolecular dispersed liquid crystal layer 514, is roughly proportional to the square of the difference in refractive index between the macromolecules and the liquid crystal molecules 517.

The above explanation is based on the condition where $n_o'$ is approximately 1.45 and $n_{LC}'$ is approximately 1.585. In a more general formulation manner, a necessary condition is given as:

$$D \cdot t \leq \lambda \cdot 15 \ \mu m \cdot (1.585 - 1.45)^2 / (n_u - n_P)^2 \tag{26}$$

where $(n_u - n_P)^2$ is the greater of $(n_{LC}' - n_P)^2$ and $(n_o' - n_P)^2$.

Also, for a large variation of the focal length of the lens formed of the macromolecular dispersed liquid crystal layer 514, a large value of ff is preferred. However, if ff=1, the volume of the macromolecules becomes zero, to make it impossible to form macromolecular cells 518. Therefore, the range is set as follows:

$$0.1 \leq ff \leq 0.999 \tag{27}$$

On the other hand, since τ improves as ff decreases, Condition (26) is preferably modified as follows:

$$4 \times 10^{-6} [\mu m]^2 \leq D \cdot t \leq \lambda \cdot 45 \ \mu m \cdot (1.585 - 1.45)^2 / (n_u - n_P)^2 \tag{28}$$

Also, since the lower limit value of t is equal to D as shown in FIG. 16 and D is 2 nm or greater as explained above, the lower limit value of D·t is $(2 \times 10^{-3} \ \mu m)^2$, namely $4 \times 10^{-6} \ [\mu m]^2$.

It is noted that an approximation which expresses optical property of a substance by refractive index is established under the condition where D is 5–10 nm or larger, as set forth in T. Mukai, "Iwanami Science Library 8, Asteroids are coming", 1994, Iwanami Shoten, p.58. Also, if the value of D exceeds 500λ, scattering of light is caused in a geometrical pattern, so that scattering of light at the interface between the macromolecules and the liquid crystal molecules 517 constituting the macromolecular cells is increased in conformance with the Fresnel's equation of reflection. Therefore, for practical use, D is chosen to satisfy the following condition:

$$7 \ nm \leq D \leq 500\lambda \tag{29}$$

Figure 34:
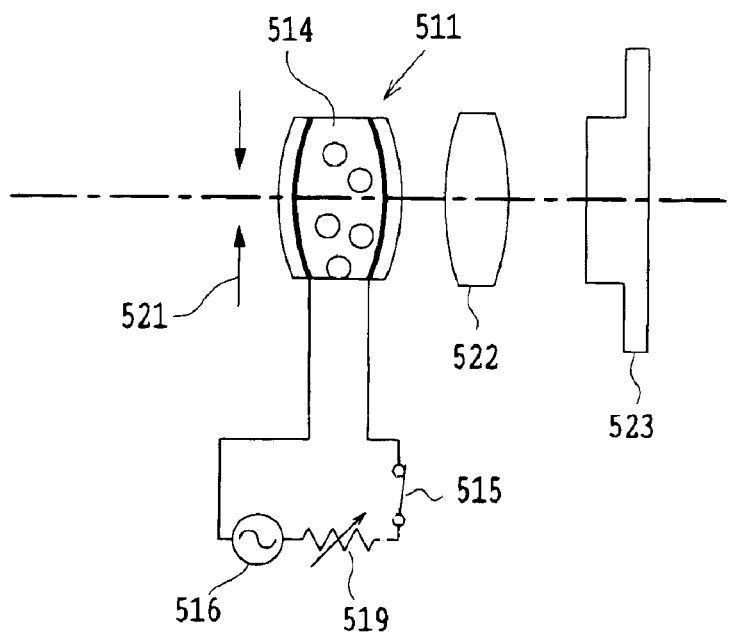
FIG. 34 is a diagram that shows one example of the imaging optical system of a digital camera using a variable focus lens.

FIG. 34 shows the configuration of an imaging optical system for a digital camera, which optical system uses the variable focus lens 511 shown in FIG. 33. In this imaging optical system, an image of an object (not shown) is formed, via a stop 521, the variable focus lens 511 and a lens 522, on a solid-state image sensor 523 constructed of, for example, a CCD. In FIG. 34, illustration of liquid crystal molecules is omitted.

In this imaging optical system, the alternating voltage applied to the macromolecular dispersed liquid crystal layer 514 of the variable focus lens 511 is controlled by the variable resistor 519 to change the focal length of the variable focus lens 511. Whereby, continuous focusing can be achieved in response to the object distance, for example, from infinity to 600 mm without moving the variable focus lens 511 or the lens 522 along the optical axis.

Figure 35:
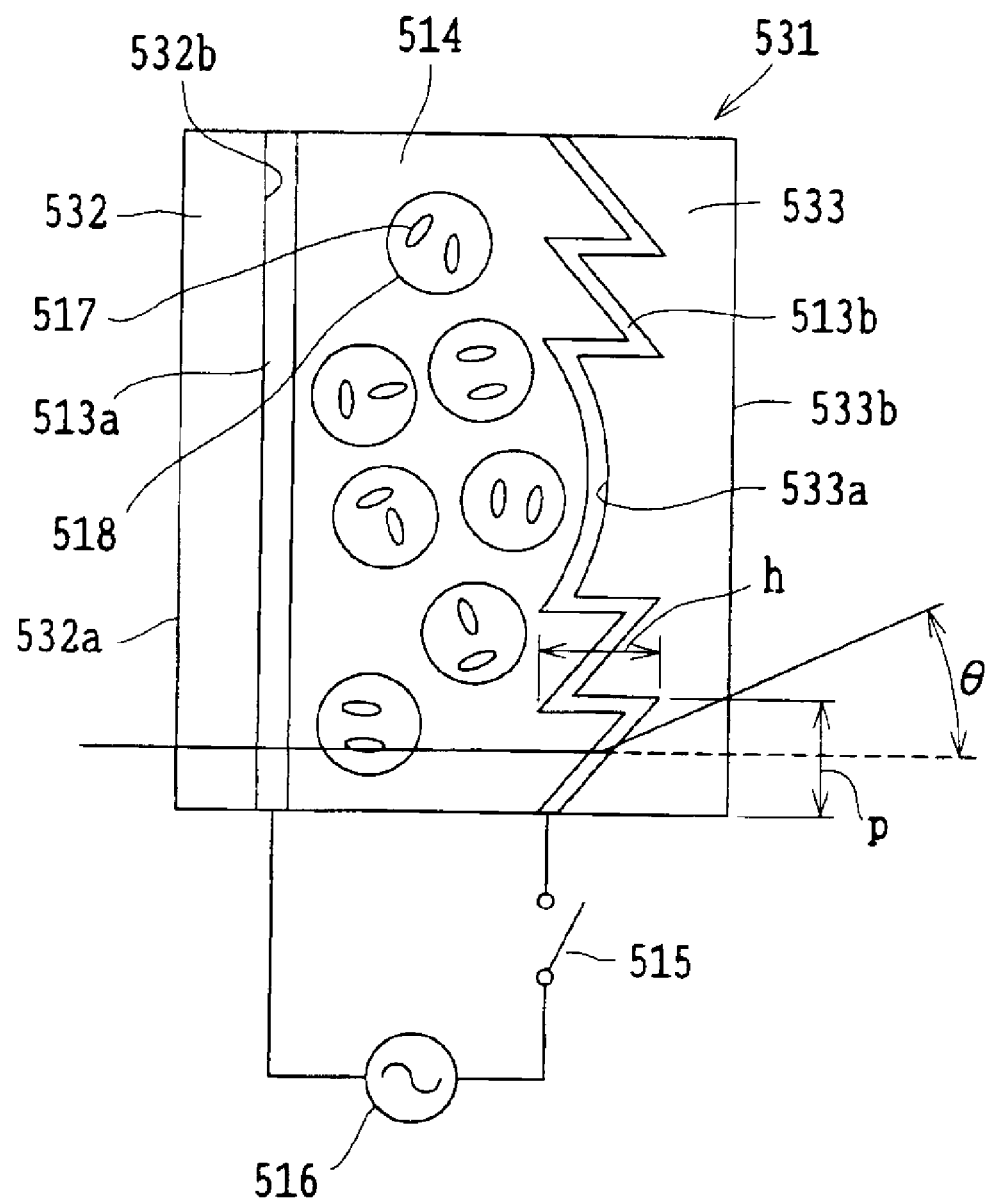
FIG. 35 is a diagram that shows one configuration example of a variable-focus, diffraction optical element.

FIG. 35 is a diagram that shows one configuration example of a variable-focus, diffraction optical element that is applicable to the zoom optical system according to the present invention.

This variable-focus, diffraction optical element 531 includes a first transparent substrate 532 having a first surface 532a and a second surface 532b parallel with each other and a second transparent substrate 533 having a third surface 533a that forms thereon an annular diffraction grating with a saw-like cross section having a groove depth of the order of the wavelengths of light and a fourth surface 533b that is flat. Incident light is designed to emerge through the first and second transparent substrates 532 and 533. As explained for FIG. 30, the macromolecular dispersed liquid crystal layer 514 is sandwiched between the transparent substrates 532 and 533 via the transparent electrodes 513a and 513b so that an alternating-current voltage is applied thereto as the transparent electrodes 513a and 513b are connected with the alternating-current power supply 516 via the switch 515.

In this configuration, a ray of light incident on the variable-focus, diffraction optical element 531 is emergent therefrom as deflected by an angle θ satisfying the following condition:

$$p \sin \theta = m\lambda \tag{30}$$

where p is the grating pitch of the third surface 533a and m is an integer. Also, if the following conditions are satisfied, the diffraction efficiency becomes 100% for a wavelength λ, to prevent production of flare:

$$h(n_A - n_{33}) = m\lambda \quad (31)$$

$$h(n_B - n_{33}) = k\lambda \quad (32)$$

where h is the groove depth, $n_{33}$ is the refractive index of the transparent substrate 33, $n_A$ is the refractive index of the macromolecular dispersed liquid crystal layer 514 under the condition where the alternating-current voltage is not applied, $n_B$ is the refractive index of the macromolecular dispersed liquid crystal layer 514 under the condition where the alternating-current voltage is applied, and k is an integer.

Here, subtraction of Equation (32) from Equation (31) for both sides yields the following equation:

$$h(n_A - n_B) = (m - k)\lambda \quad (33)$$

Therefore, when it is assumed that λ=500 nm, $n_A$=1.55, and $n_B$=1.5, for example, then:

$$0.05 \ h = (m-k) \cdot 500 \text{ nm}$$

and if it is further assumed here that m=1 and k=0, $$h = 10000 \text{ nm} = 10 \ \mu m$$

In this case, the refractive index $n_{33}$ of the transparent substrate 533 is given by Equation (31) as $n_{33}$=1.5. Also, if the grating pitch p on the periphery of the variable-focus, diffraction optical element 531 is 10 μm, θ is approximately 2.870 and accordingly a lens with F-number of 10 can be obtained.

Since this variable-focus, diffraction optical element 531 changes its optical path length in accordance with on-off operation of the voltage applied to the macromolecular dispersed liquid crystal layer 514, it can be disposed at a position where a beam of rays is non-parallel in the lens system so as to perform focus adjustment or to change the focal length of the entire lens system.

In this example, regarding Condition (31)–(33), satisfying the following, less limited conditions are sufficient for practical use:

$$0.7m\lambda \leq h(n_A - n_{33}) \leq 1.4m\lambda \quad (34)$$

$$0.7k\lambda \leq h(n_B - n_{33}) \leq 1.4m\lambda \quad (35)$$

$$0.7(m-k)\lambda \leq h(n_A - n_B) \leq 1.4(m-k)\lambda \quad (36)$$

Figure 36:
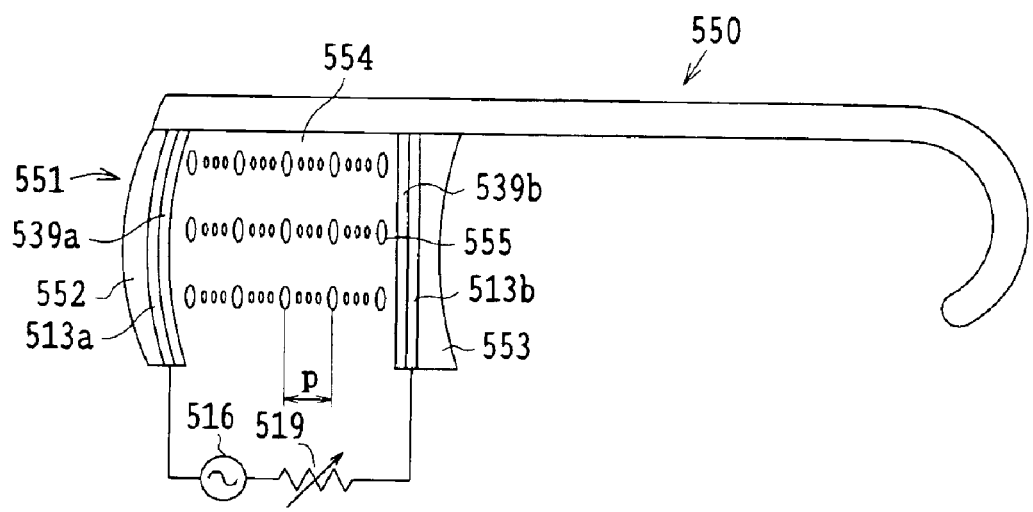
FIG. 36 is a diagram that shows a configuration of variable focus spectacles having variable focus lenses using twisted nematic liquid crystal.
Figure 37:
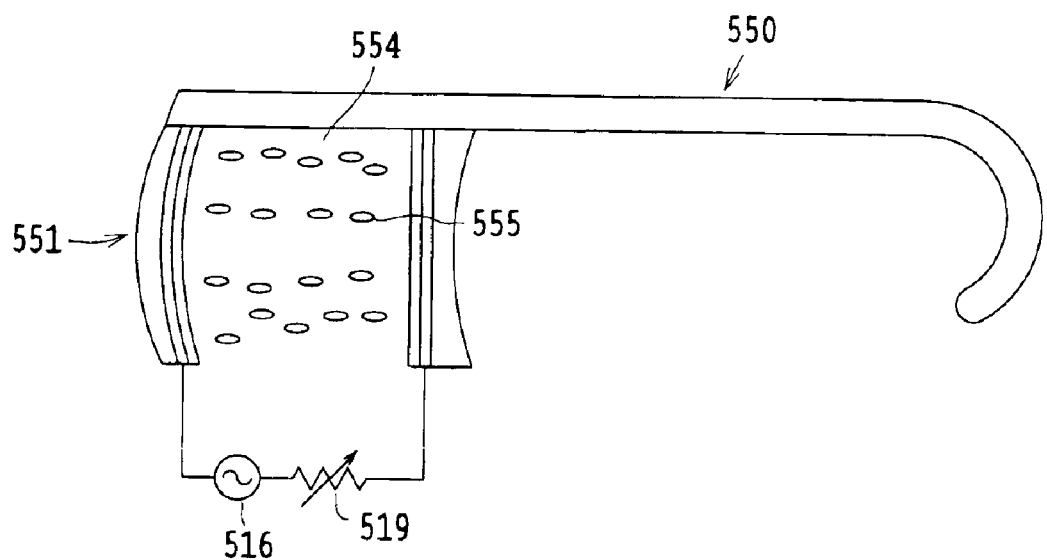
FIG. 37 is a diagram that shows the orientation of liquid crystal molecules where the voltage applied to the twisted nematic liquid crystal layer shown in FIG. 36 is set high.

Some variable focus lenses use twisted nematic liquid crystal. FIG. 36 and FIG. 37 show a configuration of variable focus spectacles 550 of this type in side sectional views. A variable focus lens 551 includes lenses 552 and 553, orientation films 539a and 539b formed on the inside surfaces of these lenses via the transparent electrodes 513a and 513b, respectively, and a twisted nematic liquid crystal layer 554 sandwiched between the orientation films. The transparent electrodes 513a and 513b are connected with the alternating-current power supply 516 via the variable resistor 519 so as to apply an alternating-current voltage to the twisted nematic liquid crystal layer 554.

In this configuration, when the voltage applied to the twisted nematic liquid crystal layer 554 is increased, liquid crystal molecules 555 exhibit homeotropic orientation, as shown in FIG. 37, to produce a lower refractive index and a longer focal length of the twisted nematic liquid crystal layer 554 than in the twisted nematic condition shown in FIG. 36 where the applied voltage is lower.

Here, the spiral pitch P of the liquid crystal molecules 555 in the twisted nematic condition shown in FIG. 36 is required to be nearly equal to or much smaller than the wavelength λ of light, and thus we set the following condition, for example:

$$2 \text{ nm} \leq P \leq 2\lambda/3 \quad (37)$$

The lower limit value of this condition depends on the size of liquid crystal molecules, while the upper limit value is set as a necessary condition for the twisted nematic liquid crystal layer 554 to act as an isotropic medium in the condition of FIG. 36 when incident light is natural light. If the upper limit value is exceeded, the variable focus lens 551 becomes a lens that has focal lengths differing by direction of polarization. Accordingly, a dual image is formed, or only a blurred image is obtained.

Figure 38A:
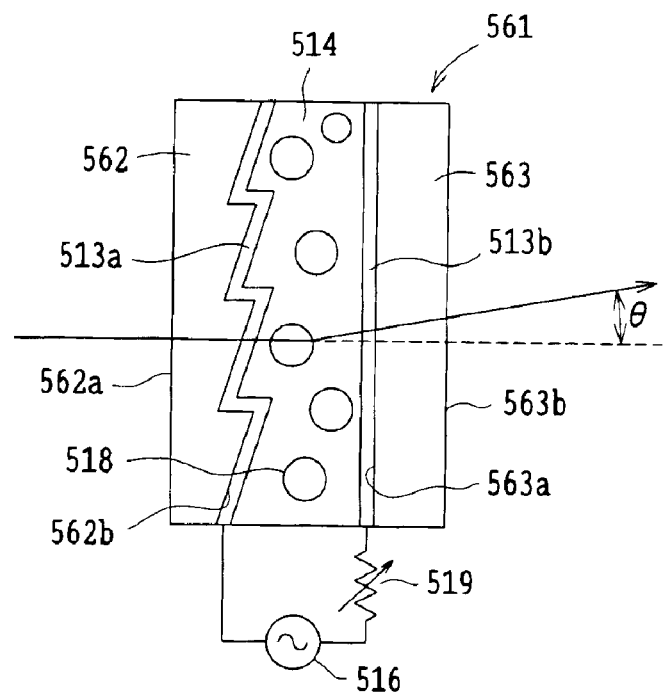
FIGS. 38A–38B are diagrams that show two configuration examples of variable deflection-angle prisms.

FIG. 38A shows a configuration of a variable deflection-angle prism, as a variable optical-property optical element applicable to the zoom optical system according to the present invention. The variable deflection-angle prism 561 includes an entrance-side, first transparent substrate 562 having a first surface 562a and a second surface 562b, and an exit-side, second transparent substrate 563 formed of a plane-parallel plate, having a third surface 563a and a fourth surface 563b. The inner surface (the second surface) 562b of the entrance-side, transparent substrate 562 is formed to have a Fresnel pattern. As explained for FIG. 30, the macromolecular dispersed liquid crystal layer 514 is sandwiched between this transparent substrate 562 and the exit-side, transparent substrate 563 via the transparent electrodes 513a and 513b. The transparent electrodes 513a and 513b are connected with the alternating-current power supply 516 via the variable resistor 519 so as to apply an alternating-current voltage to the macromolecular dispersed liquid crystal layer 514 for the purpose of controlling the deflection angle θ of light transmitted through the variable deflection-angle prism 561. In this way, transmitted light is controlled with respect to the deflection of deflection. In FIG. 38A, the inner surface 562b of the transparent substrate 562 is formed to have a Fresnel pattern. However, the prism may be configured as an ordinary prism with the inner surfaces of the transparent substrates 562 and 563 being inclined in reference to each other as shown in FIG. 39B or may be configured to have a diffraction grating shown in FIG. 35. In the latter case, Conditions (30)–(36) are applicable in the similar manner.

Figure 38B:
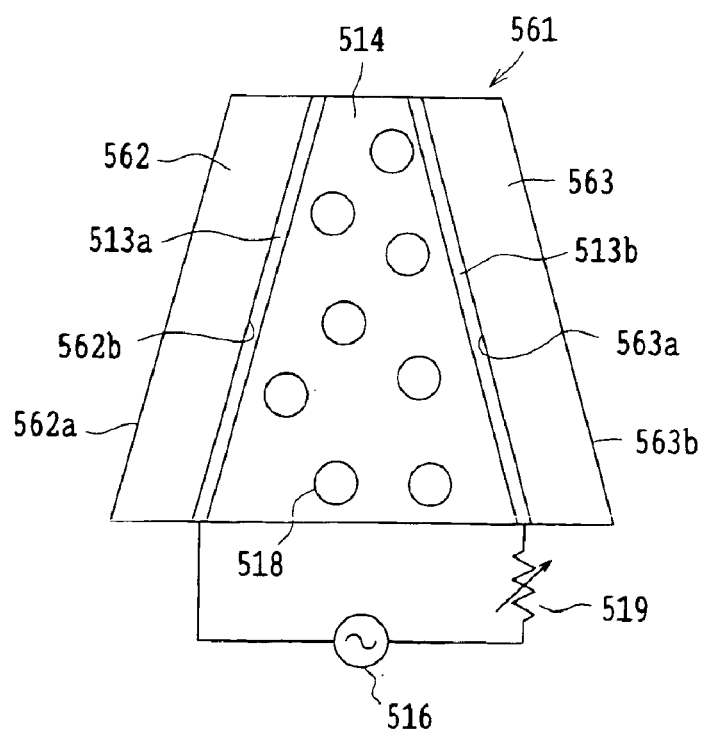
Figure 39:
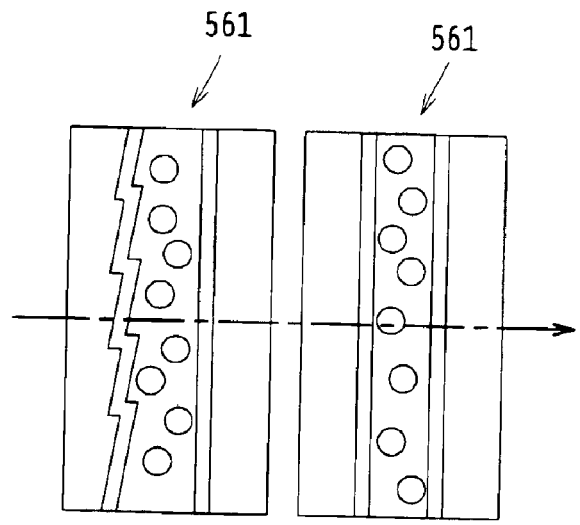
FIG. 39 is a diagram for explaining the application of the variable deflection-angle prisms shown in FIGS. 38A–38B.

The variable deflection-angle prism 561 of this configuration can be effectively used for shake prevention for TV cameras, digital cameras, film cameras, binoculars, etc. In this case, it is desirable that the direction of refraction (direction of deflection) by the variable deflection-angle prism 561 is vertical. In order to further improve performance, however, it is desirable that two variable deflection-angle prisms 561, one of which is shown in FIG. 38A, are arranged to have different directions of deflection from each other such that, as shown in FIG. 39, for example, the refraction angle is changeable in directions perpendicular to each other, or vertical and horizontal directions. In FIGS. 38A–38B and FIG. 39, illustration of the liquid crystal molecules is omitted.

Figure 40:
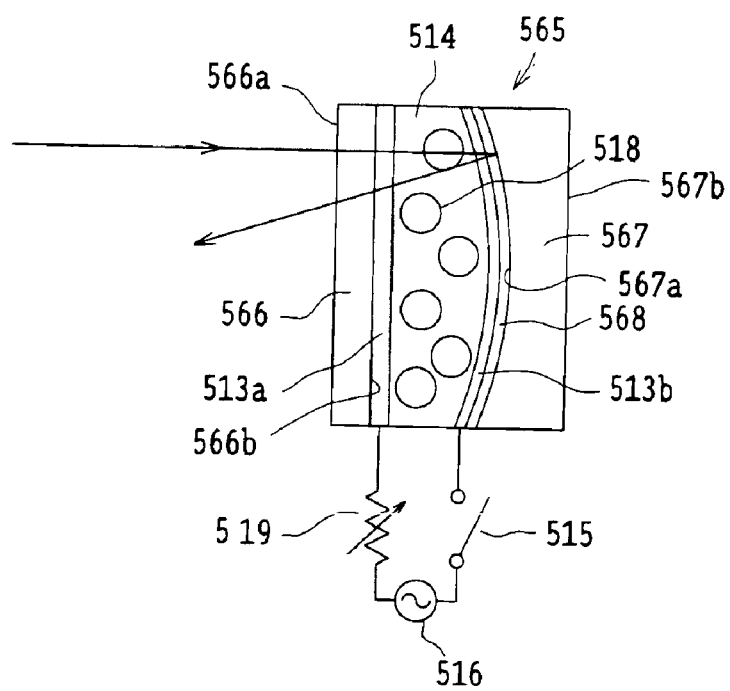
FIG. 40 is a diagram that shows one configuration example of the variable focus mirror as a variable focus lens.

FIG. 40 shows an example where a variable focus lens is used as the variable focus mirror that is applicable to the zoom optical system according to the present invention. The variable focus mirror 565 includes a first transparent substrate 566 having a first surface 566a and a second surface 566b, and a second transparent substrate 567 having a third surface 567a and a fourth surface 567b. The first transparent substrate 566 is configured to have a flat plate shape or a lens shape and to be provided with the transparent electrode 513a on the inner surface (the second surface) 566b thereof. The second transparent substrate 567 is configured so that the inner surface (the third surface) 567a thereof is shaped as a concave surface, which is coated with a reflecting film 568, on which the transparent electrode 513b is further provided. As explained for FIG. 30, the macromolecular dispersed liquid crystal layer 514 is sandwiched between the transparent electrodes 513a and 513b so that an alternating-current voltage is applied thereto as the transparent electrodes 513a and 513b are connected with the alternating-current power supply 516 via the switch 515 and the variable resistor 519. In FIG. 40, illustration of liquid crystal molecules is omitted.

In this configuration, since a ray of light incident on the mirror from the side of the transparent substrate 566 forms a path reciprocated in the macromolecular dispersed liquid crystal layer 514 by the reflecting film (reflecting surface) 568, the macromolecular dispersed liquid crystal layer 514 exerts its function twice. Also, by changing the voltage applied to the macromolecular dispersed liquid crystal layer 514, it is possible to shift the focal position for reflected light. In this case, since a ray of light incident on the variable focus mirror 565 is transmitted through the macromolecular dispersed liquid crystal layer 514 twice, when twice the thickness of the macromolecular dispersed liquid crystal layer 514 is represented by t, the numerical conditions set forth above are applicable in the similar manner. Also, the inner surface of the transparent substrate 566 or 567 can be configured as a diffraction grating, as shown in FIG. 35, to reduce the thickness of the macromolecular dispersed liquid crystal layer 514. This solution is favorable in reducing scattered light.

In the description set forth above, the alternating-current power supply 516 is used as a power source to apply an alternating-current voltage to the liquid crystal layer for the purpose of preventing deterioration of the liquid crystal. However, a direct-current power supply may be used to apply a direct-current voltage to the liquid crystal. Change of orientation of the liquid crystal molecules may be achieved by, not limited to the technique of changing the voltage, a technique of changing frequency of an electric field applied to the liquid crystal layer, intensity and frequency of a magnetic field applied to the liquid crystal layer, or temperature or the like of the liquid crystal layer. In the configuration examples described above, some kind of the macromolecular dispersed liquid crystal is nearly a solid rather than a liquid. In such a case, therefore, one of the lenses 512a and 512b shown in FIG. 30, one of the transparent substrates 532 and 533 shown in FIG. 35, one of the lenses 552 and 553 shown in FIG. 36, the transparent substrate 563 shown in FIG. 38A, one of the transparent substrates 562 and 563 shown in FIG. 38B, or one of the transparent substrates 566 and 567 shown in FIG. 40 is dispensable.

The optical element of the type as set forth in reference to FIGS. 30–40, the focal length of which is changed by altering the refracting index of a medium that forms a macromolecular dispersed liquid crystal layer, has merits such that it facilitates mechanical design, has a simple mechanical structure and so on because of its unchanged shape.

Figure 41:
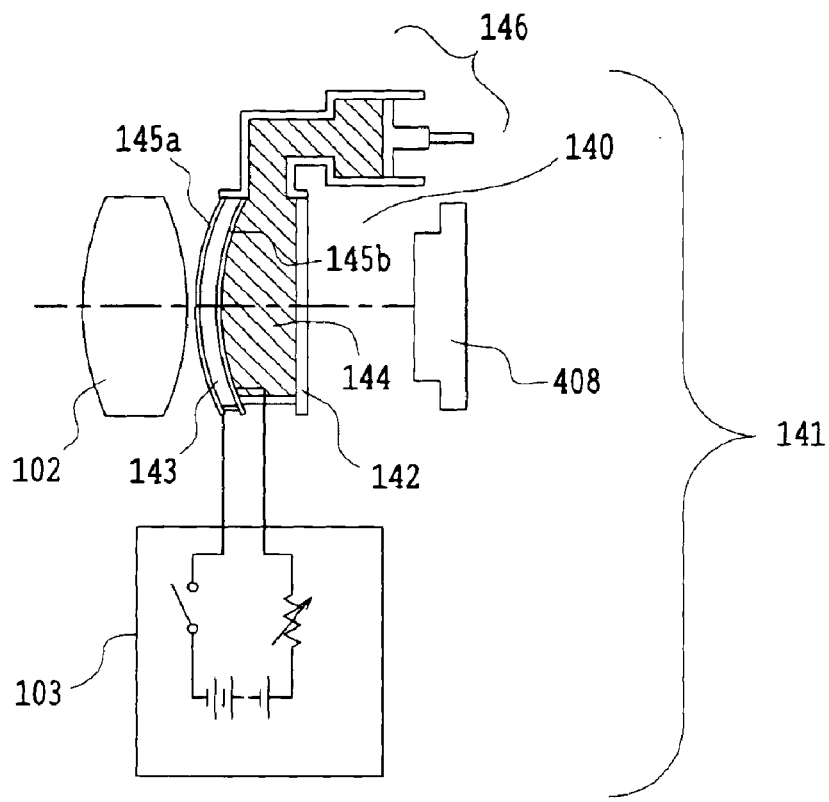
FIG. 41 is a schematic configuration diagram of an imaging unit in which a variable focus lens applicable to the zoom optical system according to the present invention is used.

FIG. 41 shows an imaging unit 141 in which a variable focus lens 140 applicable to the zoom optical system according to the present invention is used. The imaging unit 141 can be used as an imaging optical system according to the present invention.

In this example, a lens 102 and the variable focus lens 140 constitute an imaging lens system. This imaging lens system and the solid-state image sensor 408 constitute the imaging unit 141. The variable focus lens 140 includes a planar transparent member 142, a soft transparent substance 143 such as piezoelectric synthetic resin sandwiched between a pair of transparent electrodes 145a and 145b, and a light-transmitting fluid or jelly-like substance 144 sandwiched between the transparent member 142 and the transparent electrode 145b.

As the fluid or jelly-like substance 144, silicon oil, elastic rubber, jelly, or water can be used. When voltages are applied via a circuit 103 to the transparent electrodes 145a and 145b between which the transparent substance 143 is sandwiched, the transparent substance 143 is deformed by piezoelectric effect of the transparent substance 143, to change the focal length of the variable focus lens 140. A power supply, a variable resistor, and a switch are provided in the circuit 103. When the transparent substance 143 is deformed, a pressure is applied to the fluid or jelly-like substance 144 via a cylinder 146 so that deformation of the fluid or jelly-like substance 144 can follow the deformation of the transparent substance 143.

Therefore, according to this example, even if the object distance is changed, focusing can be made without moving the imaging optical system by a motor, and thus such an imaging unit excels in compact and lightweight design and low power consumption.

It is noted that the cylinder 146 is provided for storing the fluid or jelly-like substance 144. Also, as materials of the transparent substance 143, macromolecular piezoelectric such as polyurethane, silicon rubber, acrylic elastomer, PZT, PLZT, and PVDF; vinylidene cyanide copolymer; copolymer of vinylidene fluoride and trifluoroethylene; etc. are usable.

Use of an organic substance having a piezoelectric property, a synthetic resin having a piezoelectric property, or the elastomer having a piezoelectric property brings about a considerable deformation of the surface of the variable focus lens 140, and thus is favorable. It is good practice to use a transparent piezoelectric substance for the transparent substrate 143 of the variable focus lens 140.

Figure 42:
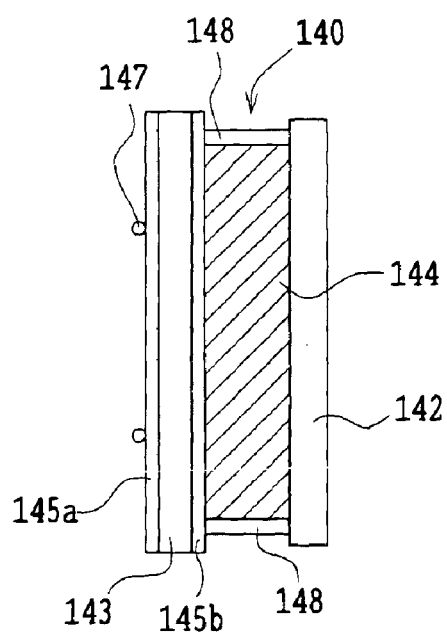
FIG. 42 is an explanatory diagram that shows a modification example of the variable focus lens shown in FIG. 41.

As shown in FIG. 42, the variable focus lens 140 shown in FIG. 41 may be modified to provide, instead of the cylinder 146, a support member 147 and a deformable member 148 that is to dam up the fluid or jelly-like substance 144 at the circumferential face of the lens.

Figure 43:
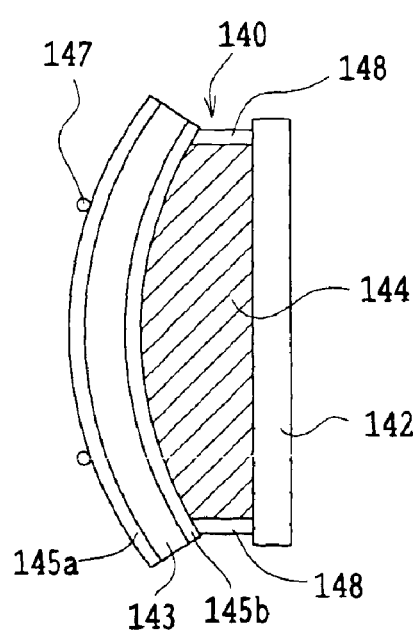
FIG. 43 is an explanatory diagram that shows a state where the variable focus lens shown in FIG. 42 is deformed.

The support member 147 is formed of an annular member fixed to keep a constant distance from the transparent member 142. The substrate 144, which is in a sealed space formed by the transparent member 142, the electrode 145b, and the member 148, is situated between the support member 147 and the transparent member 142 and is deformed, following deformation of the transparent substance 143 sandwiched between the pair of transparent electrodes 145a and 145b. The circumferential face of the transparent substance 143 is sealed. As shown in FIG. 43, according to this example, even when a voltage is applied to the transparent substance 143 via the pair of transparent electrodes 145a and 145b to thereby deform the transparent substance 143, deformation of the deformable member 148 takes place so that the entire volume of the fluid or jelly-like substance 144 remains unchanged. Therefore, the cylinder 146 is not necessary. The deformable member 148 is formed of an elastic body or synthetic resin or metal with an accordion-shape.

In each of the examples shown in FIG. 41 and FIG. 42, if the polarity of the applied voltage is changed, the transparent substance 143 is deformed in the opposite direction, and thus a concave lens also can be formed.

In a case where an electrostrictive substance such as acrylic elastomer or silicon rubber is used for the transparent substance 143, the transparent substance preferably has a structure in which a transparent substrate and the electrostrictive substance are cemented together.

Figure 44:
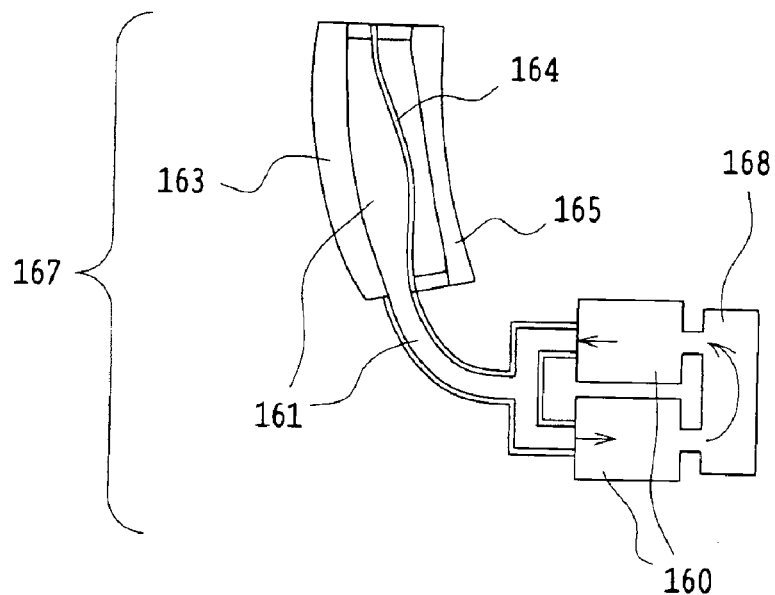
FIG. 44 is a schematic configuration diagram of another example of the variable focus lens, in which fluid is taken in and out by a micropump to deform a lens surface.

FIG. 44 relates to still another example of the variable focus lens applicable to the zoom optical system according to the present invention. The variable focus lens 167 of this example is constructed so that fluid 161 is taken in and out by micropumps 160 to deform the lens surface.

Each of the micropumps 160 is, for example, a small-sized pump fabricated by micromachining technique and is configured to work using an electric power. The fluid 161 is sandwiched between a transparent substrate 163 and a transparent elastic body 164. The elastic body 164 forms a lens surface to be deformed by the fluid 161. In FIG. 44, the reference numeral 165 denotes a transparent substrate for protecting the elastic body 164, but this substrate is not necessarily required.

As examples of pumps fabricated by the micromachining technique, there are those which use thermal deformation, piezoelectric substance, electrostatic force, etc.

Use of two micropumps, each of which is similar to the micropump 180 shown in FIG. 29, can form, for example, the micropumps 160 used in the variable focus lens shown in FIG. 44. In this configuration, when the micropumps 160, as driven, cause the fluid 161 to flow and to deform the elastic body 164, the shape of the lens surface is changed to vary the focal length for light transmitted through the transparent substrate 163, the fluid 161 and the elastic body 164.

Also, a variable focus lens or the like using electrostatic force or piezoelectric effect sometimes requires a high voltage for driving it. In this case, for example, a boosting transformer or a piezoelectric transformer is preferably used to configure the control system. Specifically, use of a laminated piezoelectric transformer facilitates compact design and thus is favorable.

Figure 45:
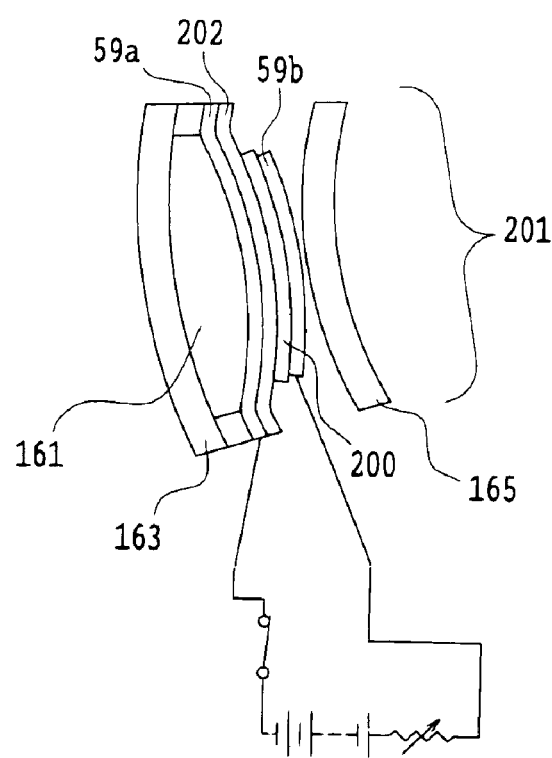
FIG. 45 is a schematic configuration diagram of another example of the variable optical-property optical element, which is a variable focus lens using a piezoelectric substance.

FIG. 45 relates to another example of the variable optical-property optical element applicable to the zoom optical system according to the present invention. The variable focus lens 201 of this example uses a piezoelectric substance 200 instead of the elastic body 164 shown in FIG. 44. The fluid 161 is enclosed in a sealed space between the transparent substrate 163 and a transparent electrode 59a.

The same substance as the transparent substance 143 is used for the piezoelectric substance 200, which is provided on a soft transparent substrate 202. It is desirable that synthetic resin or an organic substance is used for the substrate 202.

In this example, a voltage is applied to the piezoelectric substance 200 via transparent electrodes 59a and 59b, and thereby the piezoelectric substance 200 is deformed, to exert the function as a convex lens as shown in FIG. 45.

Figure 46:
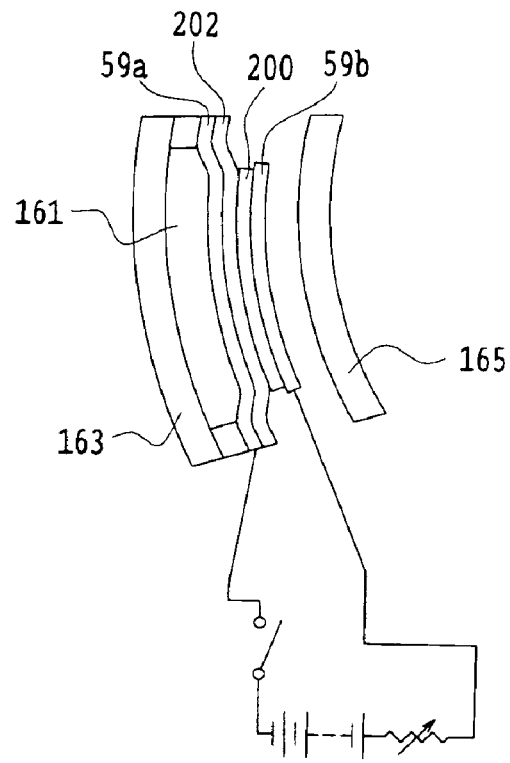
FIG. 46 is an explanatory diagram that shows a state where the variable focus lens shown in FIG. 45 is deformed.

The substrate 202 is preliminarily formed to have a convex shape, and at least one of the transparent electrodes 59a and 59b is formed to have a different size from the substrate 202, for example, the electrode 59a is made smaller than the substrate 202. According to this structure, as shown in FIG. 46, when the applied voltage is removed, only a predetermined portion that faces the two transparent electrodes 59a and 59b is deformed into a concave shape to have a function of a concave lens. In this way, the device acts as a variable focus lens.

In this case, since the substrate 202 is deformed so that the entire volume of the fluid 151 remains unchanged, there is a merit that the liquid tank 168 is not necessary.

This example has a great merit that a part of the substrate 202 holding the fluid 161 is deformed by the piezoelectric substance, to dispense with the liquid tank 168.

Figure 49:
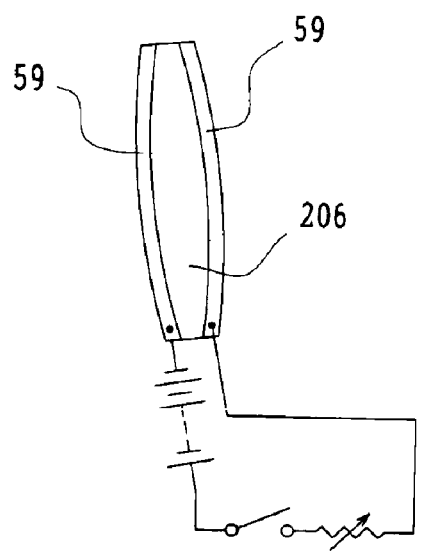
FIG. 49 is an explanatory view that shows a state where the variable focus lens shown in FIG. 48 is deformed.

The transparent substrates 163 and 165 may be formed as lenses or to have plane surfaces, as can be said for the example of FIG. 49 also.

Figure 47:
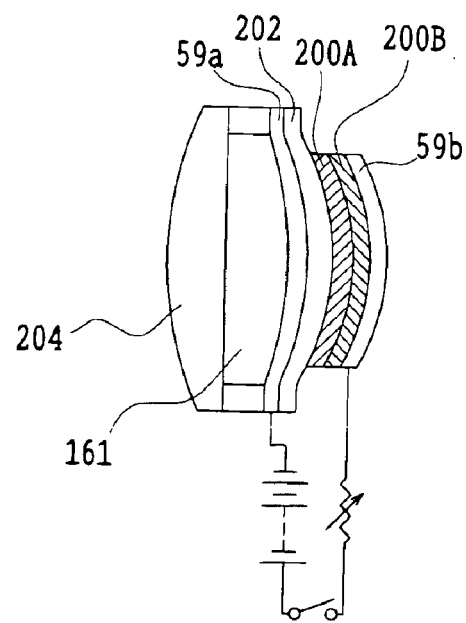
FIG. 47 is a schematic configuration diagram of still another example of the variable optical-property optical element, which is a variable focus lens using two thin plates made of piezoelectric substances.

FIG. 47 relates to still another example of the variable optical-property optical element applicable to the zoom optical system according to the present invention. The variable focus lens of this example uses two thin plates 200A and 200B made of piezoelectric substances, in place of the piezoelectric substance 200 of FIG. 46.

In this variable focus lens, piezoelectric substances of the thin plates 200A and 200B are arranged to have opposite directionalities, to thereby secure a large amount of deformation and accordingly a wide variable focus range, which is a merit.

In FIG. 47, the reference numeral 204 denotes a lens-shaped transparent substrate, and the reference numeral 161 denotes fluid. In this example also, the transparent substrate 59b on the right side in the figure is made smaller than the substrate 202.

In the examples of FIGS. 45–47, each of the substrate 202, the piezoelectric substance 200, and the thin plates 200A and 200B may have uneven thickness, to control the state of deformation caused by application of the voltage. This arrangement allows lens aberrations to be compensated for and thus is convenient.

Figure 48:
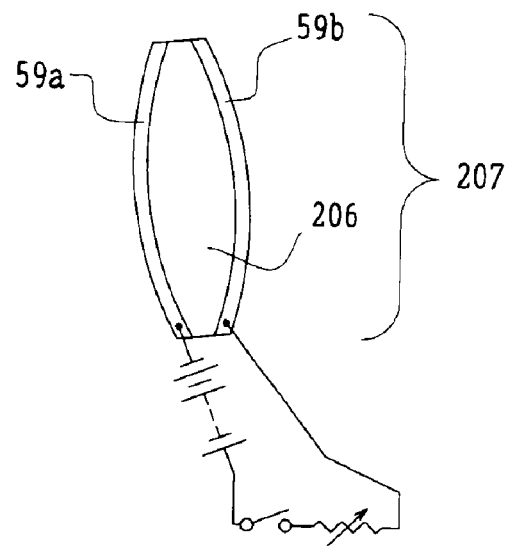
FIG. 48 is a schematic configuration diagram that shows still another example of the variable focus lens.

FIG. 48 shows still another example of the variable focus lens applicable to the zoom optical system according to the present invention. A variable focus lens 207 of this example has an electrostrictive substance 206 such as silicon rubber or acrylic elastomer between the pair of the transparent electrodes 59a and 59b.

According to this example, when a low voltage is applied, the electrostrictive substance 206 expands at the middle portion thereof as illustrated in FIG. 48 and acts as a convex lens, while, as the voltage is increased, the electrostrictive substance 206 expands in a vertical direction and contracts in a horizontal direction, as illustrated in FIG. 49, and accordingly the focal length is increased. In this way, the device acts as a variable focus lens.

In the variable focus lens of this example, since a large power supply is not required, power consumption is saved, which is the merit.

The feature common to the variable focus lenses shown in FIGS. 41–49 set forth above is that the shape of the medium acting as a lens is changed to achieve the variable focus. Such variable focus lenses have the merit that the variable focus range, the lens size and so on can be freely chosen, in comparison with those which change refractive index of the medium.

Figure 50:
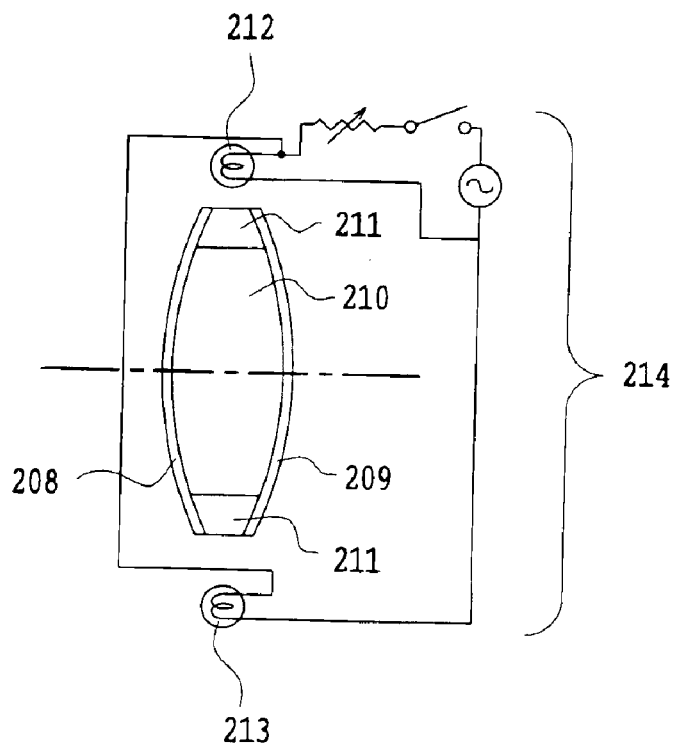
FIG. 50 is a schematic configuration diagram of still another example of the variable optical-property optical element, which is a variable focus lens using a photonical effect.

FIG. 50 shows a variable focus lens using a photomechanical effect, as still another example of the variable optical-property optical element applicable to the zoom optical system according to the present invention.

A variable focus lens 214 of this example is designed so that azobenzene 210 is sandwiched between transparent elastic bodies 208 and 209 and is irradiated with light through a transparent spacer 211.

In FIG. 50, the reference numerals 212 and 213 denote light sources, such as LEDs or semiconductor lasers, having central wavelengths $\lambda_1$ and $\lambda_2$, respectively.

Figures 51A, 51B:
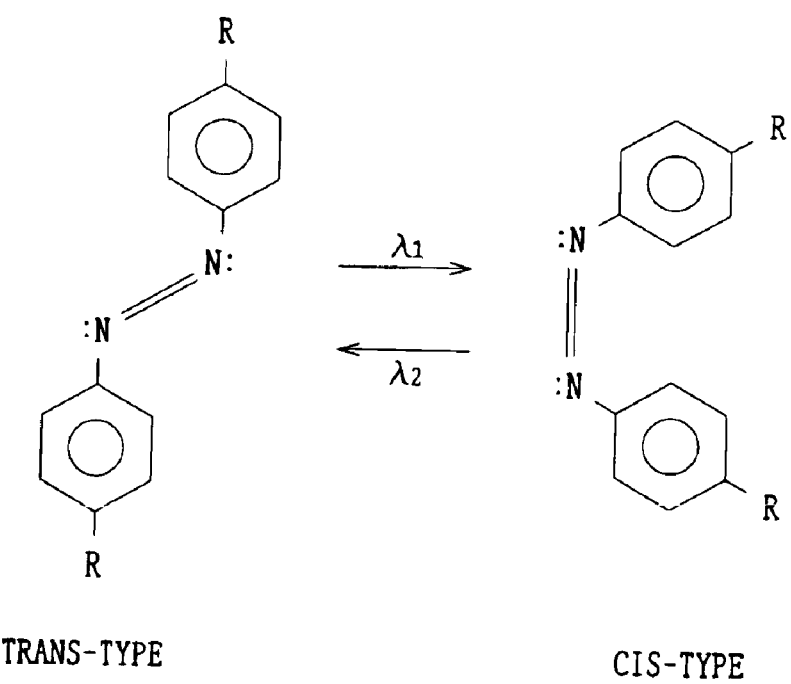
FIGS. 51A–51B are diagrams that show the structure of trans-type and cis-type azobenzene, respectively, used in the variable focus lens shown in FIG. 50.

In this example, when trans-type azobenzene shown in FIG. 51A is irradiated with light having the central wavelength $\lambda_1$, the azobenzene 210 is changed to cis-type azobenzene shown in FIG. 51B, to reduce its volume.

Consequently, the thickness of the variable focus lens 214 is decreased, to decrease the convex-lens function.

On the other hand, when the cis-type azobenzene is irradiated with light having the central wavelength $\lambda_2$, the azobenzene 210 is changed from the cis-type to the trans-type azobenzene, to increase its volume. Consequently, the thickness of the variable focus lens 214 is increased, to enhance the convex-lens function.

In this way, the optical element 214 of this example acts as a variable focus lens. In the variable focus lens 214, since the light causes total reflection at the interface between each of the transparent elastic bodies 208 and 209 and air, the light does not ooze outside and thus high efficiency is achieved.

Figure 52:
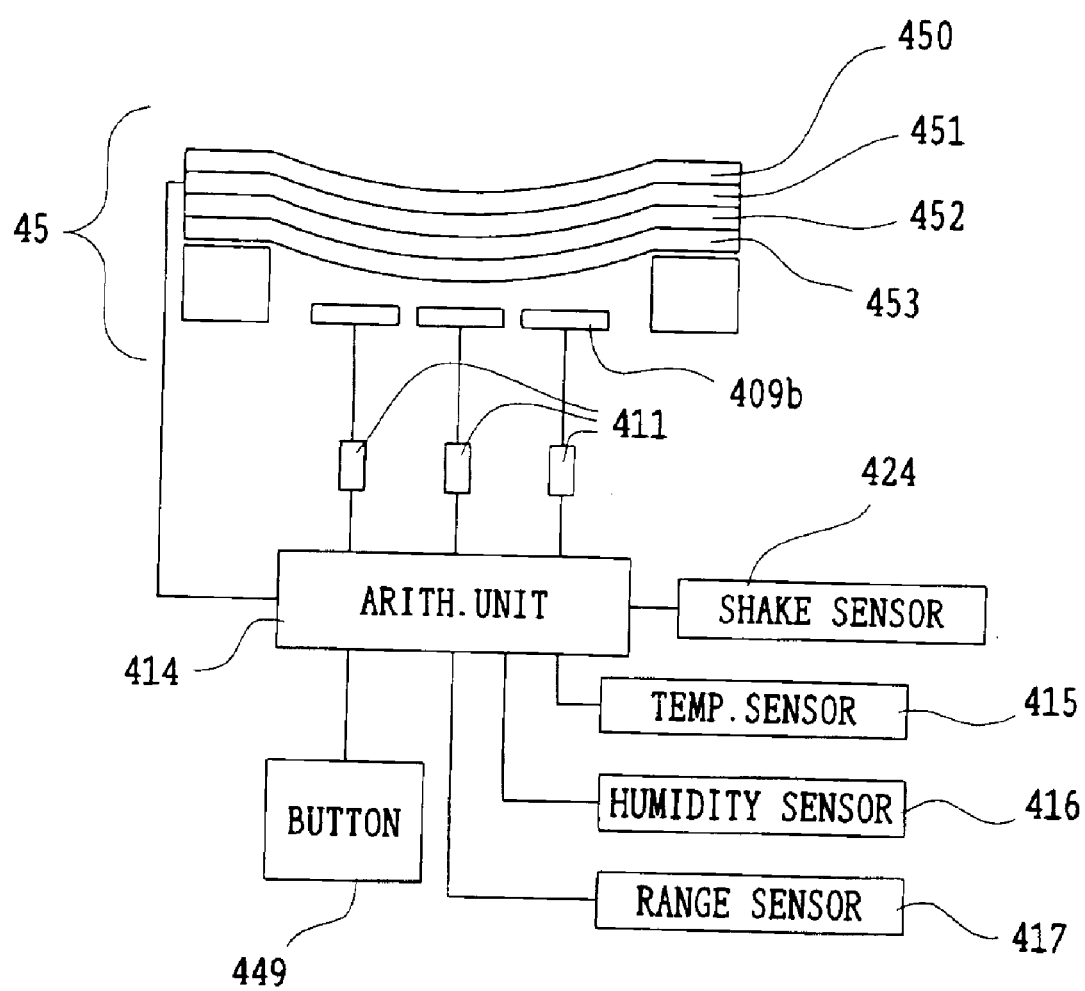
FIG. 52 is a schematic configuration diagram of still another example of the deformable mirror.

FIG. 52 shows still another example of the deformable mirror applicable to the zoom optical system according to the present invention. In this example, explanation is made on the basis of the supposition that the deformable mirror is applied to a digital camera. In FIG. 52, the reference numeral 411 denotes a variable resistor, the reference numeral 414 denotes an arithmetical unit, the reference numeral 415 denotes a temperature sensor, the reference numeral 416 denotes a humidity sensor, the reference numeral 417 denotes a range sensor, and the reference numeral 424 denotes a shake sensor.

The deformable mirror 45 of this example is configured to provide a plurality of segmented electrodes 409b disposed spaced away from an electrostrictive substance 453 made of an organic substance such as acrylic elastomer, to provide an electrode 452 and a deformable substrate 451 arranged in this order on the electrostrictive substance 453, and to provide a reflecting film 450 made of metal such as aluminum further on the substrate 451. In this way, the deformable layer of the deformable mirror 45 has a four-layer structure.

This configuration has a merit that the surface of the reflecting film (reflecting surface 450 is made smoother than in the case where the segmented electrodes 409b and the electrostrictive substance 453 are integrally constructed and thus aberrations are hard to generate optically. It is noted that the arrangement order of the deformable substrate 451 and the electrodes 452 may be reversed.

In FIG. 52, the reference numeral 449 denotes a button for performing magnification change or zooming of the optical system. The deformable mirror 45 is controlled via the arithmetical unit 414 so that a user can change the shape of the reflecting film 450 for magnification change or zooming by pushing the button 449.

It is noted that a piezoelectric substance such as barium titanate set forth above may be used instead of the electrostrictive substance made of an organic substance such as acrylic elastomer.

As is commonly applicable to the various deformable mirrors described above, it is desirable that the contour of the deformable portion of the reflecting surface as viewed from a direction perpendicular to the reflecting surface is oblong in the direction of the plane of incidence of an axial ray, for example, elliptical, oval, or polygonal. The reason is as follows. The deformable mirror, as in the example of FIG. 36, is often used in a state where a ray of light is incident at a grazing angle. In order to suppress aberrations generated in this case, it is desirable that the reflecting surface has a shape similar to ellipsoid of revolution, paraboloid of revolution, or hyperboloid of revolution. In order to deform the reflecting surface of the deformable mirror into such a shape, it is desirable that the contour of the deformable portion of the reflecting surface as viewed from the direction perpendicular to the reflecting surface is shaped oblong in the direction of the plane of incidence of an axial ray.

Finally, definitions of terms used in the present invention will be described.

An optical apparatus refers to an apparatus including an optical system or optical elements. It is not necessary that the optical apparatus can function by itself, that is, the optical apparatus may be a part of an apparatus.

An imaging apparatus, an observation apparatus, a display apparatus, an illumination apparatus, a signal processing apparatus, etc. are classified into the optical apparatus.

As examples of the imaging apparatus, there are a film camera, a digital camera, robot eyes, a lens-exchange-type digital single-lens reflex camera, a TV camera, a motion-picture recording apparatus, an electronic motion-picture recording apparatus, a camcorder, a VTR camera, an electronic endoscope, etc. The digital camera, a card-type digital camera, the TV camera, the VTR camera, the motion-picture recording camera, etc. are examples of the electronic imaging apparatus.

As examples of the observation apparatus, there are a microscope, a telescope, spectacles, binoculars, a magnifying glass, a fiberscope, a finder, a viewfinder, etc.

As examples of the display apparatus, there are a liquid crystal display, a viewfinder, a game machine (PlayStation by SONY), a video projector, a liquid crystal projector, a head mounted display (HMD), a personal data assistant (PDA), a cellular phone, etc.

As examples of the illumination apparatus, there are a strobe for a camera, a headlight of an automobile, a light source for an endoscope, a light source for a microscope, etc.

As examples of the signal processing apparatus, there are a cellular phone, a personal computer, a game machine, a read/write apparatus for optical discs, an arithmetical unit in an optical computer, etc.

The zoom optical system according to the present invention is small and lightweight, and thus is effectively used as an imaging system in an electronic imaging apparatus or in a signal processing apparatus, in particular, in a digital camera or a cellular phone.

The image pickup element refers to, for example, a CCD, a pickup tube, a solid-state image sensor, and a photographic film. A plane parallel plate is classified into the prism. Change of the observer includes the case where the diopter is changed. Change of the object includes the cases where the object distance is changed, where the object is displaced, where the object is moved, vibrated, or shaken, etc.

The expanded curved surface is defined as follows.

Not limited to a spherical, planar or rotationally symmetric aspherical surface, a surface may be configured as a spherical, planar or rotationally symmetric aspherical surface that is decentered from the optical axis, an aspherical surface defining planes of symmetry, only one plane of symmetry or no plane of symmetry, a free-formed surface, a surface having an indifferentiable point or line, or the like. In addition, irrespective of whether it is a reflecting surface or a refracting surface, any surface is applicable as long as it can exert some effect on light. According to the present invention, these surfaces are generally referred to as expanded curved surfaces.

A variable focus lens, a variable mirror, a polarizing prism having a variable surface shape, a variable apex-angle prism, a variable diffraction optical element having a variable light-deflecting function, that is, a variable HOE or a variable DOE, etc. are classified into the variable optical-property optical element.

A variable lens that changes not the focal length but the amount of aberrations is classified into the variable optical-property optical element, also. Regarding the variable mirror also, similar classification is applied.

To conclude, an optical element that is changeable in light deflecting function such as reflection, refraction and diffraction is referred to as a variable optical-property optical element.

A data transmitter refers to an apparatus that allows data to be input therein and transmits the data, including a cellular phone; a fixed phone; a game machine; a remote controller of a TV set; a radio cassette recorder or a stereo set, a personal computer; and a keyboard, a mouse, a touch panel, etc. of a computer.

A TV monitor provided with an imaging device, and a monitor and a display of a personal computer also are classified into the data transmitter. Also, the data transmitter is classified into the signal processing apparatus.

What is claimed is:

1. A zoom optical system comprising:
   a deformable element having a focusing function; and
   two lens groups movable in a magnification change,
   wherein the two lens groups have a magnification varying function or a compensating function for compensating for a shift of an image surface.

2. A zoom optical system according to claim 1, wherein the following condition is satisfied:

$$0.40 < |\beta_{DMW}| < 1.0$$

where $\beta_{DMW}$ is a magnification, at a wide-angle end position, of all of lens groups that are disposed on an image side of the deformable element.

3. A zoom optical system according to claim 1, wherein lenses constituting the lens groups have at least one lens surface that is rotationally symmetric, and the lens surface is disposed as decentered from an optical axis.

4. A zoom optical system according to claim 1, wherein the zoom optical system has a magnification varying group having a magnification varying function, and the deformable element is disposed before the magnification varying group.

5. A zoom optical system according to claim 1, wherein the deformable element is deformable from a predetermined first state to a second state where the zoom optical system is focused on an object that is placed at an infinity, from the second state to a third state where the zoom optical system is focused on an object that is placed at a proximity, and from the third state to a predetermined fourth state that is different from the first state, and satisfies the following condition:

$$4 \cdot Fno \cdot P < Zf < 30 \cdot Fno \cdot P$$

where Zf is an amount of shift of an image surface, at a wide-angle end position, when deformation is made from the first state to the second state and also when deformation is made from the third state to the fourth state, P is a value given by $P = \sqrt{(Px \cdot Py)}$ where Px is a dimension in x direction of a pixel included in an image pickup element and Py is a dimension in y direction of the pixel in the image pickup element, and Fno is an F number of an imaging optical system.

6. A zoom optical system according to claim 1, wherein the following condition is satisfied:

$$0.1 \leq md/\sqrt{(f_w \times f_t)} < 5.0$$

where md (in micrometers) is a maximum amount of deformation of the deformable element, $f_w$ is a focal length of the zoom optical system at a wide-angle end position, and $f_t$ is a focal length of the zoom optical system at a telephoto end position.

7. A zoom optical system according to claim 1, wherein the following condition is satisfied at least at a position in a zooming range:

$$0.2 < \theta i < 4.0$$

where $\theta i$ is an angle formed by an optical axis and an image pickup surface.

8. A zoom optical system according to claim 1, wherein at least one of refracting surfaces in the zoom optical system is formed as a rotationally asymmetric surface.

9. A zoom optical system according to claim 1, wherein the following condition is satisfied:

$$0.001 \leq |\delta/\sqrt{(f_w \times f_t)}| < 0.5$$

where $\delta$ is an amount of shift of a lens surface.

10. A zoom optical system according to claim 1, wherein the deformable element is shaped to have a rotationally asymmetric curved surface.

11. A zoom optical system comprising, in order from an object side:
    a first group having a negative power and being fixed in a magnification change;
    a second group having a positive power and being movable in a magnification change; and
    a third group movable in a magnification change,
    wherein the first group has a deformable element having a focusing function, and satisfies the following condition:

$$-0.5 < f_{1a}/f_{1b} < -0.03$$

where $f_{1a}$ is a power of a negative lens unit arranged on an object side of the deformable element in the first group, and $f_{1b}$ is a power of a positive lens unit disposed on an image side of the deformable element in the first group.

12. A zoom optical system according to claim 11, wherein the second group mainly contributes to a magnification varying function and satisfies the following condition:

$$0.5 < f_2/\sqrt{(f_w \times f_t)} < 5.0$$

where $f_2$ is a focal of the second group, $f_w$ is a focal length of the zoom optical system at a wide-angle end position, and $f_t$ is a focal length of the zoom optical system at a telephoto end position.

13. A zoom optical system according to claim 11, wherein the following condition is satisfied:

$$0.2 < |\beta_{2W}| < 0.8$$

where $\delta_{2W}$ is a magnification from the second group to a rearmost lens unit at a wide-angle end position.

14. A zoom optical system according to claim 11, wherein the following condition is satisfied:

$$0.5 < SD/f_w < 5.0$$

where SD is a distance from a front-side principal point of the second group to a most object-side surface of the second group, and $f_w$ is a focal length of the zoom optical system at a wide-angle end position.

15. An imaging apparatus comprising:
    a zoom optical system according to claim 1.

16. An imaging apparatus comprising:
    a zoom optical system according to claim 11.

* * * * *

UNITED STATES PATENT AND TRADEMARK OFFICE
CERTIFICATE OF CORRECTION

PATENT NO. : 6,859,332 B2
DATED : February 22, 2005
INVENTOR(S) : Tetsuo Nagata et al.

It is certified that error appears in the above-identified patent and that said Letters Patent is hereby corrected as shown below:

Column 59,
Line 62, change "$0.1 \leq md/\sqrt{(f_w \times f_t)}| < 5.0$" to -- $0.1 \leq |md/\sqrt{(f_w \times f_t)}| < 5.0$ --.

Column 60,
Line 51, after "wherein" change "$\delta_{2w}$" to -- $\beta_{2w}$ --.

Signed and Sealed this

Fourth Day of October, 2005

JON W. DUDAS
*Director of the United States Patent and Trademark Office*